US010906788B2

(12) United States Patent
Atsumi

(10) Patent No.: US 10,906,788 B2
(45) Date of Patent: Feb. 2, 2021

(54) CONVEYING DEVICE

(71) Applicant: YUGEN KAISHA ATSUMI BUNJI SHOTEN, Mitaka-shi, Tokyo (JP)

(72) Inventor: Kazuya Atsumi, Tokyo (JP)

(73) Assignee: YUGEN KAISHA ATSUMI BUNJI SHOTEN, Tokyo (JP)

( * ) Notice: Subject to any disclaimer, the term of this patent is extended or adjusted under 35 U.S.C. 154(b) by 81 days.

(21) Appl. No.: 16/574,804

(22) Filed: Sep. 18, 2019

(65) Prior Publication Data

US 2020/0010309 A1 Jan. 9, 2020

Related U.S. Application Data

(63) Continuation of application No. PCT/JP2018/011211, filed on Mar. 20, 2018.

(30) Foreign Application Priority Data

Mar. 22, 2017 (JP) ................................ 2017-056077
Apr. 24, 2017 (JP) ................................ 2017-085461

(51) Int. Cl.
*B66D 1/40* (2006.01)
*B66C 13/22* (2006.01)
*B66C 21/08* (2006.01)

(52) U.S. Cl.
CPC ................ *B66D 1/40* (2013.01); *B66C 13/22* (2013.01); *B66C 21/08* (2013.01); *B66C 2700/011* (2013.01); *B66C 2700/082* (2013.01)

(58) Field of Classification Search
CPC .... B61B 3/00; B61B 3/02; B61B 7/00; B61B 7/02; B61B 7/04; B61B 9/00; B61B 12/007; B66D 1/40; E01B 25/14; E01B 25/18
See application file for complete search history.

(56) References Cited

U.S. PATENT DOCUMENTS 3,750,591 A * 8/1973 Makinster ............... B61B 12/06
                                                                    104/112
5,224,426 A * 7/1993 Rodnunsky ............... B61B 7/00
                                                                    104/112
(Continued)

FOREIGN PATENT DOCUMENTS

CN 87100173 A 8/1988
CN 204265370 U 4/2015
(Continued)

OTHER PUBLICATIONS

International Search Report issued by the Japan Patent Office for corresponding International Patent Application No. PCT/JP2018/011211, dated May 15, 2018, with an English translation.
(Continued)

*Primary Examiner* — Robert J McCarry, Jr.
(74) *Attorney, Agent, or Firm* — Myers Wolin, LLC

(57) ABSTRACT

A conveying device includes: a main movement body; a main conveying mechanism that conveys the main movement body; and a controlling device that controls operation of the main conveying mechanism including a plurality of winches attached to the main movement body and multiple cables one wound around each winch; each winch includes a cylindrical drum rotatable about an axis line thereof and driving device that rotates the drum, and is wound around corresponding one of the drums of the respective corresponding winches helically in an axis direction of the drums multiple times, and have distal ends supported by supporting bodies corresponding to the respective winches; and the controlling device conveys the main movement body to an arbitrary position on a conveying path between the supporting bodies corresponding to the respective winches by controlling operation of a driving device of each winch disposed on the main movement body.

30 Claims, 30 Drawing Sheets

(56) References Cited

U.S. PATENT DOCUMENTS

| | | | |
|---|---|---|---|
| 5,585,707 | A | 12/1996 | Thompson et al. |
| 7,036,436 | B2 * | 5/2006 | MacDonald ............... B61B 7/04 |
| | | | 104/178 |
| 7,207,277 | B2 * | 4/2007 | Rodnunsky ............... B61B 7/04 |
| | | | 104/178 |
| 2007/0056463 | A1 * | 3/2007 | Rodnunsky ............... B61B 7/02 |
| | | | 104/173.1 |
| 2012/0043162 | A1 | 2/2012 | Kim et al. |
| 2017/0174479 | A1 | 6/2017 | Scott |

FOREIGN PATENT DOCUMENTS

| | | |
|---|---|---|
| DE | 2410210 A1 | 9/1975 |
| DE | 34 45 610 C1 | 1/1986 |
| DE | 10 2013 001 776 A1 | 7/2014 |
| JP | 53-8120 Y2 | 3/1978 |
| JP | 53-45838 A | 4/1978 |
| JP | 54-31670 | 3/1979 |
| JP | 55-52881 A | 4/1980 |
| JP | 55-94263 | 6/1980 |
| JP | 56-47187 Y2 | 11/1981 |
| JP | 58-2916 B2 | 1/1983 |
| JP | 61-199464 U | 12/1986 |
| JP | 3-12882 U | 2/1991 |
| JP | 4-16496 A | 12/1992 |
| JP | 5-186178 A | 7/1993 |
| JP | 2000-272875 A | 10/2000 |
| JP | 3244498 B2 | 1/2002 |
| JP | 2002-302384 A | 10/2002 |
| JP | 6277535 B1 | 2/2018 |
| WO | 2014/057028 A1 | 4/2014 |
| WO | 2015/156687 A2 | 10/2015 |

OTHER PUBLICATIONS

Written Opinion of the International Searching Authority issued for corresponding International Patent Application No. PCT/JP2018/011211, dated May 15, 2018, with an English translation.

First Office Action issued by the China National Intellectual Property Administration on Jul. 3, 2020 for corresponding Chinese Patent Application No. 201880026641.0 with full machine English translation attached.

Communication pursuant to Rule 164 (1) EPC with a partial supplementary European search report issued by the European Patent Office for corresponding European Patent Application No. 18770465.5, dated Dec. 11, 2020.

* cited by examiner

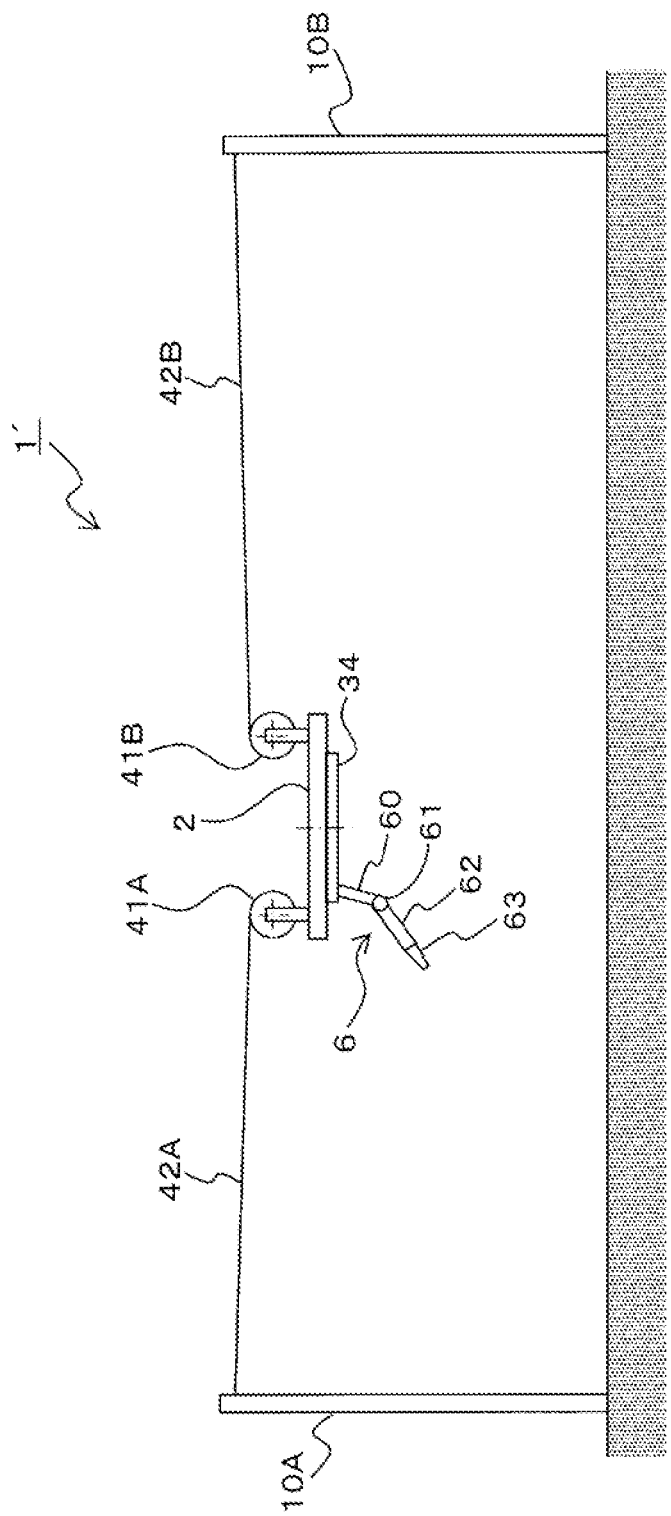

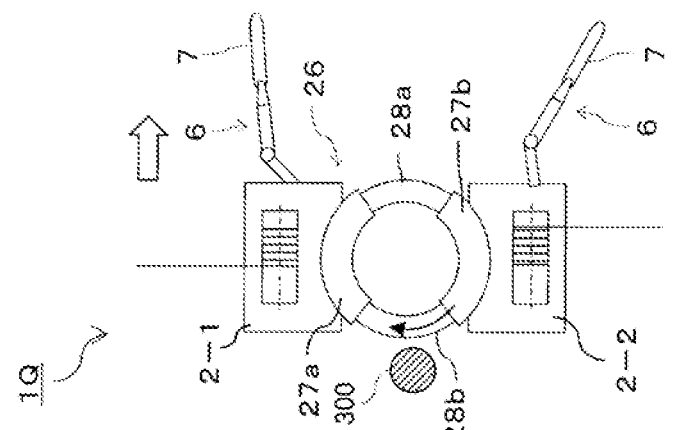
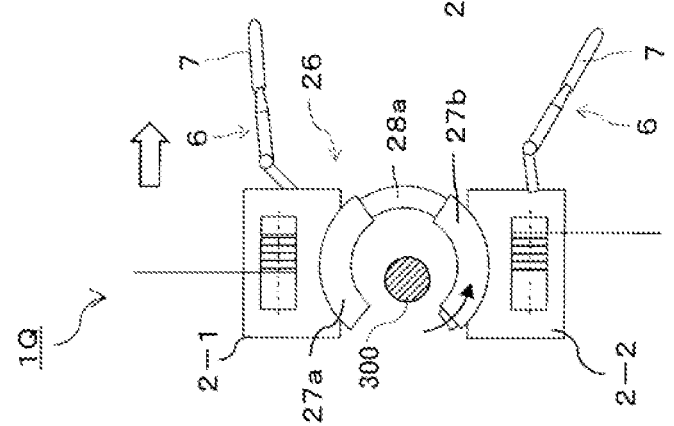
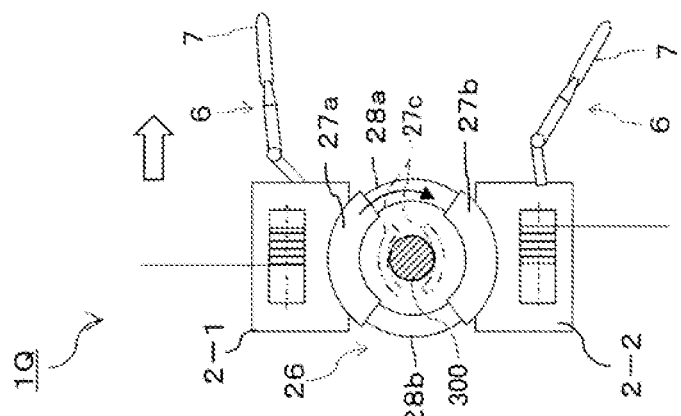
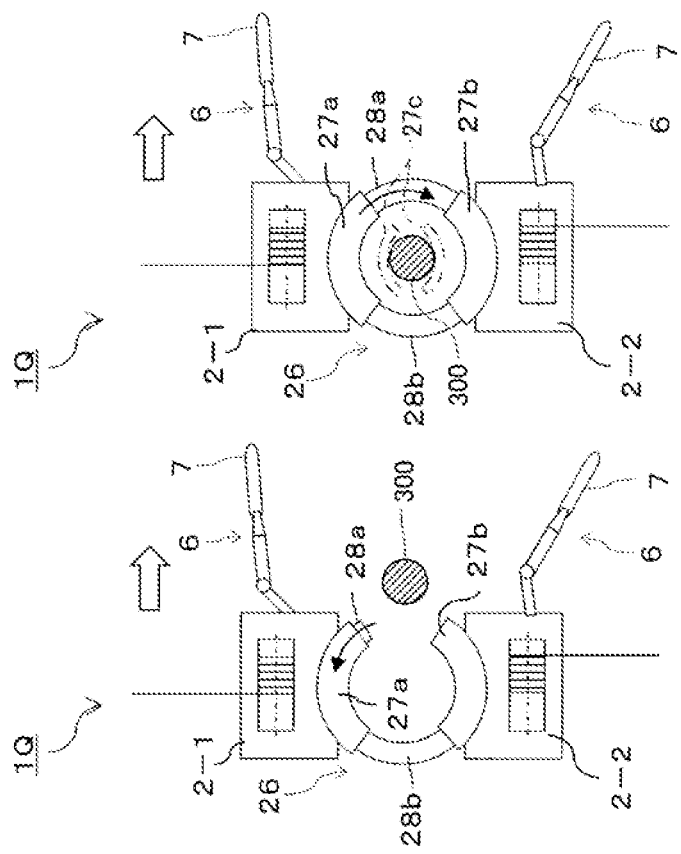

A-A SECTION

CONVEYING DEVICE

CROSS-REFERENCE TO RELATED APPLICATION

This application is a continuation application of International Application PCT/JP2018/011211 filed on Mar. 20, 2018 and designated the U.S., which claims priority to Japanese Patent Application No. 2017-056077 which was filed on Mar. 22, 2017 and Japanese Patent Application No. 2017-085461 which was filed on Apr. 24, 2017 the entire contents of each are incorporated herein by reference.

TECHNICAL FIELD

The present invention relates to a conveying device preferably applied to conveying of a vehicle and an operation machine.

BACKGROUND ART

Conventionally, a large number of conveying devices exemplified by a crane device have been proposed (see Patent Documents 1 and 2, for example).

Hereinafter, description will now be made in relation to techniques disclosed in Patent Documents 1 and 2. The numbers in brackets represent the reference numbers used in the Patent Documents 1 and 2.

Patent Document 1 discloses "a rail cable crane including rail ropes (1) and (2) suspended in parallel to each other; traveling trolleys (3) and (4) hung on the rail ropes (1) and (2), respectively; a main rope (11) disposed across the traveling trolleys (3) and (4); and a traversing trolley (17) hung on the main rope (11)" (see line 4, upper right column to line 7, lower left column of page 2, and FIG. 1).

Patent Document 2 discloses "a portal crane (1) including a girder (2) horizontally oriented, a trolley (3) that reciprocates along the girder (2) and that includes a lifting device (6); and a hunger attachment (8)" (see paragraph [0016]-[0017], FIG. 1).

PRIOR ART REFERENCE

Patent Document

[Patent Document 1] Japanese Laid-open Publication No. SHO 55-052881
[Patent Document 2] Japanese Laid-open Publication No. 2002-302384

SUMMARY

Problem to be Solved by Invention

As exemplified by the cranes disclosed in Patent Documents 1 and 2, a typical conveying device has large-scale fixed facilities that repeats conveying for a long time. However, some cases require conveying of an article only several times in a short time. For this purpose, a typical conveying device having large-scale fixed facilities is not suitable.

With the foregoing problem in view, the object of the present invention is to provide a conveying device that can be easily installed.

Means to Solve Problem

To attain the above object, a conveying device of the present invention includes: a main movement body; a main conveying mechanism that conveys the main movement body; and a controlling device that controls operation of the main conveying mechanism, wherein: the main conveying mechanism includes a plurality of winches attached to the main movement body and a plurality of cables one wound around each of the plurality of winches; each of the plurality of winches includes a cylindrical drum rotatable about an axis line thereof and driving device that rotates the drum; each of the plurality of cables is wound around corresponding one of the drums of the respective corresponding winches helically in an axis direction of the drums multiple times, and have distal ends supported by supporting bodies corresponding to the respective winches; and the controlling device conveys the main movement body to an arbitrary position on a conveying path between the supporting bodies corresponding to the respective winches by controlling operation of a driving device of each of the plurality of winches disposed on the main movement body.

Effect of Invention

The present invention installs a main conveying mechanism formed of multiple winches and multiple cables to a main movement body, and the main part of a conveying device is collectively attached to the main movement body. This configuration makes it possible to install a conveying device by installing supporting bodies at a site where the conveying device is to be worked and then simply bringing the main movement body and fixing the cables thereof to the supporting bodies.

Consequently, in a case where a conveying device will convey an article only several times in a short time, the conveying device can be installed with ease. Additionally, the cables are wound around the corresponding multiple winches and the distal ends of the cables are supported by the supporting bodies corresponding to the respective winches, and the cables can be avoided from slipping and slacking, so that the main movement body can be smoothly moved.

BRIEF DESCRIPTION OF DRAWINGS

FIG. 3 is a side view showing an entire structure of a conveying device according to a second embodiment of the present invention;

FIGS. 22A, 22B, 22C, and 22D are schematic plan views showing a main part of the operation of the conveying device according to the seventeenth embodiment of the present invention;

DETAILED DESCRIPTION OF THE INVENTION

Hereinafter description will now be made in relation to the embodiments of the present invention with reference to the accompanying drawings. It should be noted that the following embodiments are merely examples and there is no intention to exclude various modifications and application of techniques not explicitly described in the following embodiments. The structure of the following embodiments can be variously modified without departing from the scope of the present invention.

1. First Embodiment

[1-1. Structure of Conveying Device]

A conveying device according to the first embodiment of the present invention will now be described with reference to FIGS. 1A, 1B, 2A, and 2B.

Figure 1A:
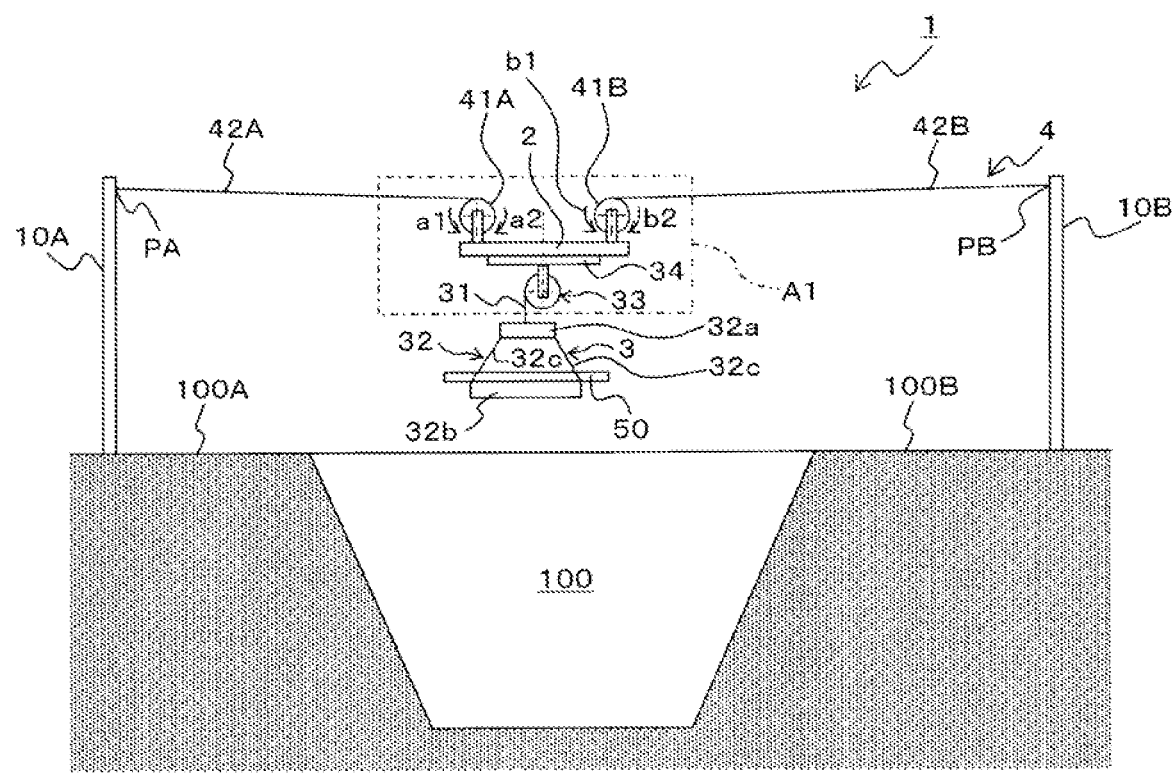
FIGS. 1A and 1B are schematic diagrams showing an entire structure of a conveying device according to a first embodiment of the present invention, FIG. 1A being a side view and a sectional view seen from the side, and FIG. 1B being a plan view.
Figure 1B:
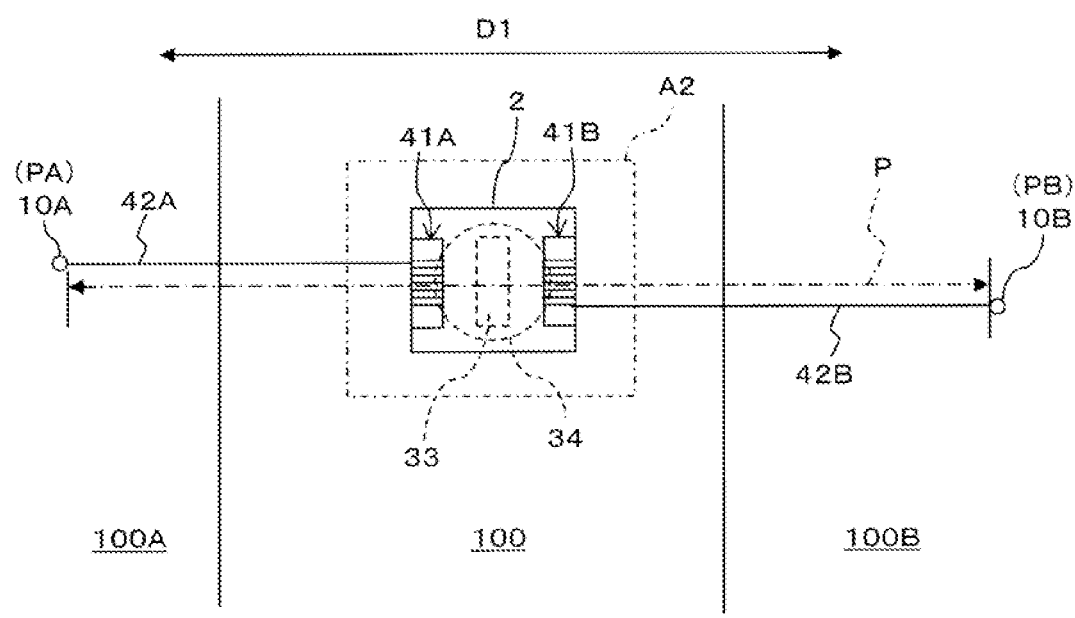

FIGS. 1A and 1B are schematic diagrams showing the entire structure of the conveying device according to the first embodiment of the present invention. FIG. 1A is a side view and a sectional view seen from the side, and FIG. 1B is a plan view.

Figure 2A:
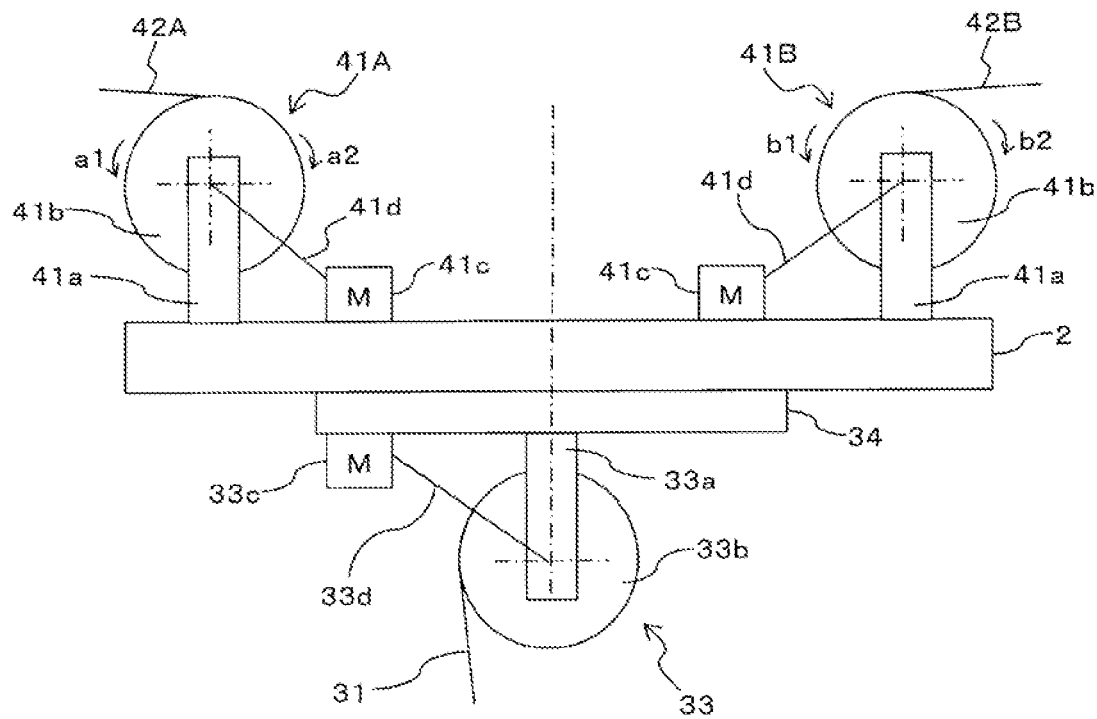
FIGS. 2A and 2B are schematic diagrams showing a main structure of a conveying device of the first embodiment of the present invention, FIG. 2A being a sectional view enlarging the part A1 of FIG. 1A and FIG. 2B being an enlarging view of the part A2 of FIG. 1B.
Figure 2B:
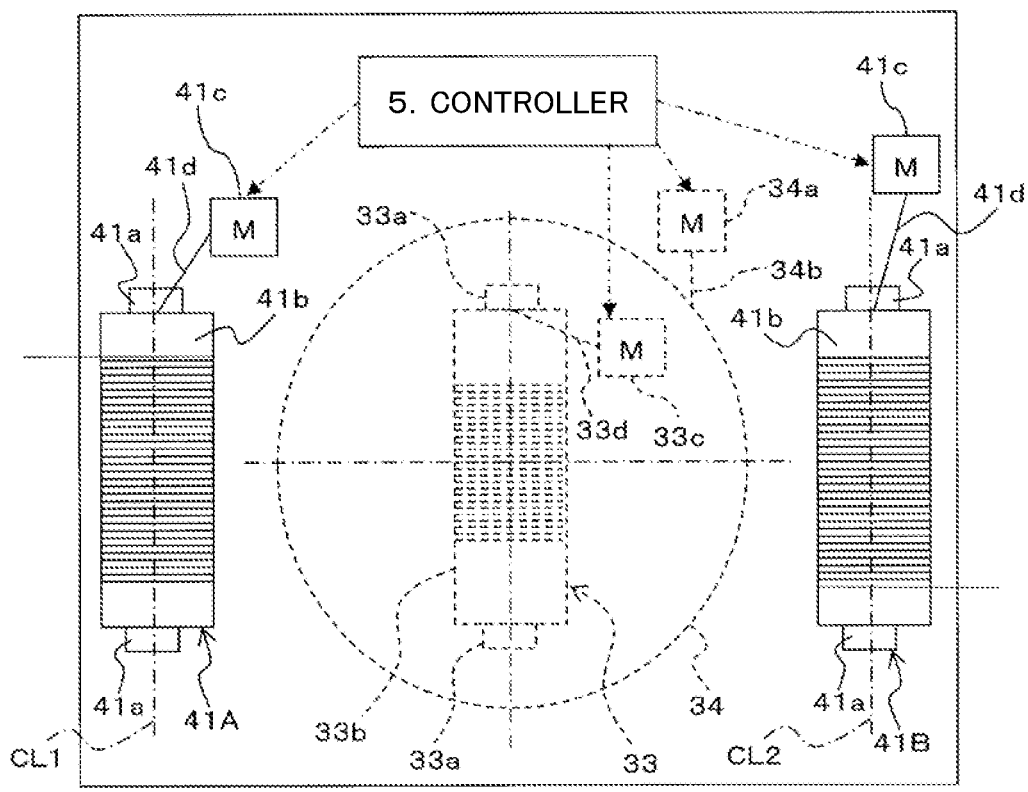

FIGS. 2A and 2B are schematic diagrams showing the main structure of the conveying device of the first embodiment of the present invention. FIG. 2A is a sectional view enlarging the part A1 of FIG. 1A and FIG. 2B is an enlarging view of the part A2 of FIG. 1B.

The conveying device 1 of the present embodiment conveys a construction material (conveying target) 50 from a storage yard at a riverside 100A to a construction side of a riverside 100B across a river 100. FIG. 1A illustrates the river 100 and the riversides 100A and 100B in a sectional view seen from the side and illustrates the remaining in a side view.

As illustrated in FIGS. 1A, 1B, 2A, and 2B, the conveying device 1 includes a movement body (main movement body) 2, a holder mechanism 3 that is attached to the movement body 2 and that is able to hold the construction material 50, a conveying mechanism (main conveying mechanism) 4 that conveys the movement body 2 between columns (supporting bodies) 10A and 10B that are vertically installed at the riversides 100A and 100B, respectively, and a controller (controlling device) 5 that controls the operation of the conveying mechanism 4.

The movement body 2 takes a shape of a rectangular plate and is horizontally oriented such that the thickness direction thereof is aligned vertically. On the bottom face of the movement body 2, a disc-shape turntable 34 and an electric motor 34a (not illustrated in FIGS. 1A and 1B) are provided as shown in FIGS. 2A and 2B. The turntable 34 is fixed to the bottom face of the movement body 2 to be turnable horizontally, and by activating the electric motor (hereinafter simply referred to as a "motor") 34a, the turntable 34 can be horizontally turned for a predetermined angle through a power transmission mechanism 34b simplified in the drawing. Thereby, a construction material (conveying target) 50 on the holder mechanism 3 connected to the turntable 34 can be turned to an appropriate direction. The combination of the turntable 34 and the motor 34a severs as a turning mechanism that horizontally turns the construction material 50.

The holder mechanism 3 includes a lifting winch 33, a wire (hanging member) 31 having an upper end connected to the movement body 2 through the lifting winch (lifting device) 33 and the turntable 34, and a holding member 32 that is fixed to the lower end of the wire 31 and on which the construction material 50 is mounted. The holding member 32 is formed by connecting one of the four corners of a ceiling wall 32a having a rectangular shape in a plan view to each of the four corners of a bottom wall 32b having a rectangular shape in a plan view.

Specifically, the lifting winch 33 includes a pair of supporting frames 33a projecting from the bottom face of the turntable 34, a drum 33b having both ends along the axis direction rotatably supported by the supporting frames 33a, a power transmission mechanism 33d simplified in the drawing, and an electric motor (hereinafter, referred to as a "motor") 33c that rotates the drum 33b through the power transmission mechanism 33d. Around the drum 33b, the upper end of the wire 31 is wound.

The conveying mechanism 4 includes a conveying winch (first winch) 41A and a conveying winch (second winch) 41B that are disposed on the top face of the movement body 2, and a wire (first cable unit) 42A and a wire (second cable unit) 42B that are coupled to the conveying winches 41A and 41B, respectively.

The conveying winches 41A and 41B have the same configuration. If conveying winches 41A and 41B are not discriminated from each other, the conveying winches 41A and 41B are represented by "winches 41". Likewise, if the wires 42A and 42B are not discriminated from each other, the wires 42A and 42B are represented by "wires 42".

Each winch 41 includes a pair of supporting frames 41a projecting from the top face of the movement body 2, a drum 41b having both ends along the axis direction supported by the supporting frames 41a, a power transmission mechanism 41d simplified in the drawing, and an electric motor (hereinafter, referred to as a "motor") 41c that rotates the drum 41b through the power transmission mechanism 41d.

Around the drum 41b, the proximal end of the wire 42 is wound. Here, the drum 41b of the conveying winch 41A has a center of rotation of an axis line CL1, and the drum 41b of the second winch 41B has a center of rotation of an axis line CL2 parallel to the axis line CL1.

In a plan view as illustrated in FIG. 1B, the column 10A, the conveying winch 41A, the conveying winch 41B, and the column 10B are arranged in this sequence along the first direction D1. The distal end of the wire 42A connected to the conveying winch 41A is fixed to a supporting point PA of the column 10A, and the distal end of the wire 42B connected to the conveying winch 41B is fixed to the supporting point PB of the column 10B. The supporting points PA and PB are set at the same height (see FIG. 1A), and consequently the conveying path P of the movement body 2 formed from the supporting point PA to the supporting point PB by the wires 42A and 42B is formed to be horizontal (including substantially horizontal, hereinafter the same is applied).

The controller 5 is configured to receive an operation signal input from a non-illustrated external operation device, for example, wirelessly, and controls the operations of the motors 33c, 34a, and 41c in accordance with the operation signal.

Specifically, upon receipt of an instruction of ascending from the operation device, the controller 5 forwardly rotates the motor 33c. Responsively, the drum 33b of the lifting winch 33 forwardly rotates in the vertical direction, and the wire 31 is wound around the drum 33b, so that the holding member 32 ascends against the gravity. In contrast to the above, upon receipt of an instruction of descending from the operation device, the controller 5 reversely rotates the motor 33c. Responsively, the drum 33b of the lifting winch 33 reversely rotates in the vertical direction, and the wire 31 is forwarded from the drum 33b, so that the holding member 32 descends by the action of the gravity.

Upon receipt of an instruction to move to the supporting point PB of the column 10B (hereinafter "rightward instruction", in contrast, an instruction to move to the supporting point PA of the column 10A is referred to as "leftward instruction"), the controller 5 controls the operations of the motors 41c of the conveying winches 41A and 41B and forwardly rotates the drums 41b of the conveying winches 41A and 41B as indicated by the arrows a1 and b1 in such rotating rates that the length (an amount of forwarding) of forwarding the wire 42A comes to be the same as the length (an amount of winding) of winding the wire 42B. This forwards the wire 42A from the winch 41A and concurrently winds the wire 42B around the winch 41B.

Since the length ΔLA of the wire 42A forwarded from the conveying winch 41A is the same as the length ΔLB of the wire 42B wound around the conveying winch 41B, the movement body 2 horizontally (along the first direction in a plan view) moves for a distance ΔL equal to these length ΔLA and ΔLB toward the supporting point PB, keeping the tensions of the wires 42A and 42B.

On the other hand, upon receipt of a leftward instruction, the controller 5 controls the operations of the motors 41c of the conveying winches 41A and 41B and reversely rotates the both drums 41b of the conveying winches 41A and 41B as indicated by the arrows a2 and b2 in such rotating rates that the length of winding the wire 42A comes to be the same as the length of forwarding the wire 42B. This moves the movement body 2 by a predetermined distance toward the supporting point PA horizontally (along the first direction in a plan view), keeping the tensions of the wires 42A and 42B.

By appropriately carrying out such operation by the operation device, the movement body 2 can be conveyed to an arbitrary point on the conveying path P from the supporting point PA of the wire 42A on the column 10A to the supporting point PB of the wire 42B on the column 10B.

The movement body 2 is provided with a non-illustrated battery, which provides electric power to the electric motors 34a and 33c, and the controller 5.

In addition to the above, tension sensors that detect the tensions of the wires 42A and 42B may be provided, and if the tensions of the wires 42A and 42B declines below thresholds, the motors 41c are activated to wind the wires 42A and 42B by the conveying winch 41A and 41B until the tensions of the wires 42A and 42B exceed the thresholds by predetermined values.

The operation device may not be limited to a dedicated device, but may be a versatile mobile terminal such as a smartphone or tablet PC.

[1-2. Conveying by the Conveying Device]

Hereinafter, description will now be made in relation to conveying of the construction material 50 by the conveying device 1 according to the first embodiment of the present invention with reference to FIGS. 1A and 1B.

The conveying of the construction material 50 by the conveying device 1 is executed in the following procedure by, for example, operating the operation device by an operator.

After the movement body 2 is conveyed to the supporting point PA of the column 10A, the holding member 32 is descended until being grounded near the storage yard set on the riverside 100A. After the construction material 50 is brought into the grounded holding member 32 from the storage yard, the holding member 32 is lifted up to a height having no possibility of contacting with ambient pedestrians, vehicles, and premises, and then the movement body 2 is moved to the supporting point PB of the column 10B. Then, the turntable 34 is horizontally rotated to direct the long construction material 50 to an appropriate direction and is descended until grounded at the construction site on the riverside 100B. This completes the conveying of the construction material 50.

[1-3. Actions and Effect]

Hereinafter, description will now be made in relation to the actions and effects of the conveying device 1 according to the first embodiment of the present invention with reference to FIGS. 1A, 1B, 2A, and 2B.

The conveying mechanism 4 having multiple (two in the present embodiment) conveying winches 41A and 41B and multiple (two in the present embodiment) wires 42A and 42B is attached to the movement body 2, which means that the main part of the conveying device 1 is concentratedly attached to the movement body 2. In particular, if the wires 42A and 42B are made into a state of being completely wound by the conveying winches 41A and 41B, the main part of the conveying device 1 can be made into a state of being accommodated in the movement body 2 and the conveying device 1 can be easily conveyed to the installation site.

Thereby, if the columns 10A and 10B are installed at the riversides 100A and 100B where the conveying device 1 is to be used, the conveying device 1 can be installed simply by bringing the movement body 2 into the site of use and fixing the distal ends of the wires 42A and 42B to the columns 10A and 10B, respectively.

Accordingly, in a case of conveying a target a couple of times for a short time, the conveying device 1 can be installed with ease.

Since the turntable 34 makes it possible to horizontally rotate the holding member 32, the holding member 32 can be oriented in such a direction the construction material 50 is easily brought into the site or the construction material 50 is easily used in the construction site.

[1-4. Modification]

(1) The foregoing first embodiment may omit the lifting winch 33 and attach the upper end of the wire 31 directly to the turntable 34. In this case, the holding member 32 can be lifted up and down by controlling the operation of the conveying winches 41A and 41B. Specifically, forwarding at least one of the wires 42A and 42B from corresponding one of the conveying winches 41A and 41B can slack the wires 42A or 42B and consequently the gravity can descend the holding member 32. In contrast to the above, winding at least one of the wires 42A and 42B by corresponding one of the conveying winches 41A and 41B can ascend the holding member 32 by pulling the wires 42A and 42B toward the conveying winches 41A and 41B, respectively.

(2) In the foregoing first embodiment, the conveying target is the construction material 50, but the conveying target of the conveying device 1 is not limited to the construction material 50. Alternatively, the conveying target may be a person and the conveying device 1 may be used for conveying a person or for moving a person wiping the windows of a building to an appropriate position.

Further alternatively, an operation machine such as a mower or a carriage such as an automobile or a ship may be attached directly to the lower end of the wire 31. In cases of attaching a carrier, the carrier may be provided with a driving device or may be provided with no driving device. If the carrier is not provided with a driving device, the conveying device 1 substantially serves as a driving device. If the carrier is provided with a driving device such as a vehicle (not only a small vehicle but also a large vehicle exemplified by a trailer or a bus, the same is applied hereinafter), it is satisfactory that the lifting winch 33 lifts up the vehicle; conveying device 1 moves the vehicle across the river to the other riverside, keeping the state where the vehicle is hung in the air; and descends until the vehicle is grounded to be able to travel by itself. If the carrier is a ship, it is satisfactory that the lifting winch 33 lifts up the ship to be hung in the air and conveying device 1 moves the ship until the ship reaches a river, and then the lifting winch 33 descends the ship to the river.

(3) In the foregoing first embodiment, the conveying winches 41A and 41B are installed in an upright posture on the top face of the movement body 2 such that the drums 42b are oriented upward. Alternatively, the conveying winches 41A and 41B may be installed on the right end face and the left end face (i.e., end faces directing to the extending direction of the wires 42A and 42B) of the movement body 2 in the FIGS. 2A and 2B, respectively such that the drums 41b is horizontally installed to the movement body 2 to direct outward of the movement body 2.

2. Second Embodiment

[2-1. Structure of Conveying Device]

The conveying device 1' of the present embodiment is different from that of the first embodiment mainly in the point that the conveying target is an operation arm (operation machine).

Hereinafter, specific description will now be made in relation to the conveying device according to the second embodiment of the present invention with reference to FIG. 3.

FIG. 3 is a schematic side view showing the entire structure of the conveying device according to the second embodiment of the present invention.

Like reference numbers designate the same or substantially same elements as the first embodiment, so repetitious description is omitted here. FIG. 3 omits illustration of the controller, the motors that drive the conveying winches, and the battery.

The conveying device 1' of the present embodiment attaches the operation arm 6 directly to the bottom face of the turntable 34.

The operation arm 6 includes an arm member 60, a joint member 61, an arm member 62, and an operation machine 63 exemplified by a welder or a cutter.

The arm member 60 has a proximal end part attached to the outer edge of the turntable 34 with, for example, a bolt (holder mechanism), and a distal end part attached to the joint member 61. The arm member 62 has a proximal end part attached to the joint member 61 and a distal end part to which the operation machine 63 is detachably attached.

Being simplified in FIG. 3, joint member 61 connects the arm member 62 to the arm member 60 to be vertically rotatable and is provided with a non-illustrated electric motor (hereinafter referred to as a "motor") that operates the joint member 61.

The controller 5 (see FIG. 2B) controls the operation of the motor of the joint member 61 to thereby bend and stretch the arm member 60 and also controls the operation of the operation machine 63 in response to an operation signal input from the non-illustrated external operation device.

The operation machine 63 may be of any purpose and is exemplified by a demolishing machine that demolishes premises. The number of operation arms 6 attached to the turntable 34 is not limited and may be two, for example.

The remaining structure is the same as the first embodiment, so repetitious description is omitted here.

[2-2. Actions and Effect]

The conveying device 1' of the second embodiment of the present invention brings the following actions and effects in addition to those of the first embodiment.

Since an operator can control the operation of the conveying winches 41A and 41B and the turntable 34 by using an external operation device and consequently can convey the operation arm 6 to a predetermined operation point. Therefore an operation, for example, at a high elevation that is too dangerous to be accomplished by a person can be accomplished by using the operation arm 6.

3. Third Embodiment

[3-1. Structure of Conveying Device]

The conveying device 1" of the present embodiment is different from that of the second embodiment mainly in the points that multiple operation arms 6 are provided and a limbing chainsaw (hereinafter referred to as a "chainsaw") is attached to the distal end of each operation arm 6.

Hereinafter, specific description will now be made in relation to the conveying device according to the third embodiment with reference to FIG. 4.

Figure 4:
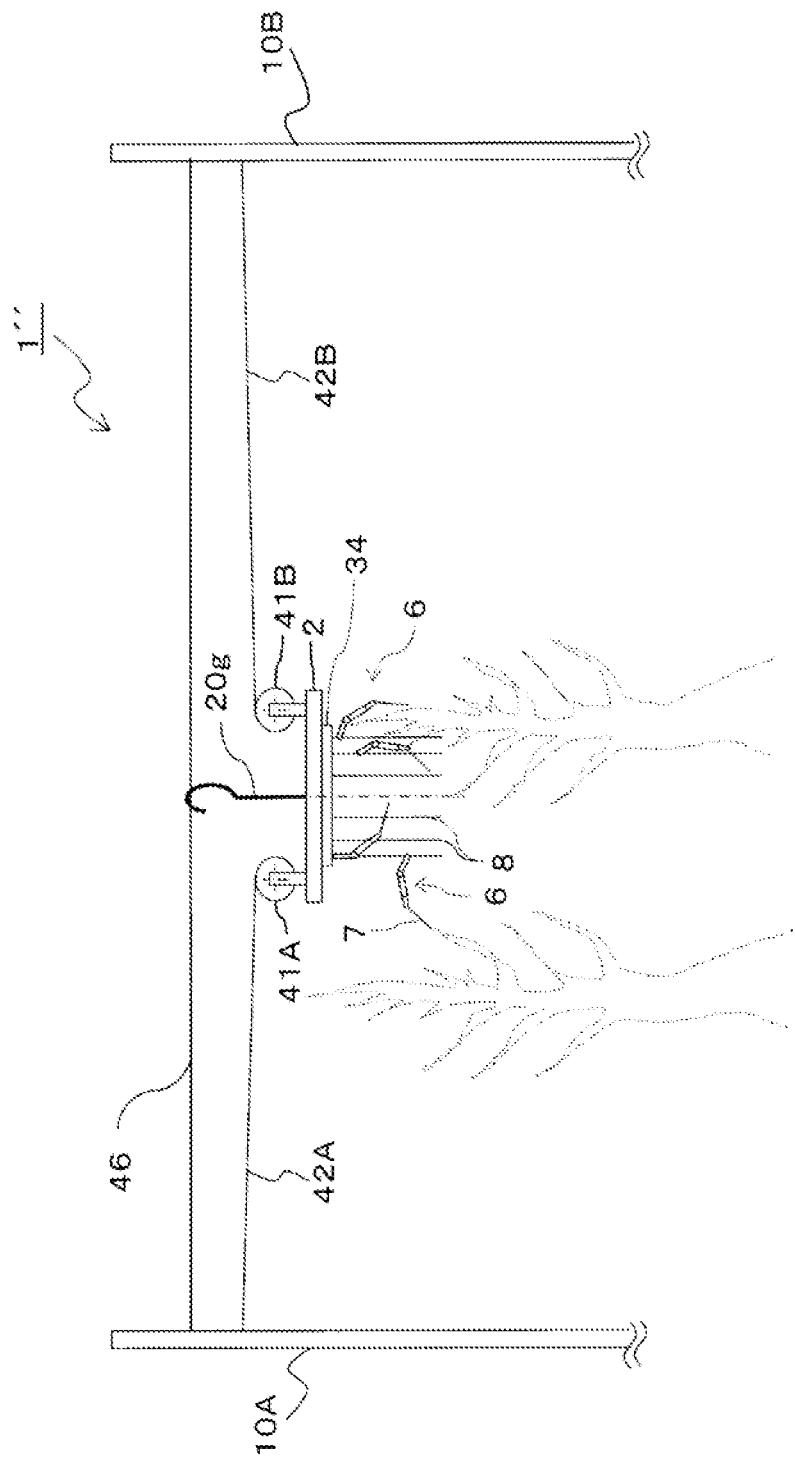
FIG. 4 is a schematic side view showing an entire structure of a conveying device according to a third embodiment of the present invention.

FIG. 4 is a schematic side view showing the entire structure of the conveying device according to the third embodiment of the present invention.

Like reference numbers designate the same or substantially same elements as the first and the second embodiments, so repetitious description is omitted here. FIG. 4 omits illustration of the motors that drive the conveying winches, and the battery.

The conveying device 1" of the present embodiment is provided with multiple rods (hanging members) 8 attached under the movement body 2 through the turntable 34 and multiple operation arms 6 attached one to each of the rods 8. Each operation arm 6 can ascend and descend the corresponding rod 8 by the aid of a non-illustrated lifting mechanism. For example, by remotely operating the lifting mechanism, the altitudes of the operation arms 6 and the chainsaws 7 can be adjusted to the height of the branches of the trees indicated by broken lines in FIG. 4.

The rods 8 may be replaced with cables. For convenience, FIG. 4 omits illustration of part of the operation arms 6 and the chainsaws 7.

The multiple rods 8 are arranged at the outer edge of the turntable 34 along the circumference direction of the turntable 34 at a regular pitch, and hung from the turntable 34. Alternatively, the rods 8 are arranged on a line along the radius direction of the turntable 34.

Furthermore, a hook member 20g having a distal end in the form of a hook is vertically installed to the top face of the movement body 2. Between the columns 10A and 10B, a reinforcement wire 46 is horizontally or substantial horizontally suspended over the wires 42A and 42B. The distal end in the form of a hook of the hook member 20g is positioned above the conveying winches 41A and 41B and hooked to the reinforcement wire 46. Thereby, the main part of the conveying device 1" is supported by the reinforcement wire 46 in addition to the wires 42A and 42B.

If the wires 42A and 42B are strong enough to support the main part of the conveying device 1", the reinforcement wire 46 and the hook member 20g can be omitted.

As described above, the conveying device 1" is provided with the multiple operation arms 6 and the multiple chainsaws 7 arranged along the circumference direction and the vertical direction in a state of being hung from the movement body 2 like a mobile sculpture.

The controller 5 (see FIG. 2B) controls the operation of the operation arms 6 and the chainsaws 7 in response to an operation signal input from the non-illustrated external operation device.

The remaining structure is the same as the second embodiment, so repetitious description is omitted here.

[3-2. Actions and Effects]

The conveying device 1" of the present embodiment of the present invention brings the following actions and effects in addition to those of the foregoing embodiments.

Since the multiple chainsaws 7 are arranged in the circumference direction and the vertical direction under the movement body 2, branches are efficiently limbed with the multiple chainsaws 7 that operate concurrently. If the chainsaws 7 are operated to limb branches while the turntable 34 is rotating, the branches around the circumference direction of the turntable 34 can be entirely limbed, so that the limbing can be accomplished further efficiently.

[3-3. Miscellaneous]

(1) The above embodiment supports the main part of the conveying device 1" by the reinforcement wire 46 through the hook member 20g. Alternatively, the hook member 20g may be replaced with a following-type trolley (movable carrier). Specifically, a supporting member (e.g., cable or rod) is hung from the trolley and the lower end of the supporting member is connected to the top face of the movement body 2. Under this state, the trolley is operated to travel on the reinforcement wire 46, following the conveying device 1". Alternatively, the trolley may be provided with a driving device to be of a self-propelled type that assists the conveying by the conveying device 1".

(2) The above embodiment is an example of attaching chainsaws 7 to the operation arms 6. Alternatively, the chainsaws 7 may be replaced with limbing devices having reciprocating knives such as limbing knives or stickles. The operation arms 6 may attach thereto any operation devices for the any purposes different from limbing.

(3) Multiple types of operation device (attachment) that can be attached to the distal end of each operation arm 6 may be prepared and the operation device to be attached to the distal end of the operation arm 6 may be appropriately selected.

4. Fourth Embodiment

[4-1. Structure of Conveying Device]

The conveying device 1A of the present embodiment is different from the conveying devices 1, 1', and 1" of the first to the third embodiments mainly in the points that the main movement body is a vehicle and the conveying device 1A is provided with an auxiliary conveying mechanism 14 in addition to the main conveying mechanism.

Hereinafter, specific description will now be made in relation to the conveying device 1A with reference to FIGS. 5A and 5B.

Figure 5A:
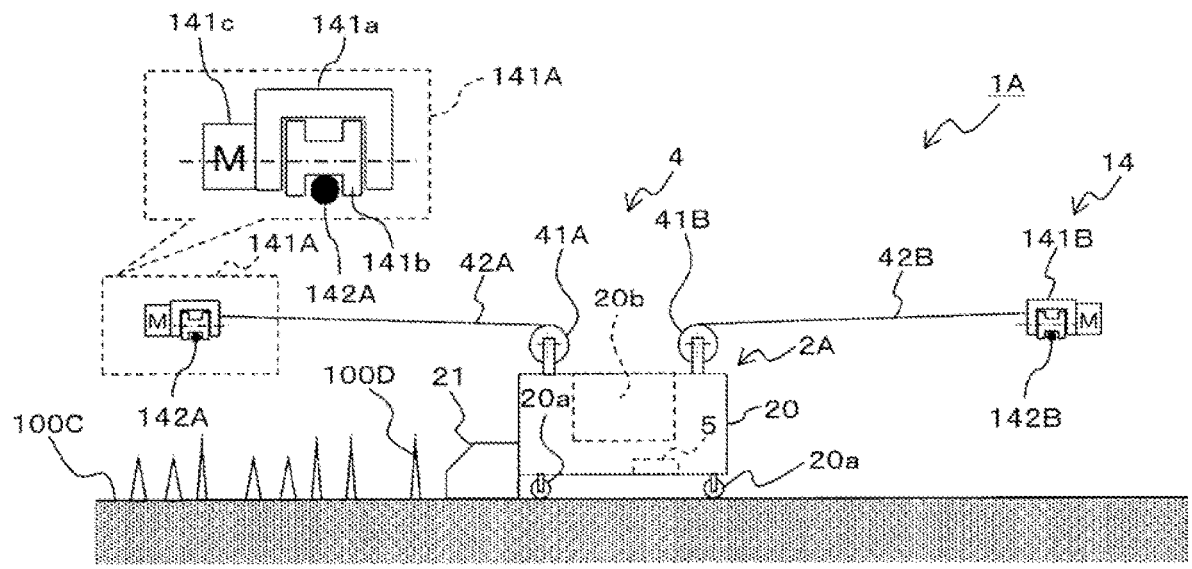
FIGS. 5A and 5B are schematic diagrams showing an entire structure of a conveying device according to a fourth embodiment of the present invention, FIG. 5A being a sectional view seen from the side, and FIG. 5B being a plan view.
Figure 5B:
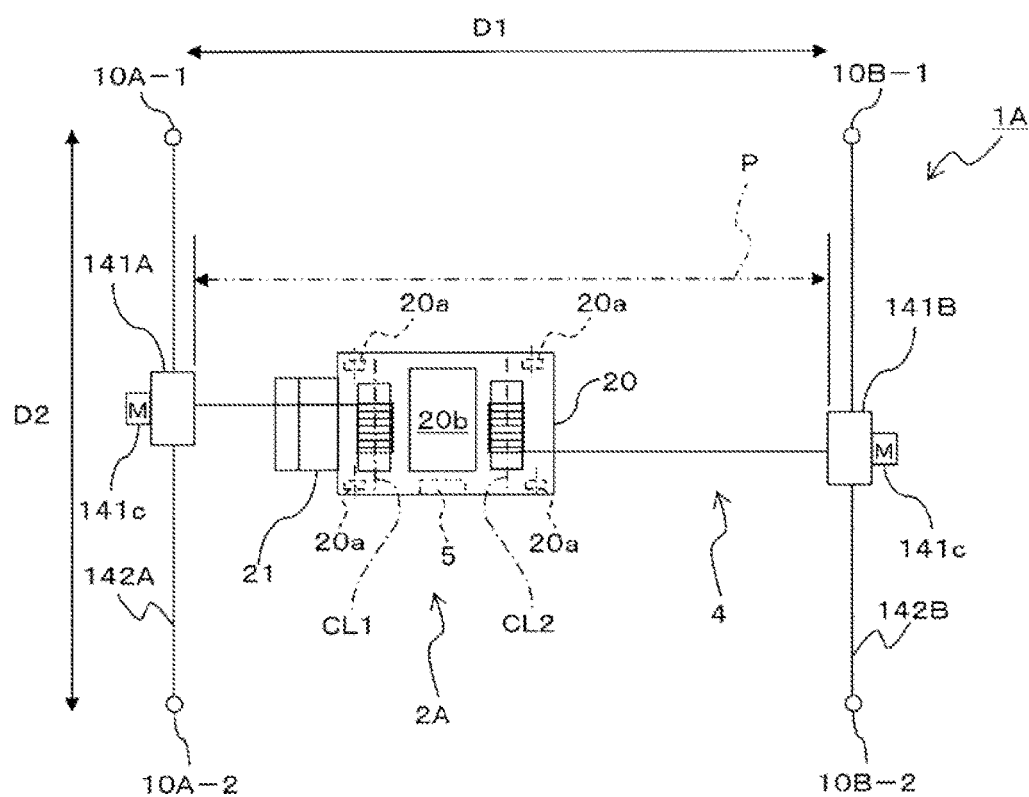

FIGS. 5A and 5B are schematic diagrams showing the entire structure of a conveying device according to the fourth embodiment of the present invention. FIG. 5A is a sectional view see from the side, and FIG. 5B is a plan view.

Like reference numbers designate the same or substantially same elements as the first embodiment, so repetitious description is omitted here. FIGS. 5A and 5B omit illustration of the motors that drive the conveying winches, and the battery.

The conveying device 1A includes a mower 2A provided with caster wheels 20a serving as both the main movement body and a vehicle, a conveying mechanism 4 that moves the mower 2A along the first direction D1, and the auxiliary conveying mechanism 14 that moves the mower 2A along a second direction D2 that crosses the first direction D1 (in the present embodiment, the second direction D2 is perpendicular to the first direction D1). The conveying device 1A can mow in a wide range by being moved with the conveying device 1A while the mower 2A is activated.

The mower 2A includes a traveling member 20, a mowing unit 21 that is attached to the front face of the traveling member 20, and the controller 5 incorporated in the traveling member 20.

In the traveling member 20, a driving device (engine or electric motor) that drives the mowing unit 21 is incorporated, and caster wheels 20a are attached to be horizontally rotatable at the four corners of the bottom face of the traveling member 20. Furthermore, at the center of the top face of the traveling member 20, a container 20b that accommodates the auxiliary conveying mechanism 14 is formed into a recess.

As to be detailed below, the mower 2A is conveyed in the right-and-left direction and the backward-and-forward by the conveying mechanism 4 and the auxiliary conveying mechanism 14. The caster wheels 20a are horizontally rotatable in 360 degrees, so that the directions of thereof spontaneously change so as to accord with the conveying direction.

The traveling member 20 is conveyed by the conveying mechanism 4 and the auxiliary conveying mechanism 14 and therefore is not provided with a driving device for being self-propelled.

Although being simplified in FIGS. 5A and 5B, the mowing unit 21 is opened at the lower end thereof and incorporates therein a cutter. This cutter is driven by the driving device incorporated in the traveling member 20 and mows grass and trees 100D growing on the ground 100C. The operation of the driving device is controlled by the controller 5.

The conveying mechanism 4 is configured to be the same as that of the first embodiment, and specifically includes the conveying winches 41A and 41B and the wires 42A and 42B. The conveying winches 41A and 41B are fixed to the ceiling face of the traveling member 20 of the mowing unit 21.

The auxiliary conveying mechanism 14 includes a trolley (first auxiliary movement body) 141A, a trolley (second auxiliary movement body) 141B, a wire (first guiding member) 142A, and a wire (second guiding member) 142B.

The wire 142A is horizontally suspended between the columns 10A-1 and 10A-2 (along the second direction D2 in a plan view). The wire 142B is horizontally suspended between the columns 10B-1 and 10B-2 (along the second direction D2 in a plan view).

Hereinafter, if trolleys 141A and 141B are not discriminated from each other, the trolleys 141A and 141B are represented by "trolleys 141". Likewise if the wires 142A and 142B are not discriminated from each other, the wires 142A and 142B are represented by the wires 142.

Each trolley 141 includes a trolley main body 141a having a roughly-U-shaped section opened downward, a pulley 141b rotatably incorporated inside of the U-shaped opening of the trolley main body 141a and engaged with the wire 142, and a motor 141c that drives the pulley 141b.

The trolley 141A supports the distal end of the wire 42A forwarded form the conveying winch 41A, which means that the trolley 141A serves as the first supporting body of the present invention. Likewise, trolley 141B supports the distal end of the wire 42B forwarded form the conveying winch 41B, which means that the trolley 141B serves as the second supporting body of the present invention.

The motor 141c of each trolley 141 is remotely controlled by the controller 5 provided to the mower 2A. When a moving-forward instruction is input into the controller 5 from a non-illustrated operation device, the both motors 141c of the trolleys 141A and 141B forwardly rotate at the same rotation rate under control of the controller 5, and consequently, the both pulleys 141b of the trolleys 141A and 141B forwardly rotate at the same rotation rate. Thereby, the respective pulleys 141b of the trolleys 141A and 141B travel on the wires 142A and 142B, being guided by the wires 142A and 142B, so that the mowing unit 21 is conveyed forward (upward in FIG. 5B) together with the conveying mechanism 4 along the second direction D2 in a plan view.

In contrast to the above, when a reversing instruction is input into the controller 5 from the non-illustrated operation device, the pulleys 141b of the both trolleys 141 reversely rotate at the same rotation rate by the controller 5 controlling the operation of the motors 141c of the both trolleys 141. Thereby, the respective pulleys 141b travel on the wires 142, being guided by the wires 142, so that the mowing unit 21 is conveyed backward (downward in FIG. 5B) along the second direction D2 in a plan view.

The remaining structure is the same as the first embodiment, so repetitious description is omitted here.

[4-2. Actions and Effects]

The conveying device 1A of the fourth embodiment of the present invention brings the following effects in addition to those of the first embodiment.

Since the conveying device 1A of the present embodiment includes the auxiliary conveying mechanism 14 in addition to the conveying mechanism 4, the mower 2A can be conveyed between the columns 10A-1 and 10A-2 and between the columns 10B-1 and 10B-2 along the first direction D1 in a plan view by the conveying mechanism 4, and also can be conveyed between the columns 10A-1 and 10B-1 and between the columns 10A-2 and 10B-2 along the second direction D2 in a plan view by the auxiliary conveying mechanism 14.

Accordingly, the conveying device 1A of the present embodiment can convey the mower 2A to the substantially entire region enclosed by the columns 10A-1, 10A-2, 10B-1, and 10B-2, and therefore can enlarge the conveying range of the mower 2A serving as the main movement body as compared with a case where the conveying mechanism 4 linearly moves between the columns 10A and 10B as performed the first embodiment. This means that the operation range (mowing range) by the mower 2A can be of a two-dimensional range.

Furthermore, the mower 2A is provided with the container 20b. Winding the wires 42A and 42B by the conveying winches 41A and 41B and accommodating the trolleys 141A and 141B detached from the wires 142A and 142B in the container 20b make it possible to accommodate the conveying device 1A in the mower 2A and thereby the conveying device 1 and the mower 2A can be carried with ease.

[4-3. Miscellaneous]

(1) In the above embodiment, the mower 2A may be replaced with various traveling members (e.g., a construction machine being provided with a crane or a power shovel and being capable of traveling, a self-propelled snow blower) including an operation device, each of which traveling members conveys the operation device while the operation device is activated or stopped. Further alternatively, the conveying device 1A may convey a carriage exemplified by various other vehicles and a ship.

(2) In the above embodiment, a conveying device in which the trolleys 141 and the wires 142 are replaced with conveying winches 41A and 41B may be used. An example of this alternative conveying device corresponds to the conveying device 1 illustrated in FIGS. 1A and 1B from which the turntable 34, the electric motor 34a, the power transmission mechanism 34b, and the holder mechanism 3 are omitted.

5. Fifth Embodiment

[5-1. Structure of Conveying Device]

In contrast to the conveying device 1A of the fourth embodiment, which conveys the mower 2A in the second direction D2 by additionally providing the auxiliary conveying mechanism 14, a conveying device 1B of the present embodiment aims at conveying the mower 2A along the second direction D2 by adding conveying winches to the main conveying mechanism in place of providing the auxiliary conveying mechanism 14.

Hereinafter, description will now be made in relation to the conveying device 1B with reference to FIG. 6.

Figure 6:
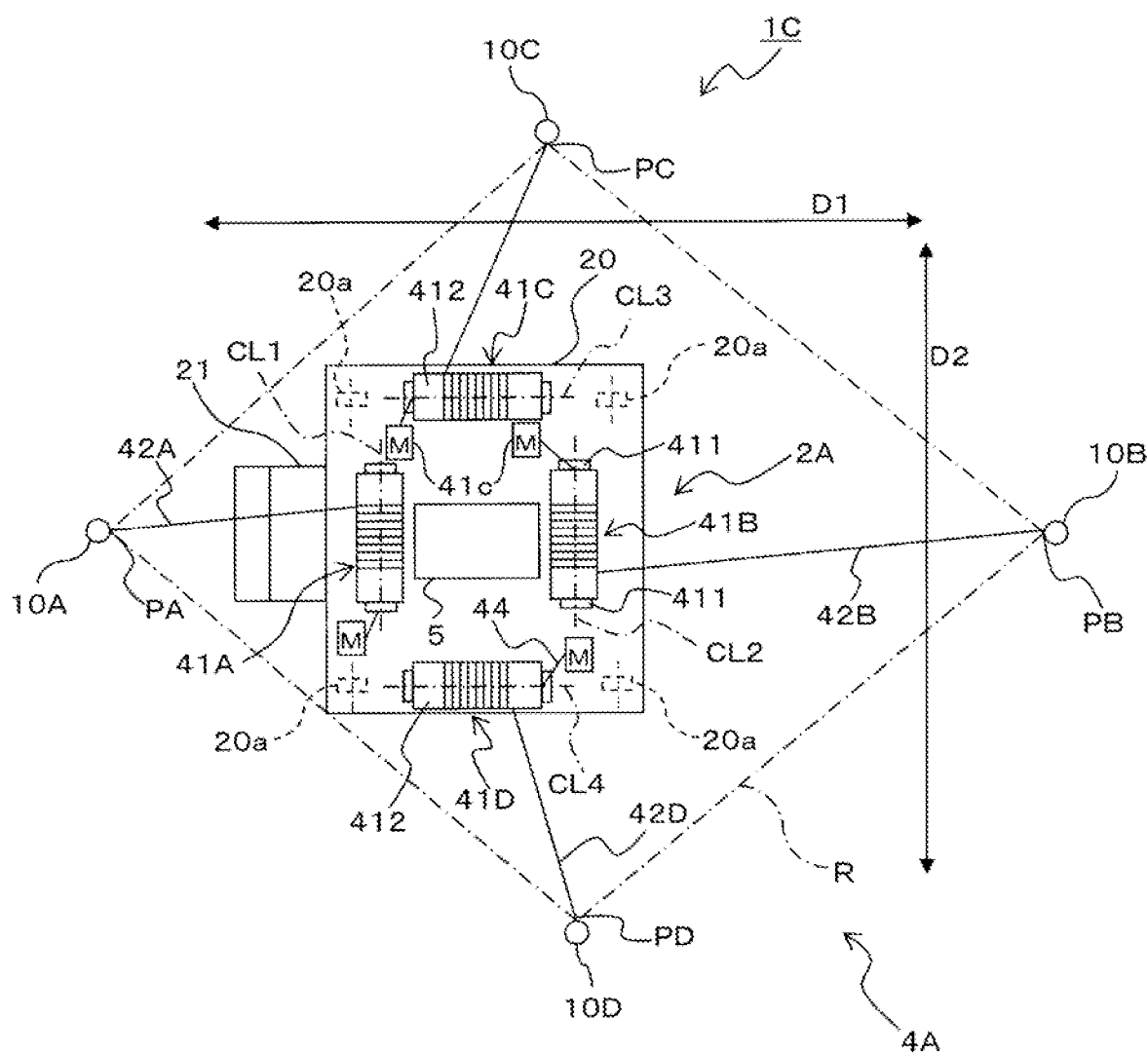
FIG. 6 is a schematic plan diagram showing an entire structure of a conveying device according to a fifth embodiment of the present invention.

FIG. 6 is a schematic plan diagram showing the entire structure of the conveying device according to the fifth embodiment of the present invention.

Like reference numbers designate the same or substantially same elements as the fourth embodiment, so repetitious description is omitted here. FIG. 6 omits illustration of the battery.

The conveying device 1C includes a mower 2A and the conveying mechanism 4A. The conveying mechanism (main conveying mechanism) 4A has a structure formed by adding conveying winches 41C and 41D and the wires 42C and 42D connected to the conveying winches 41C and 41D to the conveying mechanism 4 of the fourth embodiment. The conveying winches 41C and 41D are configured likewise the conveying winches 41A and 41B, and each include a pair of supporting frames 41a, a drum 41b, a power transmission mechanism 41d, and a motor 41c.

The conveying winches 41C and 41D are arranged along the second direction D2. The drum 41b of the conveying winch 41C has a center of rotation of an axis line CL3, and the drum 41b of the conveying winch 41D has a center of rotation of an axis line CL4 parallel to the axis line CL3. The direction of these axis lines CL3 and CL4 cross the axis lines CL1 and CL2 of the conveying winches 41A and 41B (in the present embodiment, being perpendicular to the axis lines CL1 and CL2).

As illustrated in FIG. 6, the column 10A and the column 10B are arranged along the first direction D1 in a plan view, and the column (supporting body) 10C and the column (supporting body) 10D are arranged along the second direction D2.

The wires 42A, 42B, 42C, and 42D have the proximal end parts wound around the conveying winches 41A, 41B, 41C, and 41D, respectively, and the distal end parts fixed to the supporting points PA, PB, PC, and PD of the columns 10A, 10B, 10C, and 10D, respectively.

The operations of the respective motors 41c of the conveying winches 41A and 41B are controlled in cooperation with each other by the controller 5, so that the mower 2A can be moved between the supporting point PA of the wire 42A and the supporting point PB of the wire 42B along the first direction D1 in a plan view. Likewise, the operations of the respective motors 41c of the conveying winches 41C and 41D are controlled in cooperation with each other by the controller 5, so that the mower 2A can be moved between the supporting point PC of the wire 42C of the column 10C and the supporting point PD of the wire 42D of the column 10D along the second direction D2 in a plan view.

Accordingly, controlling the operations of the respective motors 41c of the conveying winches 41A, 41B, 41C, and 41D by the controller 5 can move the mower 2A to an arbitrary position in the region R defined by connecting the supporting points PA, PB, PC, and PD.

The supporting points PA, PB, PC, and PD are set at the same height, so that the mower 2A is conveyed roughly horizontally (including substantial horizontally) among the supporting points PA, PB, PC, and PD.

Since the conveying device 1C does not include the auxiliary conveying mechanism 14, it is natural that the mower 2A is not provided with a container.

The remaining structure is the same as the fourth embodiment, so repetitious description is omitted here.

[5-2. Actions and Effects]

The conveying device 1C of the fifth embodiment of the present invention has the above structure and, likewise the fourth embodiment, therefore can enlarge the conveying range of the mower 2A serving as the main movement body as compared with the first embodiment. This means that the operation range by the mower 2A can be of a two-dimensional range.

6. Sixth Embodiment

[6-1. Structure of Conveying Device]

In contrast to the conveying devices of the foregoing embodiments, which convey the conveying targets along the horizontal direction, the conveying device 1D of the present embodiment conveys the conveying target along the vertical direction.

Hereinafter, specific description will now be made in relation to the conveying device 1D with reference to FIG. 7.

Figure 7:
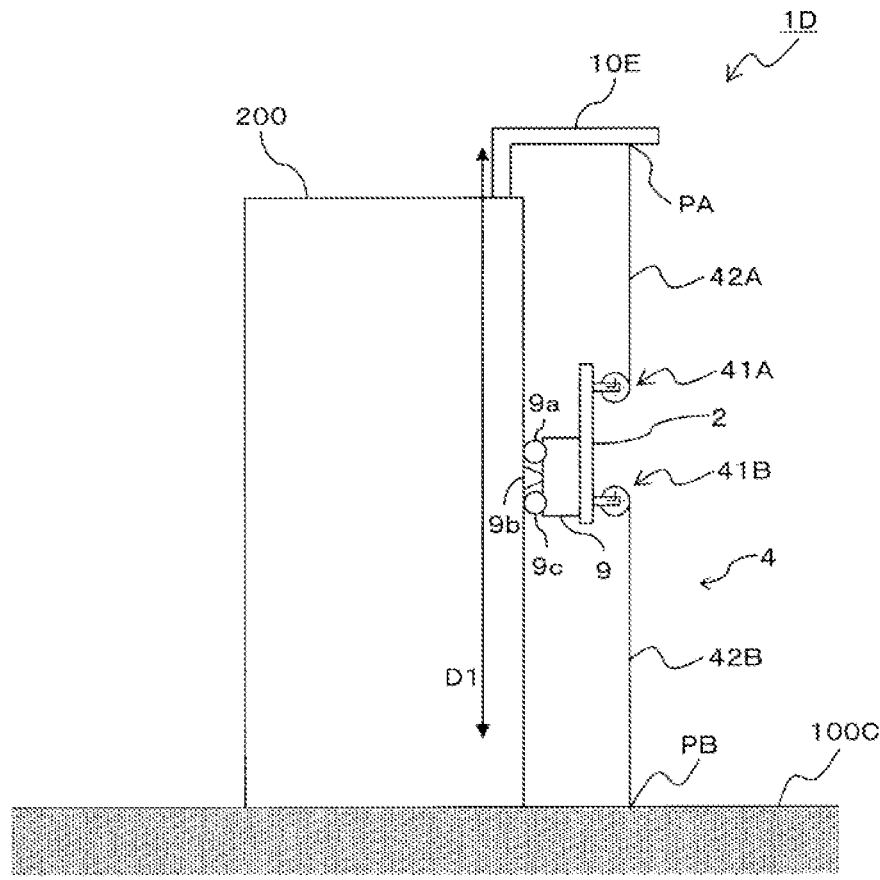
FIG. 7 is a schematic side view showing an entire structure of a conveying device according to a sixth embodiment of the present invention.

FIG. 7 is a schematic side view showing the entire structure of the conveying device according to the sixth embodiment of the present invention.

Like reference numbers designate the same or substantially same elements as the foregoing embodiments, so repetitious description is omitted here. FIG. 7 omits illustration of the controller, the motors that drive the conveying winches, and the battery.

The conveying device 1D of the present embodiment shown in FIG. 7 is used for cleaning operation on, for example, windows of a building 200, and specifically conveys a gondola (conveying target) 9, in which a cleaner person gets, along the vertical direction (including a substantially vertical direction).

As illustrated in FIG. 7, the gondola 9 is attached to the back face (the opposite face to the face with the conveying winches 41A and 41B) of the movement body 2 of the conveying device 1D, so that the conveying winches 41A and 41B are arranged along the vertical direction (first direction) in a side view. The distal end of the wire 42A is fixed to a supporting point PA of an L-shaped column (supporting body) 10E fixed to the roof of the building 200, and the distal end of the wire 42B is fixed to a supporting point PB on the ground 100C. The wires 42A and 42B are oriented along the vertical or substantially vertical direction.

A front wheel 9a, a rear wheel 9c, and a suction cup 9b are provided to the back face (face opposed to the building 200) of the gondola 9. The presence of the front wheel 9a and the rear wheel 9c makes the gondola 9 possible to travel on the wall face of the building 200, so that the gondola 9 can be stably lifted up and down. The suction cup 9b is configured to be touchable and detachable to the wall face of the building 200 by manual operation or by being driven with a device. Specifically, the suction cup 9b is retracted to be detached from the wall face while the gondola 9 is moving and is stretched to stick the wall face during operation, so that the position of the gondola 9 is fixed. By fixing the position of the gondola 9 by means of sticking of the suction cup 9b, the operator in the gondola 9 can accomplish the cleaning operation in a stable state.

At least one of the front and rear wheels 9a and 9c, and the suction cup 9b can be omitted.

The controller 5 (see FIG. 2B) vertically conveys the gondola 9 together with the movement body 2 by controlling winding and forwarding the wires 42A and 42B by the conveying winches 41A and 41B in cooperation with each other likewise the foregoing embodiments.

The remaining structure is the same as the first embodiment, so repetitious description is omitted here.

[6-2. Actions and Effects]

The conveying device 1C of the sixth embodiment of the present invention, which has the above structure, can support the gondola 9 at the both ends of the upper end of the wire 42A and the lower end of the wire 42B, and can inhibit rolling of the gondola 9 in a state of being stopped and conveyed.

[6-3. Miscellaneous]

(1) Description will now be made in relation to modifications 1 and 2 of the sixth embodiment with reference to FIG. 8.

Figure 8:
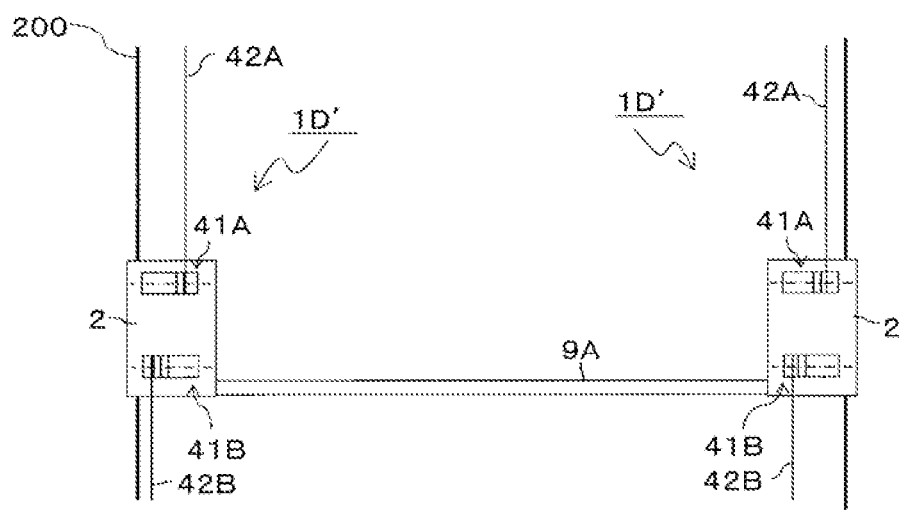
FIG. 8 is a schematic front view showing a main structure of a conveying device according to a modification to sixth embodiment of the present invention.

FIG. 8 is a schematic front view showing the main structure of a conveying device according to a modification to the sixth embodiment of the present invention. FIG. 8 omits illustration of the controller, the motors that drive the conveying winches, and the battery.

In this modification, two conveying devices 1D' are arranged side by side to form a two columns, and the rear end portion of the scaffolding (board member) 9A is fixed to the back face (face opposed to the building 200) of each conveying device 1D'. This means that the scaffolding 9A is suspended between the conveying devices 1D'.

On the back face of each conveying device 1D', the gondola 9 is not provided because of the presence of the scaffolding 9A, but the front and rear wheels 9a and 9c, and the suction cup 9b are provided. At least one of the front and rear wheels 9a and 9c, and the suction cup 9b can be omitted.

(2) In place of the gondola 9, a polisher serving as an operation device for wall cleaning, a device for a hammering test, or a painter device may be attached to the back face (face opposed to the building 200) of the movement body 2 in the conveying device 1D shown in FIG. 7. This enables cleaning without human intervention. Also in this alternative, the front and rear wheels 9a and 9c, and the suction cup 9b are preferably attached to the back face of the movement body 2.

7. SEVENTH EMBODIMENT

7-1. Structure of Conveying Device

The foregoing embodiments each describe a structure in which wires are wound around respective winches. However, the present invention is not limited to this structure. Alternatively, in the foregoing embodiments (including modifications thereof) and following embodiments (including modifications thereof), two winches may share a single wire. For example, the conveying mechanism may have a structure shown in FIG. 9.

Figure 9A:
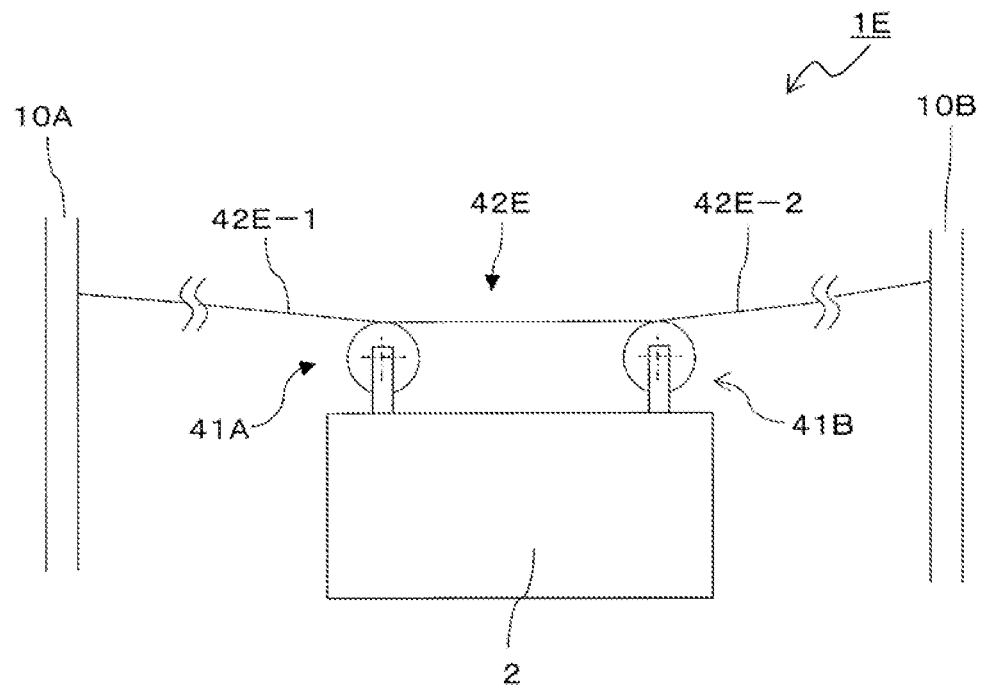
FIGS. 9A and 9B are schematic diagrams showing a main structure of a conveying device according to a seventh embodiment of the present invention, FIG. 9A being a sectional view and FIG. 9B being a plan view.
Figure 9B:
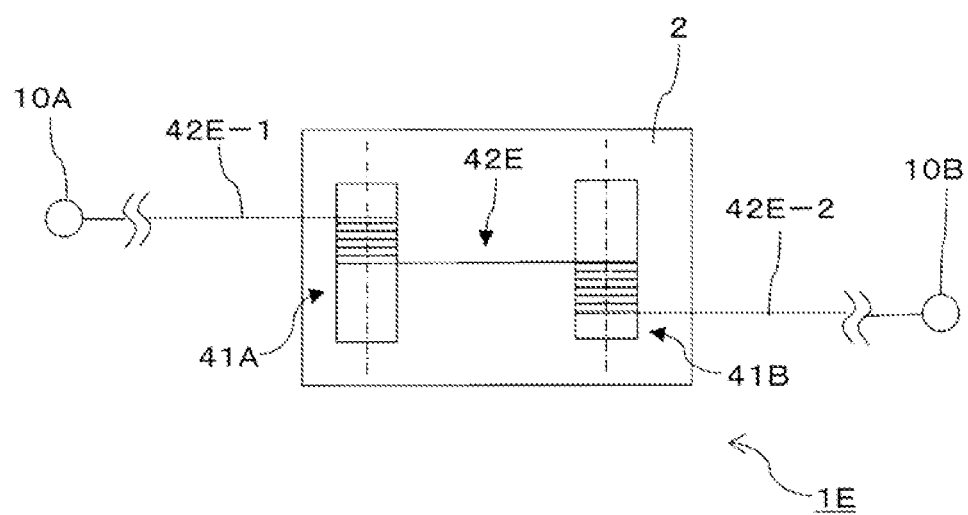

FIG. 9 is a schematic diagram showing the main structure of a conveying device 1E according to the seventh embodiment of the present invention. FIG. 9A is a side view and FIG. 9B is a plan view. In FIG. 9, like reference numbers designate the same or substantially same elements as the foregoing embodiments, so repetitious description is omitted here. FIG. 9 omits illustration of the controller 5, the motors that drive the conveying winches 41A and 41B, and the battery.

On the top face of the movement body 2, the conveying winches 41A and 41B are arranged in parallel to each other. Around the conveying winches 41A and 41B, a common single wire (cable) 42E are wound at its middle portions. Specifically, a part on the side of the movement body 2 of a first part (first cable unit) 42E-1, which is one of the end (the left part of FIG. 9) of the wire 42E, is wound around the conveying winch 41A and also a part on the side of the movement body 2 of a second part (second cable unit) 42E-2, which is the other end (the right part of FIG. 9) of the wire 42E, is wound around the conveying winch 41B. The distal ends of the first part 42E-1 and the second part 42E-2 are fixed to the columns 10A and 10B, respectively. Being omitted in FIG. 9, the controller 5 is incorporated in the movement body 2 and the conveying target is directly or indirectly held.

[7-2. Actions and Effects]

In the seventh embodiment of the present invention, a single wire 42E is shared by the conveying winches 41A and 41B, and therefore the length of wire can be saved as compared with a case where the conveying winches 41A and 41B use respective wires. 6p Specifically, when the movement body 2 is moved to one direction (e.g., leftward), one conveying winch 41A is required to wind the wire 42E concurrently with forwarding the wire 42E from the other winch 41B. Since the winch 41B satisfactorily forwards the wire 42E of the same length as that wound by the conveying winch 41A, the length of wire can be saved as compared with a case where the conveying winches 41A and 41B use respective wires.

[7-3. Miscellaneous]

Description will now be made in relation to modifications 1 and 2 of the seventh embodiment with reference to FIGS. 10A, 10B, 11A, and 11B.

Figure 10A:
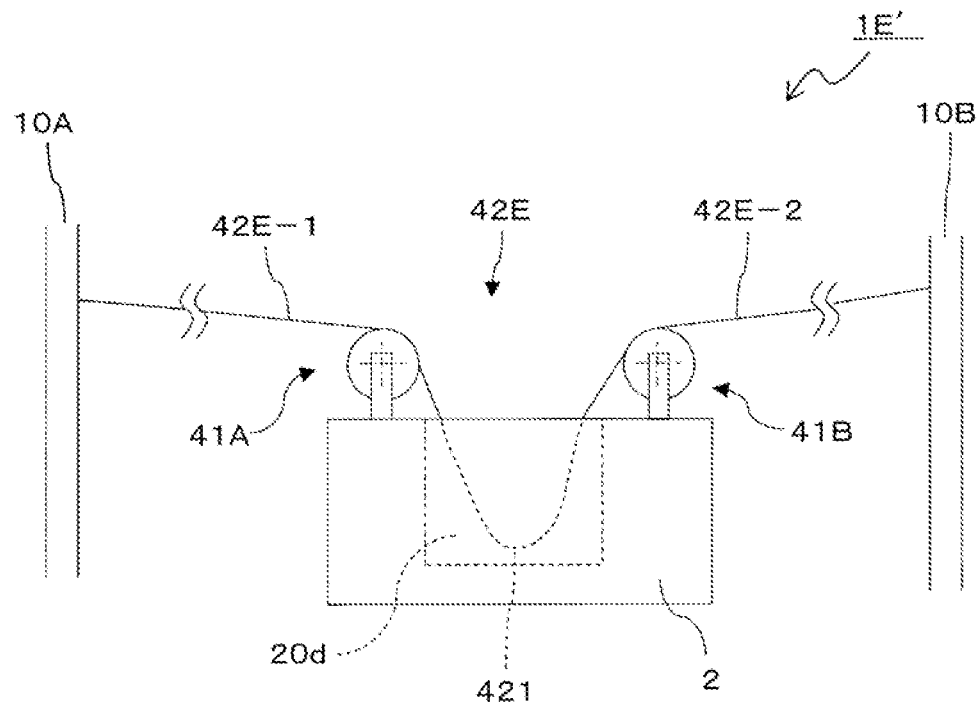
FIGS. 10A and 10B are schematic diagrams showing a main structure of a conveying device according to a modification 1 to the seventh embodiment of the present invention, FIG. 10A being a side view and FIG. 10B being a plan view.
Figure 10B:
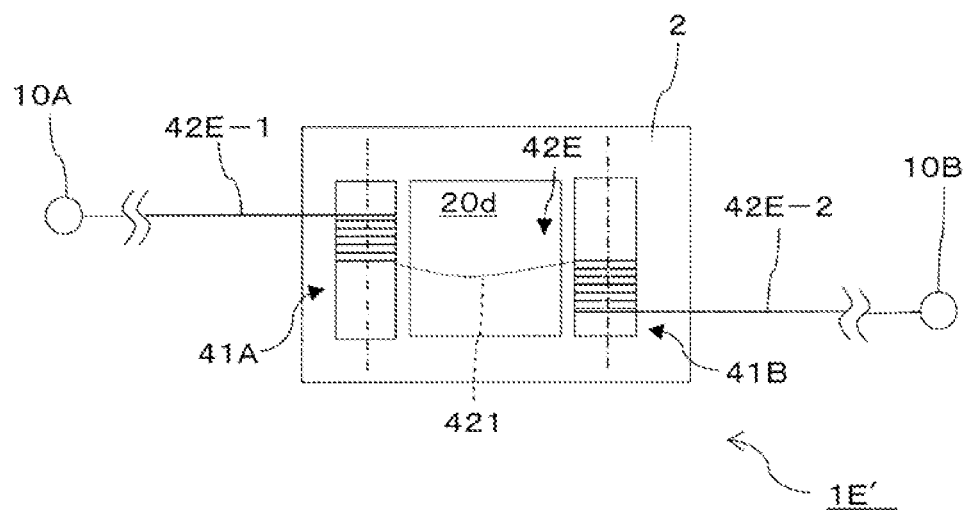

FIGS. 10A and 10B are schematic diagrams showing the main structure of the conveying device according to a modification 1 to the seventh embodiment of the present invention. FIG. 10A is a side view and FIG. 10B is a plan view.

Figure 11A:
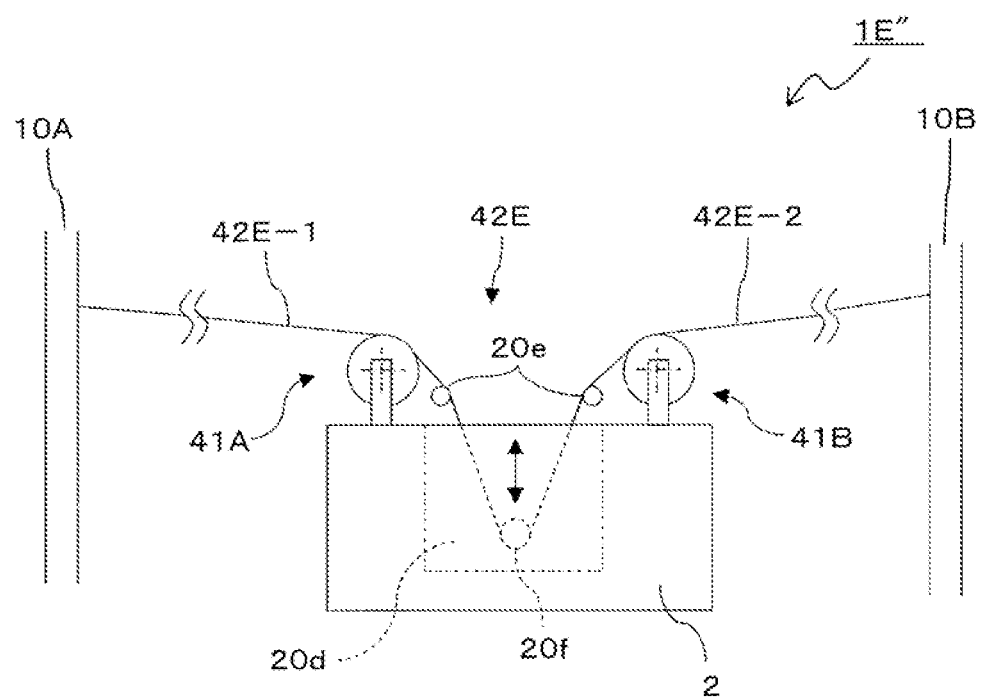
FIGS. 11A and 11B are schematic diagrams showing a main structure of a conveying device according to a modification 2 to the seventh embodiment of the present invention, FIG. 11A being a side view and FIG. 11B being a plan view.
Figure 11B:
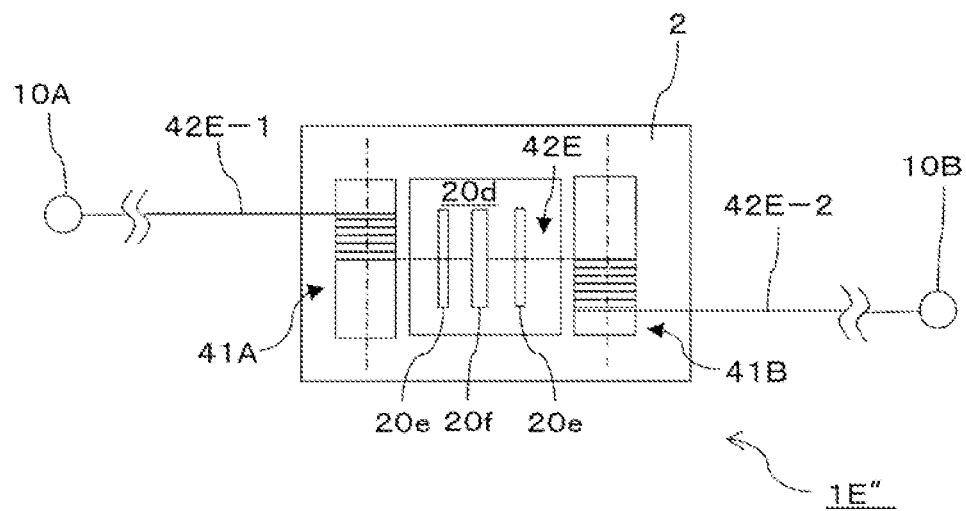

FIGS. 11A and 11B are schematic diagrams showing the main structure of the conveying device according to a modification 2 to the seventh embodiment of the present invention. FIG. 11A is a side view and FIG. 11B is a plan view.

Like reference numbers in FIGS. 10A, 10B, 11A, and 11B designate the same or substantially same elements of the conveying device 1E shown in FIGS. 9A and 9B, so repetitious description is omitted here.

(1) Modification 1:

As shown in FIGS. 10A and 10B, in cases where a single wire 42E is shared by the conveying winches 41A and 41B, a slack 421 may be generated on the wire 42E between the conveying winches 41A and 41B, depending on balance between amounts of winding the wires 42E around the conveying winches 41A and 41B. If the slack 421 is large, inconvenience such as the wire 42E entangling with the conveying winches 41A and 41B may arise. For the above, in the conveying device 1E' of the present modification 1, a slack pool 20d that is a recess to accommodate possible slack 421 is provided to the movement body 2 between the conveying winches 41A and 41B.

The remaining structure is the same as the conveying device 1E" shown in FIGS. 9A and 9B, so repetitious description is omitted here.

(2) Modification 2:

As illustrated in FIG. 11, in the conveying device 1E" of the modification 2, guide rolls 20e and 20e, and a tension roll 20f are provided to the movement body 2 in addition to the configuration of the modification 1 shown in FIG. 10. The rolls 20e and 20f are arranged so as to have respective axis lines parallel with the axis lines of the conveying winches 41A and 41B, and has the both ends pivotally supported by non-illustrated supporting members. Each guide roll 20e is arranged diagonally lower side of the conveying winches 41A and 41B and over the slack pool 20d between the conveying winches 41A and 41B. The tension roll 20f is arranged between the guide rolls 20e and 20e and inside the slack pool 20d, and is configured to be movable upward and downward by a non-illustrated moving mechanism as indicated by the arrow. The wire 42E is threaded through the upper side of each guide roll 20e and through the lower side of the tension roll 20f. If a slack is generated on the wire 42E, the tension roll 20f is moved downward to apply tension to the wire 42E, and consequently the slack can be removed.

As the above, the slack removing mechanism of the present invention can be configured by including the guide rolls 20e and the tension roll 20f.

The remaining structure is the same as the conveying device 1E' shown in FIG. 10, so repetitious description is omitted here.

8. Eighth Embodiment

[8-1. Structure of Conveying Device]

The conveying device 1F of the present embodiment is configured to be a conveying carrier that conveys the conveying target 50A.

Hereinafter, specific description will now be made in relation to the conveying device of the eighth embodiment of the present invention with reference to FIG. 12.

Figure 12:
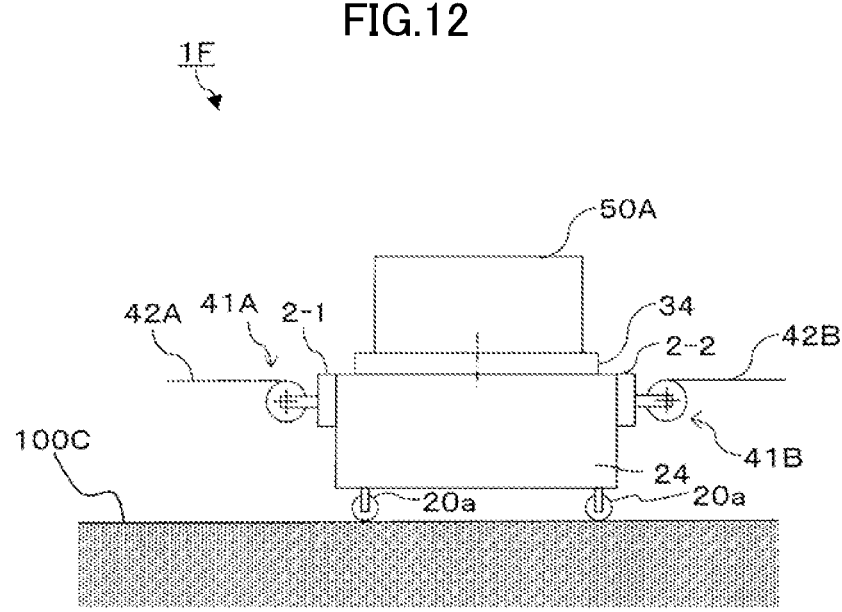
FIG. 12 is a schematic side view showing an entire structure of a conveying device according to an eighth embodiment of the present invention.

FIG. 12 is a schematic side diagram showing the entire structure of the conveying device 1F according to the eighth embodiment of the present invention.

Like reference numbers designate the same or substantially same elements as the foregoing embodiments, so repetitious description is omitted here. FIG. 12 omits illustration of the controller, the motors that drive the conveying winches, and the battery, and the wires 42A and 42B are fixed to columns outside the drawing.

The conveying device 1F includes a carrier 24 having caster wheels 20a provided to the front, rear, left, and right of the bottom face thereof, and divided bodies 2-1 and 2-2 which are obtained by dividing the movement body of the present invention into two and which are provided to the front and rear faces of the carrier 24, and the turntable 34 disposed on the top face of the carrier 24 so as to be horizontally rotatable. On the divided bodies 2-1 and 2-2, the conveying winches 41A and 41B are disposed, respectively, and the conveying target 50A is placed on the turntable 34.

[8-2. Actions and Effects]

According to the eighth embodiment of the present invention, if the orientation of the conveying target 50A at the inlet has to be changed at the outlet, the orientation of the conveying target 50A can be appropriately changed by rotating the turntable 34 by a predetermined amount.

9. Ninth Embodiment

[9-1. Structure of Conveying Device]

The conveying device 1G of the present embodiment has a configuration that holds the conveying target 50A by sandwiching the conveying target 50A.

Hereinafter, specific description will now be made in relation to the conveying device of the ninth embodiment of the present invention with reference to FIG. 13.

Figure 13:
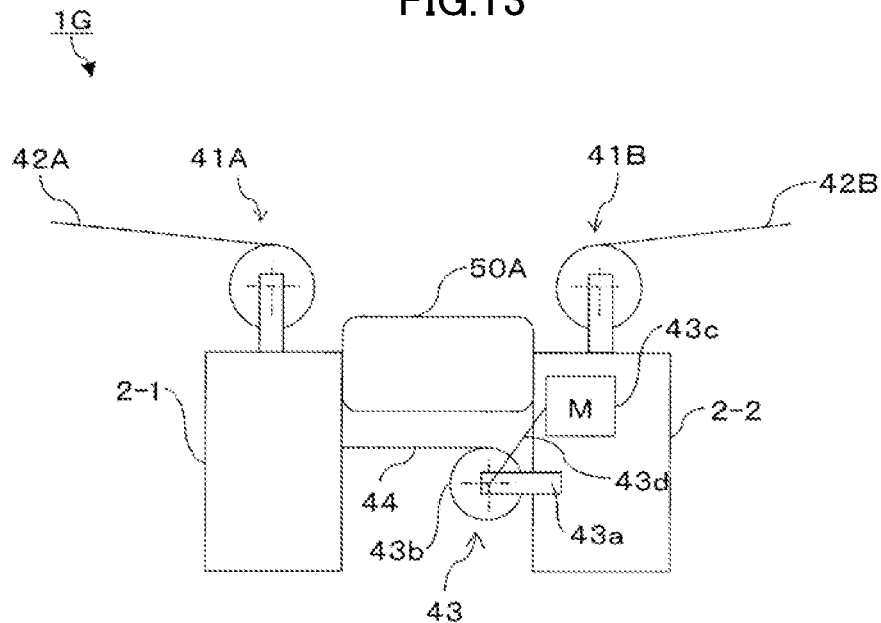
FIG. 13 is a schematic side view showing an entire structure of a conveying device according to a ninth embodiment of the present invention.

FIG. 13 is a schematic side diagram showing the entire structure of the conveying device according to the ninth embodiment of the present invention.

Like reference numbers designate the same or substantially same elements as the foregoing embodiments, so repetitious description is omitted here. FIG. 13 omits illustration of the controller, the motors that drive the conveying winches, and the battery, and the wires 42A and 42B are fixed to columns outside the drawing.

The conveying device 1G includes a divided body 2-1 having the top face on which the conveying winch 41A is disposed, a divided body 2-2 having the top face on which the conveying winch 41B is disposed an intermediate winch 43 serving as a distance adjusting mechanism that adjusts the distance between the divided body 2-1 and the divided body 2-2, and a wire 44 wound around a drum 43b of the intermediate winch 43.

The intermediate winch 43 is disposed on a face of the divided body 2-2, which face is opposed to the divided body 2-1, and includes a pair of supporting frame 43a disposed on the opposed face, the drum 43b having the both ends rotatably supported by the supporting frames 43a, a power transmission mechanism 43d simplified in the drawing, and an electric motor (hereinafter, referred to as a "motor") 43c that rotates the drum 43b through the power transmission mechanism 43d.

One end of the wire 44 is fixed to a face of the divided body 2-1 opposed to the divided body 2-2 and the other end of the wire 44 is wound around the drum 43b.

The distance between the divided bodies 2-1 and 2-2 can be adjusted by adjusting an amount of winding the wire 44 around the intermediate winch 43, and the combination of the intermediate winch 43 and the wire 44 serves as the distance adjusting mechanism of the present invention.

The amount of winding the wire 44 is adjusted by a local forward rotation switch and a local reverse rotation switch that are provided to the conveying device 1G. The forward rotation switch and the reverse rotation switch are switches that rotate the electric motor 43c in the forward or reverse direction by predetermined amount according to a time for which the switch is turned on. Alternatively, the forward rotation switch and the reverse rotation switch may be remote switches.

[9-2. Actions and Effects]

The eighth embodiment of the present invention holds the conveying target 50A by sandwiching the conveying target 50A between the divided body 2-1 and the divided body 2-2 and adjusting the distance between the divided bodies 2-1 and 2-2 through appropriately winding the wire 44 around intermediate winch 43. Under a state of holding the conveying target 50A such as a parcel or an operation machine, the conveying device 1G can convey the conveying target 50A by activating the conveying winches 41A and 41B.

Since the distance between the divided bodies 2-1 and 2-2 can be adjusted so as to conform to the size of the conveying target 50A by appropriately adjusting an amount of winding the wire 44 by the intermediate winch 43, it is possible to hold and convey the conveying target 50A having various sizes.

[9-3. Miscellaneous]

(1) Alternatively, the conveying target 50A is not limited to an article, and alternatively may be a person. For this purpose, it is reasonable that the divided bodies 2-1 and 2-2 are each formed of a half-ring elastic member that makes it possible to easily hold a person by his/her waist. Specifically, it is conceivable that under a state where a crippled person with his/her feet on the ground sets the divided bodies 2-1 and 2-2 around his/her waist, the conveying winches 41A and 41B are activated to assist the person in walking.

(2) The intermediate winch 43 and the wire 44 of the conveying device 1G may be replaced with an air cylinder or a hydraulic cylinder. The distance between the divided bodies 2-1 and 2-2 can be adjusted by adjusting the amount of advancement and retraction of the drive rod of the air cylinder or the hydraulic cylinder forward or backward likewise the combination of the intermediate winch 43 and the wire 44, and consequently, the conveying target 50A can be held between the divided bodies 2-1 and 2-2 by being sandwiched between the divided bodies 2-1 and 2-2.

10. Tenth Embodiment

Hereinafter, specific description will now be made in relation to the conveying device of the tenth embodiment of the present invention with reference to FIG. 14.

Figure 14:
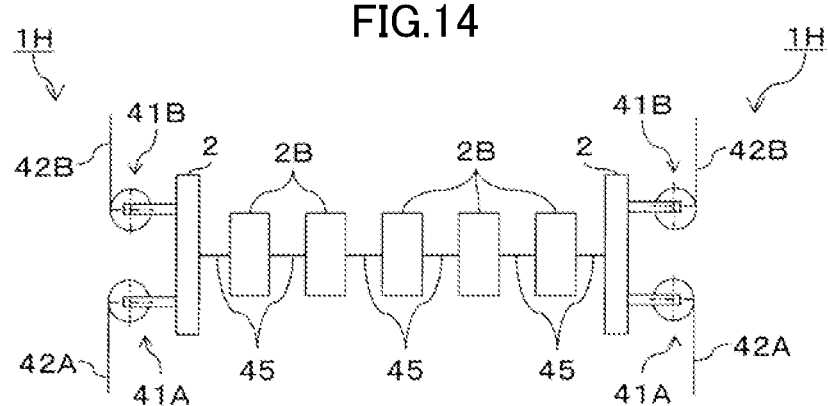
FIG. 14 is a schematic plan view showing an entire structure of a conveying device according to a tenth embodiment of the present invention.

FIG. 14 is a schematic plan view showing the entire structure of the conveying device according to the tenth embodiment of the present invention.

Like reference numbers designate the same or substantially same elements as the foregoing embodiments, so repetitious description is omitted here. FIG. 14 omits illustration of the controller, the motors that drive the conveying winches, and the battery, and the wires 42A and 42B are fixed to columns outside the drawing.

The conveying devices 1H of the present embodiment are used in a pair. Each conveying device 1H is configured by attaching the conveying winches 41A and 41B on a face of the movement body 2. The conveying winches 41A and 41B are arranged in such a posture that the axis lines of the conveying winches 41A and 41B are orientated to the vertical lines. The conveying device 1H on the left side of FIG. 14 orients the conveying winches 41A and 41B to the left, and the conveying device 1H on the right side orients the conveying winches 41A and 41B to the right.

Between the conveying devices 1H, multiple (five in the present embodiment) agricultural machines 2B are arranged side by side. The conveying devices 1H and the agricultural machines 2B are connected to one another by connector members 45.

With this configuration, moving multiple agricultural machines 2B at the same time by moving a pair of the conveying devices 1H in synchronization with each other can accomplish agricultural operation at a large area all at once.

The material and the shape of the connector members 45 are not limited as far as the connector members 45 are stiff enough to move the multiple agricultural machines 2B all together under a state where the connector members 45 connect the conveying devices 1H to the agricultural machines 2B, and therefore the shape of the connector members 45 may be wires or bars.

11. Eleventh Embodiment

[11-1. Structure of Conveying Device]

Hereinafter, specific description will now be made in relation to the conveying device of the eleventh embodiment of the present invention with reference to FIG. 15.

Figure 15:
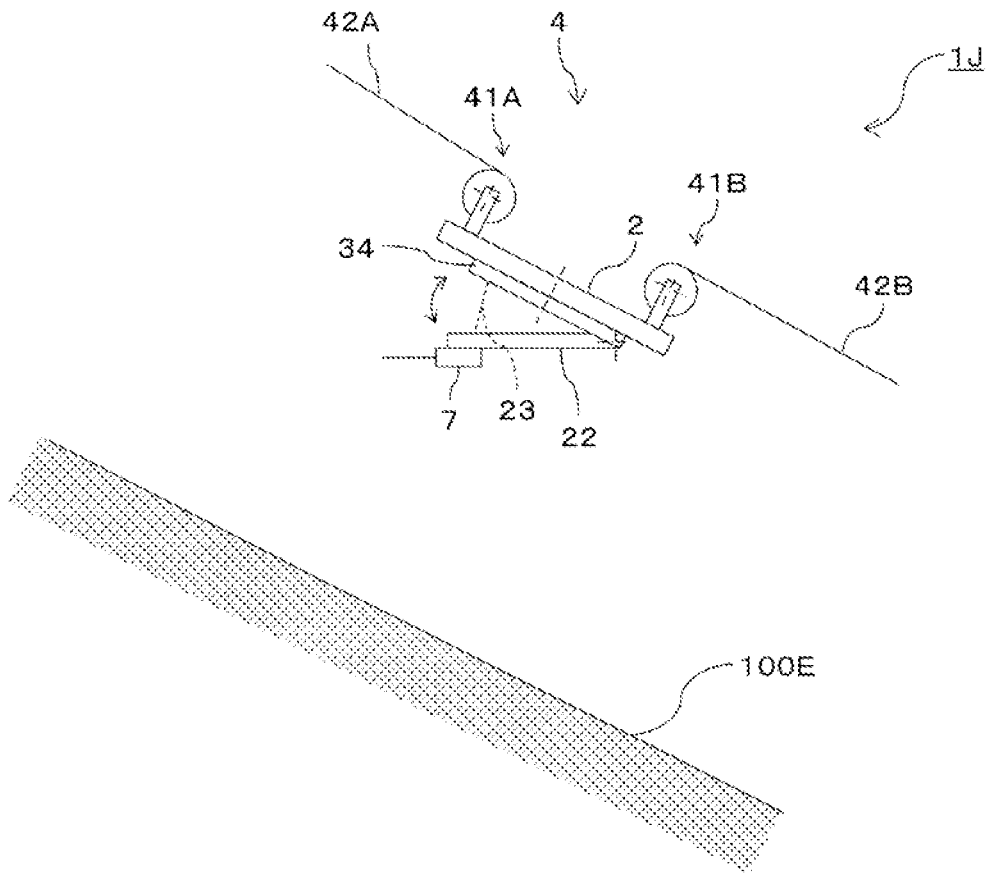
FIG. 15 is a schematic side view showing an entire structure of a conveying device according to an eleventh embodiment of the present invention.

FIG. 15 omits illustration of the controller, the motors that drive the conveying winches, and the battery, and the wires 42A and 42B are fixed to columns outside the drawing.

FIG. 15 is a schematic side view showing the entire structure of the conveying device 1J according to the eleventh embodiment of the present invention.

The conveying device 1J is configured to include the movement body 2, the conveying mechanism 4, the turntable 34 fixed to the bottom face of the movement body 2 so as to be horizontally rotatable, a swinging body 22 attached to the bottom face of the turntable 34, an actuator 23 interposed between the turntable 34 and the swinging body 22, and a limbing chainsaw 7 attached to the distal end of the bottom face of the swinging body 22. FIG. 15 omits illustration of a tree growing on the ground 100E.

The conveying device 1J is arranged against an inclined ground 100E. For the above, the wires 42A and 42B of the conveying mechanism 4 are hung at the inclination along the inclined face 100E, and accordingly, the movement body 2 supported in a state of being hung in the air by the wires 42A and 42B is also in an inclined posture.

The swinging body 22 takes the shape of a flat plate and is swingably attached, at the proximal end part, to the turntable 34 so as to be opposed to the turntable 34. Being simplified and illustrated by a one-dotted line in FIG. 15, the actuator 23 has a main body attached to the turntable 34 and has a distal end of a drive rod that moves forward to and backward from the main body, the distal end being attached to a point near to the swinging end of the swinging body 22. The amount of advancement and retraction of the drive rod of the actuator 23 is determined on the basis of a result of detection by a non-illustrated tilt sensor, so that the swinging body 22 and the chainsaw 7 can be retained at a desired tilt posture. In the present embodiment, the posture of the swinging body 22 is retained to the horizontal posture that is suitable for the operation of the chainsaw 7. The tilt angle of the desired tilt posture of the swinging body 22 is appropriately set in accordance with the operation and the circumstance and should by no means be limited to a particular angle.

[11-2. Actions and Effects]

The present embodiment can keep the posture of the chainsaw 7 attached to the swinging body 22 to a desired posture irrespective of the slope angle of the ground 100E on which the conveying device 1J is installed, so that the operation can be efficiently accomplished by the chainsaw 7.

[11-3. Miscellaneous]

(1) In the above eleventh embodiment, the conveying device 1J is made to be in a state of being hung in the air for the purpose of limbing with the chainsaw 7. Alternatively, a mower provided with wheels may be fixed to the bottom face of the swinging body 22 and may be caused to travel on the ground 100E. In this alternative, the actuator 23 may be replaced with an elastic member exemplified by a spring and interposed, being in a compressed state, between the turntable 34 and the swinging body 22. This elastically depresses the swinging body 22 onto the ground 100E, so that the swinging body 22 and the mower tilt at an angle conform to the inclination of the ground 100E. In this case, the tilt sensor is not necessary.

(2) In the eleventh embodiment, the swinging body 22 is indirectly installed to the movement body 2, being interposed by the turntable 34. Alternatively, the swinging body 22 may be directly installed to the movement body 2, omitting the turntable 34.

(3) A polisher may be attached to the bottom face of the swinging body 22 in place of the chainsaw 7 and may clean the surface of solar light panels being tilted on the roof of a house or and solar power facilities.

12. Twelfth Embodiment

Hereinafter, specific description will now be made in relation to the conveying device of the twelfth embodiment of the present invention with reference to FIG. 16.

Figure 16:
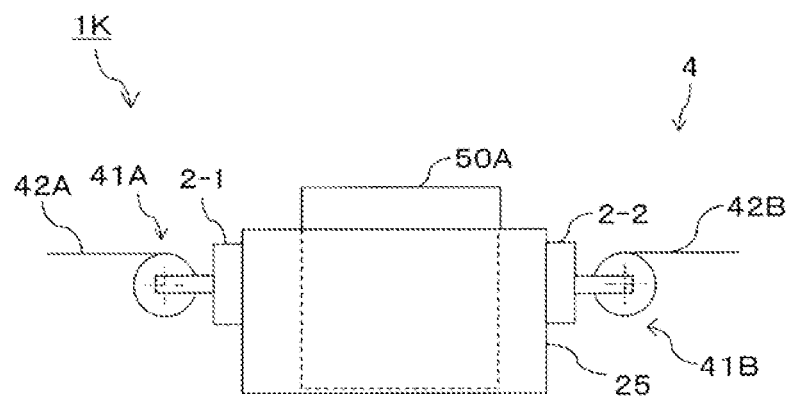
FIG. 16 is a schematic side view showing an entire structure of a conveying device according to a twelfth embodiment of the present invention.

FIG. 16 is a schematic side view showing the entire structure of the conveying device according to the twelfth embodiment of the present invention.

Like reference numbers designate the same or substantially same elements as the foregoing embodiments, so repetitious description is omitted here. FIG. 16 omits illustration of the controller, the motors that drive the conveying winches, and the battery, and the wires 42A and 42B are fixed to columns outside the drawing.

The conveying device 1K includes a box 25 having the front, rear, left, right, and bottom walls and having an opened ceiling, the divided bodies 2-1 and 2-2 provided to the front and rear face of the box 25, and the conveying winches 41A and 41B disposed on the divided bodies 2-1 and 2-2, respectively. The conveying target 50A is accommodated in the box 25.

The box 25 may be replaced with a container having a ceiling wall in addition to the front, rear, left, right, and bottom walls and having a door to bring the conveying target 50A in.

13. Thirteenth Embodiment

Hereinafter, specific description will now be made in relation to the conveying device of the thirteenth embodiment of the present invention with reference to FIGS. 17A and 17B.

Figure 17A:
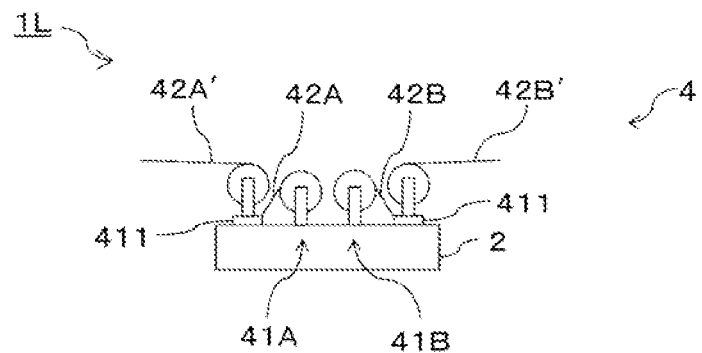
FIGS. 17A and 17B are schematic side views showing an entire structure of a conveying device according to a thirteenth embodiment of the present invention.
Figure 17B:
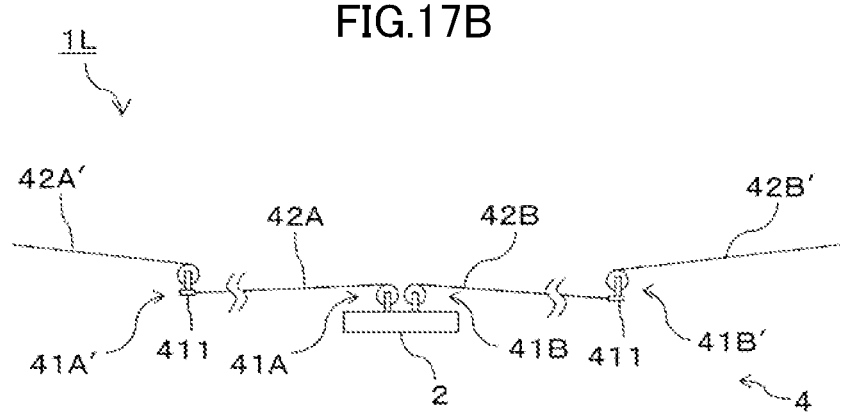

FIGS. 17A and 17B are schematic side views showing the entire structure of the conveying device according to the thirteenth embodiment of the present invention.

Like reference numbers designate the same or substantially same elements as the foregoing embodiments, so repetitious description is omitted here. FIGS. 17A and 17B omit illustration of the controller, the motors that drive the conveying winches, and the battery, and the wires 42A' and 42B' are fixed to columns outside the drawing.

The conveying device 1L further includes auxiliary winches 41A' and 41B' outward of the conveying winches 41A and 41B on the movement body 2. The auxiliary winches 41A' and 41B' can be detached from the movement body 2 at their respective mounts 411, and to the mounts 411, the distal ends of the wires 42A and 42B wound around the conveying winches 41A and 41B are fixed.

With this configuration, when the conveying device 1L is to be used, the auxiliary winches 41A' and 41B' are detached from the movement body 2, the wires 42A and 42B are also forwarded from the conveying winches 41A and 41B and the wires 42A' and 42B' are further forwarded from the auxiliary winches 41A' and 41B'. By fixing the distal ends of the wires 42A' and 42B' to non-illustrated supporting bodies, the wires 42A, 42B, 42A', and 42B' are suspended between the supporting bodies, so that the conveying device 1L is set to be ready for use.

In some application environment, the distance between the supporting bodies is too long to suspend only the wires 42A and 42B of the conveying winches 41A and 41B, so that that wires are not suspended between the supporting bodies. In this case, using the wires 42A' and 42B' of the auxiliary winches 41A' and 41B' makes it possible to suspend wires between the supporting bodies.

It is preferable that the wires 42A and 42B of the conveying winches 41A and 41B can be detached from the mounts 411 of the auxiliary winches 41A' and 41B' by a single action. This makes it possible to fix the wires 42A and 42B directly to the supporting bodies when the auxiliary winches 41A' and 41B' are not required.

14. Fourteenth Embodiment

[14-1. Structure of Conveying Device]

Hereinafter, specific description will now be made in relation to the conveying device of the fourteenth embodiment of the present invention with reference to FIG. 18.

Figure 18:
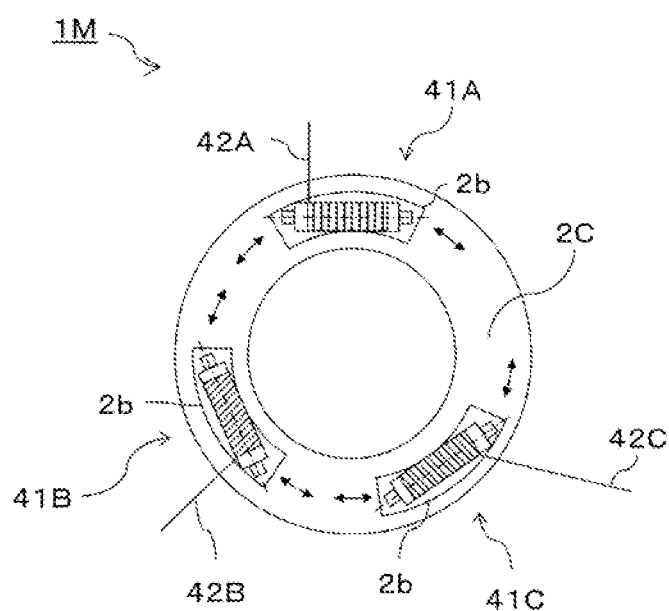
FIG. 18 is a schematic plan view showing a main structure of a conveying device according to a fourteenth embodiment of the present invention.

FIG. 18 is a schematic plan view showing the main structure of the conveying device 1M according to the fourteenth embodiment of the present invention.

Like reference numbers designate the same or substantially same elements as the foregoing embodiments, so repetitious description is omitted here. FIG. 18 omits illustration of the controller, the motors that drive the conveying winches, and the battery.

The conveying device 1M has a structure that conveying winches 41A, 41B, and 41C are arranged on the top face of the movement body (main movement body) 2C formed of a ring-form plate. The distal ends of wires 42A, 42B, and 42C wound around the conveying winches 41A, 41B, and 41C are fixed to non-illustrated respective supporting bodies.

The conveying winches 41A, 41B, and 41C are fixed to respective arc-shaped base plates 2b. The base plates 2b are movable on the movement body 2C by manually or by a driving device along the circumference direction of the movement body 2C. This can change the installing position of the conveying winches 41A, 41B, and 41C on the movement body 2C. When the base plates 2b are moved by one or more driving devices, the driving devices may be moved by remote operation.

The movement body 2 is attached to the ceiling face of a conveying target of which unlimited examples are a mower and carriage.

Alternatively, the movement body 2C may be attached to the conveying target by arranging the conveying target at a hollow formed on the center of the movement body 2C, or the conveying target may be placed on the movement body 2C. In these alternatives, the conveying winches 41A, 41B, and 41C and the base plates 2b may be attached to the different positions such as the bottom face or a side face of the movement body 2C from the above example.

[14-2. Actions and Effects]

The present embodiment can adjust the moving route of the movement body 2C by appropriately adjusting the respective positions of the conveying winches 41A, 41B, and 41C on the movement body 2C.

15. Fifteenth Embodiment 15-1. Structure of Conveying Device

Hereinafter, specific description will now be made in relation to the conveying device of the fifteenth embodiment of the present invention with reference to FIG. 19.

Figure 19:
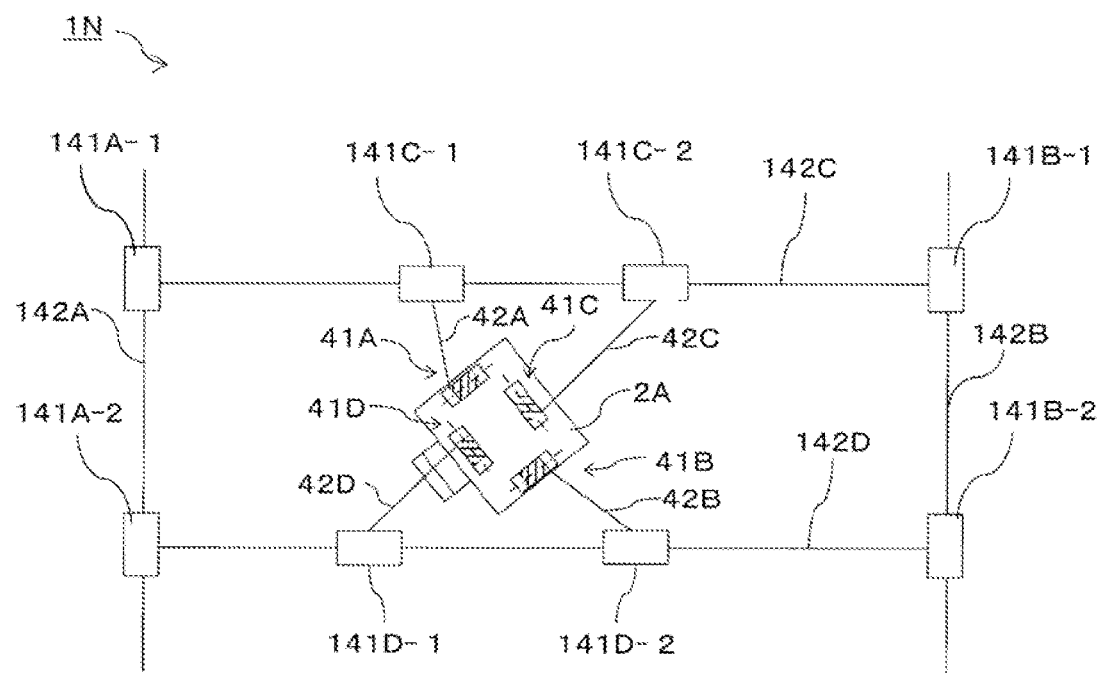
FIG. 19 is a schematic plan view showing a structure of a conveying device according to a fifteenth embodiment of the present invention.

FIG. 19 is a schematic plan view showing the main structure of the conveying device 1N according to the fifteenth embodiment of the present invention.

Like reference numbers designate the same or substantially same elements as the foregoing embodiments, so repetitious description is omitted here. FIG. 19 omits illustration of the controller, the motors that drive the conveying winches, and the battery.

The conveying device 1N has a structure that conveying winches 41A, 41B, 41C, and 41D are arranged on the top face of the mower 2A and trolleys 141A-1, 141A-2, 141B-1, 141B-2, 141C-1, 141C-2, 141D-1, and 141D-2 are provided.

The trolleys 141A-1 and 141A-2 travel on a wire 142A supported by a non-illustrated supporting body, and the trolley 141B-1 and 141B-2 travel on a wire 142B being parallel with the wire 142A and being supported by a non-illustrated supporting body. The wire 142C is spans on the trolleys 141A-1 and 141B-1 so as to cross the wires 142A and 142B; the wire 142D spans on the trolleys 141A-2, 141B-2; the trolley 141C-1 and the trolley 141C-2 travel on the wire 142C; and the trolley 141D-1 and the trolley 141D-2 travel on the wire 142D. Furthermore, the distal ends of the wire 42A, 42B, 42C, and 42D wound around the conveying winches 41A, 41B, 41C, and 41D are fixed to the trolleys 141C-1, 141D-2, 141C-2, and 141D-1.

[15-2. Actions and Effects]

The present embodiment complexly change the positions of the wires 42A, 42B, 42C, and 42D that directly determine the traveling path of the mower 2A by traveling of the trolleys 141A-1, 141A-2, 141B-1, 141B-2, 141C-1, 141C-2, 141D-1, and 141D-2, so that the mower 2A can move precisely and intricately.

16. Sixteenth Embodiment

[16-1. Structure of Conveying Device]

Hereinafter, specific description will now be made in relation to the conveying device of the sixteenth embodiment of the present invention with reference to FIG. 20.

Figure 20:
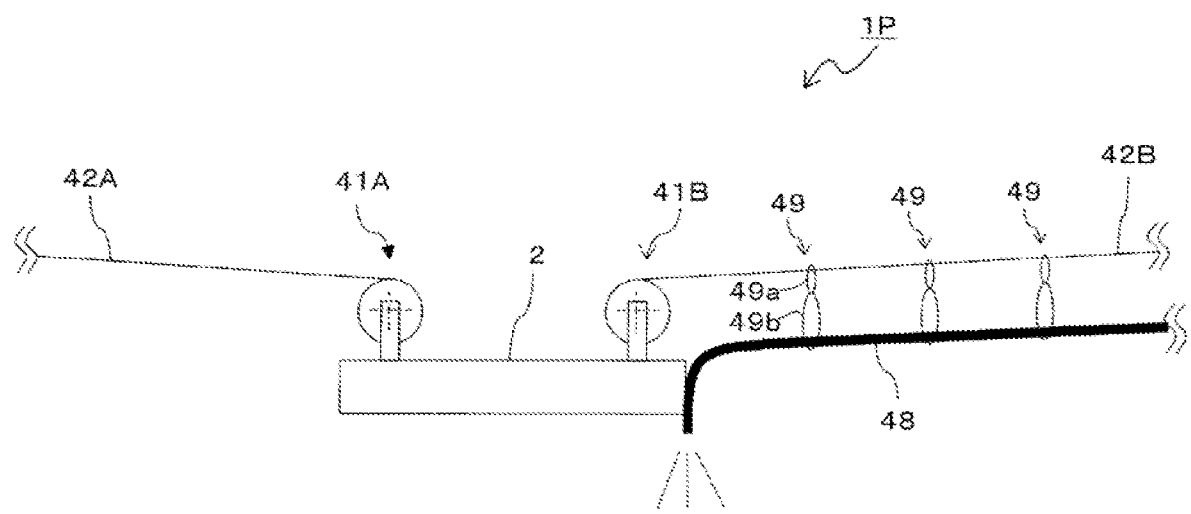
FIG. 20 is a schematic side view showing a structure of a conveying device according to a sixteenth embodiment of the present invention.

FIG. 20 is a schematic side view showing the structure of the conveying device 1P according to the sixteenth embodiment of the present invention.

Like reference numbers designate the same or substantially same elements as the foregoing embodiments, so repetitious description is omitted here. FIG. 20 omits illustration of the controller, the motors that drive the conveying winches, and the battery.

The conveying device 1P arranges the conveying winches 41A and 41B on the top face of the movement body 2 in parallel with each other such that their respective forwarding directions of the wires 42A and 42B are opposite to each other. The wires 42A and 42B have the distal ends supported by non-illustrated supporting bodies likewise the foregoing embodiments.

To the wire 42B, multiple guiding fittings 49 are attached. Each guiding fitting 49 takes a form like a snowman that connects a small ring 49a to a large ring 49b. Through the rings 49a, the wire 42B is inserted and, through the rings 49b, a hose (conveying target) 48 is inserted. With this configuration, the hose 48 is supported by the wire 42B through the guiding fittings 49 and also moves while being guided along the wire 42B by the guiding fittings 49. The distal end of the wire 42B is fixed to the end face of the movement body 2. In the present embodiment, the hose 48 lets the water flow therethrough and has a proximal end is connected to a non-illustrated water supplying source (e.g., a faucet of a waterway). Alternatively, a spraying nozzle may be attached to the distal end of the hose 48.

[16-2. Actions and Effects]

The present embodiment can move the distal end of the hose 48, i.e., the water supplying opening, together with the movement body 2, so that water can be supplied to a wide range of a land area such as a farm area, for example.

[16-3. Miscellaneous]

(1) The hose 48 may be replaced with an accordion pipe. In this alternative, the accordion pipe stretches and shrinks in accordance with the movement of the movement body 2.

(2) The above embodiment describes that water is to be supplied. The liquid to be supplied is not limited to water and may alternatively be, for example, pesticide or air for pruning and harvesting fruit.

(3) The conveying device 1P may be scaled up and the hose 48 may be replaced with a cylindrical body large enough to let people pass through the inside. This makes the inner space of the cylindrical body to serve as a pedestrian space, which can be extended to an appropriate point by using the conveying device 1P. In this alternative, a plate member serving as a scaffolding may be provided beneath the inner space of the cylindrical body. The plate member is supported by the rings 49*b*.

(4) Alternatively, supplying a fluid through the hose 48 may be replaced by sucking a fluid with the hose 48. For example, the conveying device 1P may be used as a cleaner (dust collector) or a water absorbing device.

17. Seventeenth Embodiment

Hereinafter, specific description will now be made in relation to the conveying device 1Q of the seventeenth embodiment of the present invention with reference to FIGS. 21 and 22.

Figure 21:
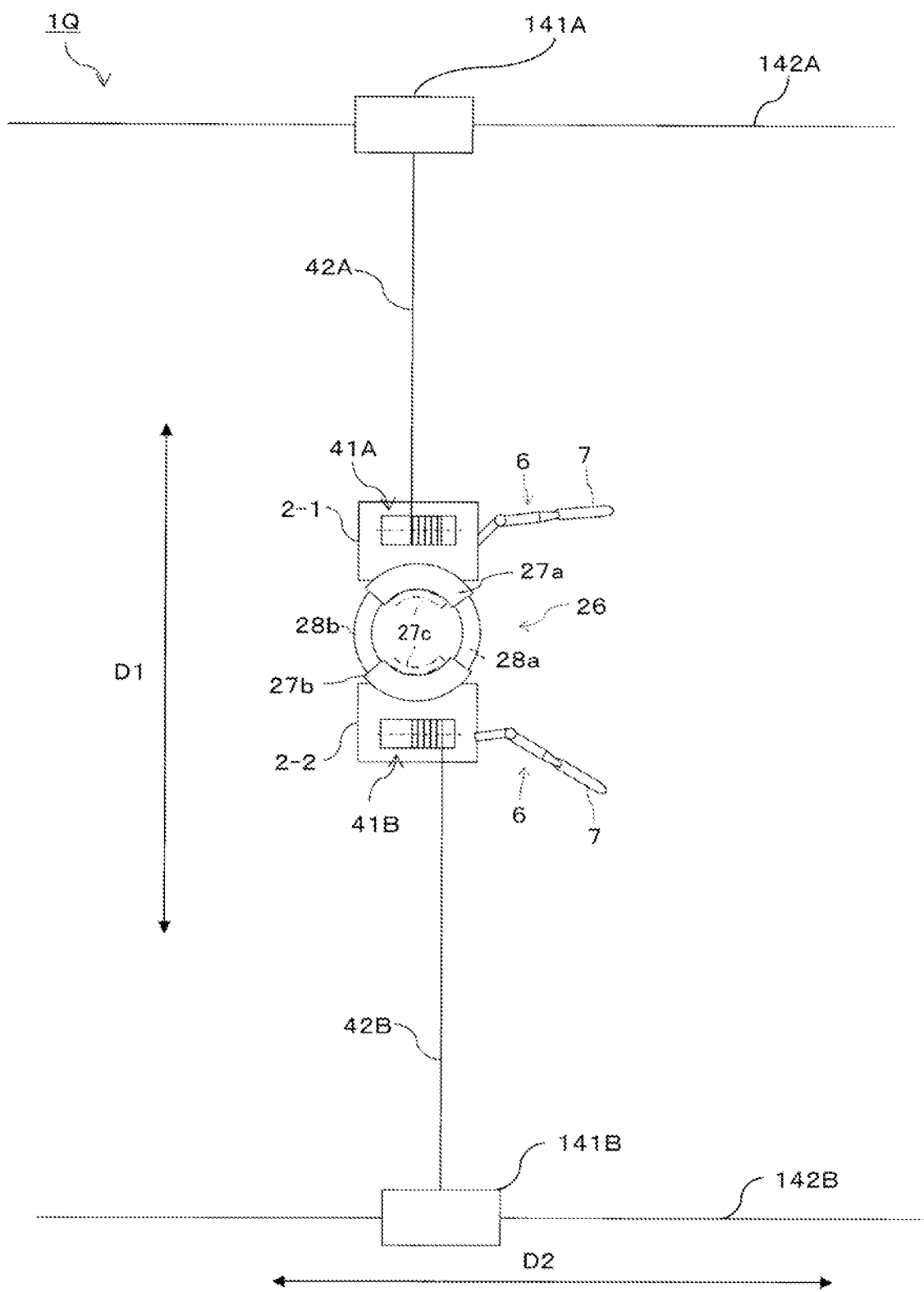
FIG. 21 is a schematic plan view showing a structure of a conveying device according to a seventeenth embodiment of the present invention.

FIG. 21 is a schematic plan view showing the structure of the conveying device 1Q according to the seventeenth embodiment of the present invention.

FIGS. 22A, 22B, 22C, and 22D are schematic main-part plan views showing the operation of the conveying device 1Q according to the seventeenth embodiment of the present invention.

Like reference numbers designate the same or substantially same elements as the foregoing embodiments, so repetitious description is omitted here. FIGS. 21 and 22A-22D omit illustration of the controller, the motors that drive the conveying winches, and the battery, and the wires 142A and 142B are fixed to columns outside the drawing.

[17-1. Structure of Conveying Device]

The conveying device 1Q conveys the divided bodies 2-1 and 2-2 being in a state of being hung in the air. As illustrated in FIG. 21, the conveying device 1Q includes divided bodies 2-1 and 2-2, a connector mechanism 26 that engages the divided body 2-1 with the divided body 2-2, the conveying winches 41A and 41B arranged on the divided bodies 2-1 and 2-2, respectively, the wires 42A and 42B, and the trolleys 141A and 141B. To each of the divided bodies 2-1 and 2-2, a robot arm 6 having the distal end fixed thereto a chainsaw 7 is attached.

Adjusting amounts of winding wires 42A and 42B of the conveying winches 41A and 41B in cooperation with each other can move the divided bodies 2-1 and 2-2 together with each other in the first direction D1 (i.e., the top-to-bottom direction of the drawing of FIG. 21). The trolleys 141A and 141B travel on the wires 142A and 142B extending in the second direction D2 (i.e., the left-to-right direction of the drawing of FIG. 21) crossing the wires 42A and 42B, and fixed thereto the distal ends of the wires 42A and 42B, respectively. With this configuration, the trolleys 141A and 141B convey the divided bodies 2-1 and 2-2 in the second direction D2.

The divided bodies 2-1 and 2-2 are arranged along the first direction D1 so as to be spaced apart from each other. The connector mechanism 26 is arranged at the space.

The connector mechanism 26 includes a pair of base members 27*a* and 27*b* opposed to each other, and arm members 28*a* and 28*b* arranged at the spaces between the base members 27*a* and 27*b*. The base members 27*a* and 27*b* and the arm members 28*a* and 28*b* each take a shape of an arc and the connector mechanism 26 takes a shape of a ring as a whole.

The base members 27*a* and 27*b* are fixed to the top faces of the divided bodies 2-1 and 2-2, respectively, at the center portions in the circumference direction thereof. The arm member 28*a* is inserted into the distal end (the right end in FIG. 21) of the base member 27*a* and is moved forward and backward from the base member 27*a* by a non-illustrated driving mechanism, and in the stretched state as shown in FIG. 21, the distal end of the arm member 28*a* is placed into the end (the right end in FIG. 21) of the base member 27*b*, so that the arm member 28*a* comes into a connected state. Likewise, the arm member 28*b* is inserted into the distal end (the left end in FIG. 21) of the base member 27*b* and is moved forward and backward from the base member 27*b* by a non-illustrated driving mechanism, and in the stretched state as shown in FIG. 21, the distal end of the arm member 28*b* is placed into the end (the right end in FIG. 21) of the base member 27*a*, so that the arm member 28*b* comes into the connected state. This means that two connector units are provided to the connector mechanism 26 which connector units are spaced apart along the second direction D2.

The driving mechanism of the arm members 28*a* and 28*b* are remotely operated by an operation terminal.

[17-2. Actions and Effects]

As shown in FIGS. 22A-22D, in cases where an obstacle is present ahead along the forward direction indicated by a white arrow, the conveying device 1Q can be operated by the remote operation manually made by an operator in the following manner.

As illustrated in FIG. 22A, in cases where the operator confirms the presence of an obstacle 300 in the forwarding direction, the operator makes the front arm member 28*a* to be in a retracted state through a remote operation, so that a space through which the obstacle 300 can pass is formed at a front portion of a space between the divided bodies 2-1 and 2-2. Since the base members 27*a* and 27*b* are connected to each other via the arm member 28*b*, so that the connected state of the divided bodies 2-1 and 2-2 is kept under this state.

Then when confirming that the conveying device 1Q further moves forward and the obstacle 300 enters the inside the arc shape of the connector mechanism 26 as shown in FIG. 22B, the operator makes the arm member 28*a* to be in a stretched state and thereby the divided bodies 2-1 and 2-2 is connected to each other by an arm member 28*a* in addition to the arm member 28*b* through a remote operation. Then when confirming the completion of connection of the divided bodies 2-1 and 2-2 by stretching the arm member 28*a*, the operator rapidly makes the rear arm member 28*b* to be in a retracted state through a remote operation as shown in FIG. 22C, so that a space through which the obstacle 300 can pass is formed at a rear portion of a space between the divided bodies 2-1 and 2-2.

When conforming the conveying device 1Q further moves forward and the connector mechanism 26 completely passes the obstacle 300, the operator makes the rear arm member 28*b* to be in a stretched state as shown in FIG. 22D, and thereby the divided bodies 2-1 and 2-2 is tightly connected to each other by the arm members 28*a* and 28*b* through a remote operation. Thereby, the conveying device 1Q is completed to pass the obstacle 300.

Accordingly, the present invention can limb without intermission even if the obstacle 300 is present ahead in the forwarding direction.

[17-3. Miscellaneous]

(1) The above embodiment conveys the divided bodies 2-1 and 2-2 being in a state of being hung in the air. Alternatively, the conveying device 1Q may provide wheels to the divided bodies 2-1 and 2-2 and cause the divided bodies 2-1 and 2-2 to run on the ground with the wheels, being accompanied by the conveying by the conveying winches 41A and 41B and the trolleys 141A and 141B.

(2) The conveying device 1Q shown in FIG. 21 provides, between the trolleys 141A and 141B, a single set of a part (hereinafter referred to as an "operational body") formed of the divided bodies 2-1 and 2-2, the connector mechanism 26 that connects the divided bodies 2-1 and 2-2 to each other, the conveying winches 41A and 41B provided to the divided bodies 2-1 and 2-2, respectively, and the wires 42A and 42B. Alternatively, as illustrated in FIG. 23, multiple sets of operational bodies may be arranged, between the trolleys 141A and 141B, in parallel to one another and may be run along the second direction D2 by the trolley 141A and 141B.

Figure 23:
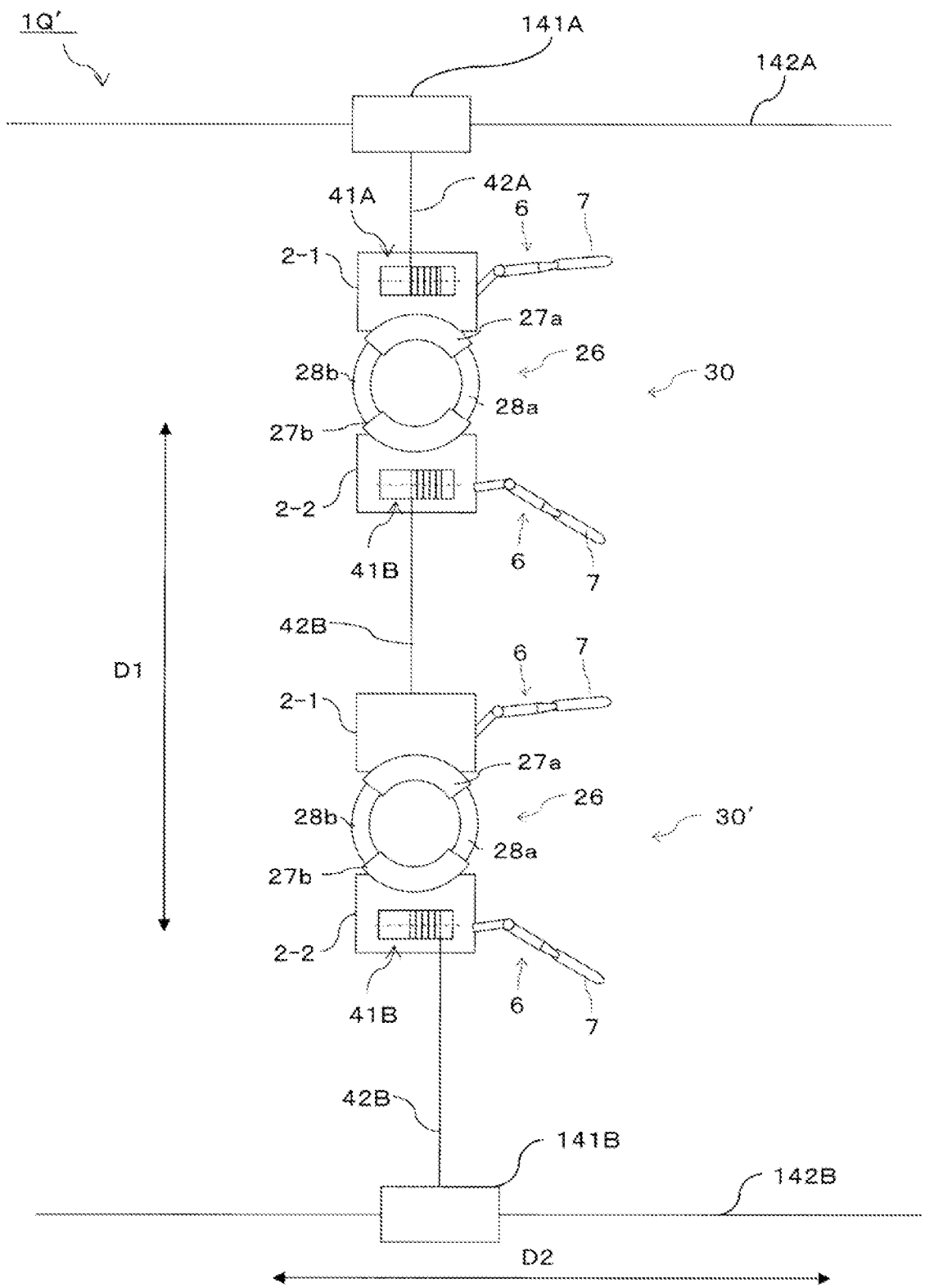
FIG. 23 is a schematic plan view showing a structure of a conveying device according to a modification to the seventeenth embodiment of the present invention.

FIG. 23 is a schematic plan view showing the structure according to a modification. Like reference numbers designate the same or substantially same elements as the foregoing embodiments, so repetitious description is omitted here. FIG. 23 omits illustration of the controller, the motors that drive the conveying winches, and the battery, and the wires 142A and 142B are fixed to columns outside the drawing.

The example of FIG. 23 includes the operational body 30 provided with the conveying winches 41A and 41B and an operational body 30' provided only with the conveying winch 41B. The operational bodies 30 and 30' are connected to each other by the wire 42B of the operational body 30. The example of FIG. 23 shows the configuration provided with two sets of the operational bodies. However, the number of operational bodies is not particularly limited and may be three or more as far as at least one set of an operational body provided with multiple winches are provided among the multiple operational bodies.

Further alternatively, ropes may be hung from pulleys movably attached to the wires 42A and 42B and self-propelled operational devices may be supported by the ropes. Such a suspension-type operational device is exemplified by a movable operational device, the mower disclosed in International Publication Pamphlet No. 2014/175197. Here, the number of suspension-type operational devices are not particularly limited.

The structures illustrated in FIGS. 21, 22A-22D, and 23, the conveying devices 1Q and 1Q' move the operational bodies 30 and 30' in the front-to-rear and left-to-right. But, the directions in which the operational bodies 30 and 30' are moved are not limited to this. Alternatively, the operational bodies 30 and 30' may be moved in the vertical direction. Such a structure can be achieved by the structures when FIGS. 22A-22D and 23 are regarded as side views.

(3) To the structure illustrated in FIGS. 21 and 22A-22D, a pair of arc-shaped holding pads 27c illustrated by two-dotted broken lines in FIGS. 21 and 22B may further be provided. The holding pads 27c are provided one to each of the base members 27a and 27b via non-illustrated actuators. The holding pads 27c can approach or separate from each other by activating the actuators in synchronization with each other. The holding pads 27c are usually stand-by state in which the holding pads 27c are separate from each other as shown in FIG. 21, but assuming that the obstacle 300 of FIG. 22B is replaced with a limbed tree, the limbed tree can be conveyed by approaching the holding pads 27c each other to gripped and convey the limbed tree. The trees may be limbed by a limbering device mounted on the conveying device 1Q or by an operator manually made with a device different from the conveying device 1Q.

18. Eighteenth Embodiment

[18-1. Structure of Conveying Device]

Hereinafter, specific description will now be made in relation to the conveying device 1R of the eighteenth embodiment of the present invention with reference to FIGS. 24A-24B.

Figure 24A:
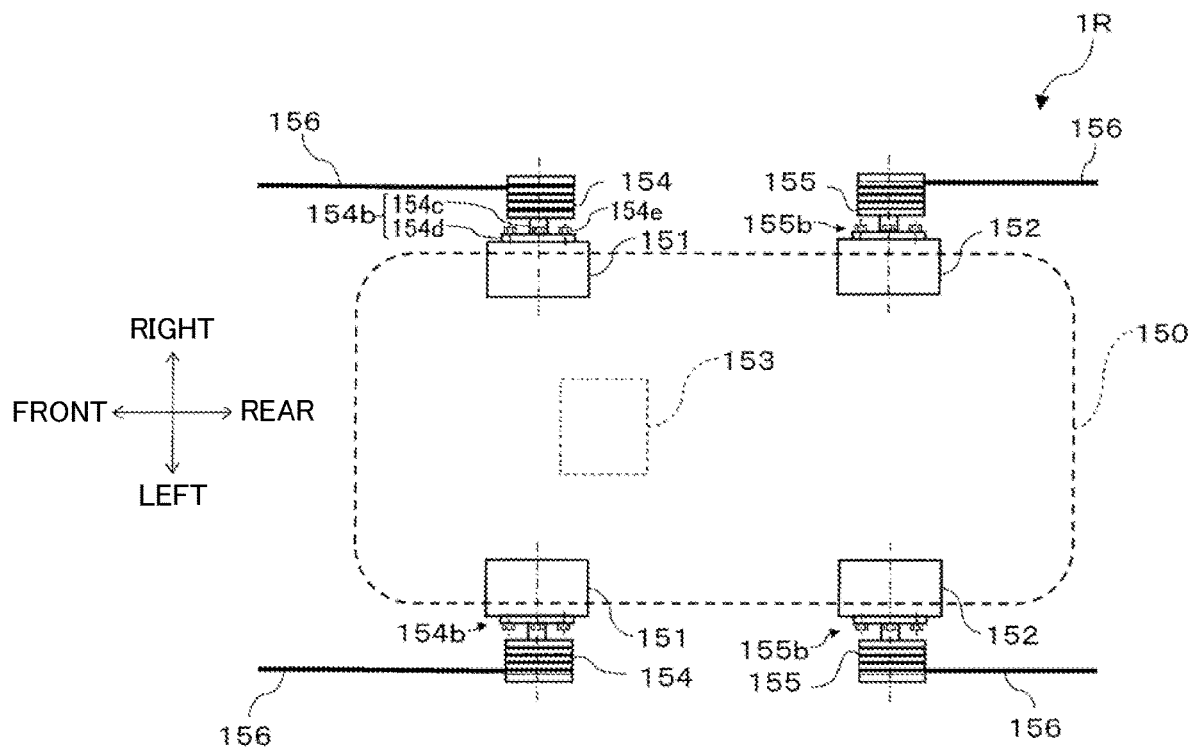
FIGS. 24A and 24B are schematic diagrams showing a structure of a conveying device according to an eighteenth embodiment of the present invention, FIG. 24A being a plan view, and FIG. 24B being a side view.
Figure 24B:
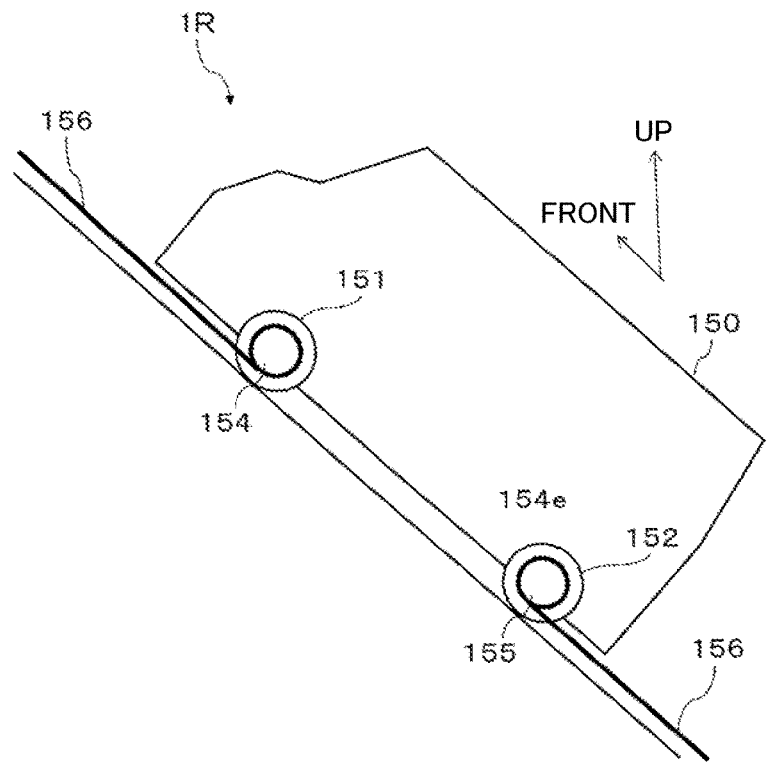

FIGS. 24A-24B are schematic diagrams showing the structure of the conveying device 1R according to the eighteenth embodiment of the present invention. FIG. 24A is a plan view, and FIG. 24B is a side view. For convenience, the vehicle body and the engine are illustrated by the broken lines in FIG. 24A.

The conveying device 1R of the present embodiment is configured to be integrated with a vehicle body (traveling member, main movement body) of an automobile. Specifically, the conveying device 1R includes a vehicle body 150, a pair of right and left front wheels 151, a pair of right and left rear wheels 152, an engine 153, a pair of left and right drums 154, and a pair of left and right drums 155, and wires (cables) 156 wound one around each of the drums 154 and 155. The distal ends of each wires 156 are connected to columns outside the drawings.

The drums 154 are fixed to the front wheels 151 via attachment fittings 154b and the drums 155 are fixed to the rear wheels 152 via attachment fittings 155b. The attachment fittings 154b and 155b have the same structure, so description will now be representatively made in relation to the attachment fitting 154b. The attachment fitting 154b includes a shaft member 154c coaxially fixed to the drum 154 and a disc member 154d coaxially fixed to the shaft member 154c, the shaft member 154c and the disc member 154d being integrated with one another. The disc member 154d is coaxially fixed to a wheel 151 by using wheel bolts 154e of the wheel 151.

In the present embodiment, the vehicle is configured to be a four-wheel drive vehicle in which the four wheels 151, 151, 152, and 152 are driven by an engine 153. The drums 154 and 155 fixed to the wheels 151 and 152 are rotated together with the wheels 151 and 152 by the engine 153. Accordingly, the engine 153 serves as a driving device of the present invention that rotates the drums 154 and 155 via the wheels 151 and 152, and the combination of the drums 154 and 155 and the engine 153 serves as the winches of the present embodiment.

Here, the direction of winding the wire 156 around the drum 154 of each front wheel 151 is different from that around the drum 155 of each rear wheel 152. Specifically, in the left side view of FIG. 24B, the wire 156 is clockwise wound around the drum 154 from the base end fixed to each drum 154 to the distal end fixed to the column outside the drawing, and the wire 156 is unclockwise wound around each drum 155 from the base end to the distal end.

With this configuration, while the vehicle is moving forward (i.e., while the wheels 151 and 152 are unclockwise rotating in the left-side view of FIG. 24B), the front drums 154 wind the wires 156 and the rear drums 155 forward the wires 156 to forward convey the vehicle body 150 in synchronization with the forward movement of the vehicle. Likewise, while the vehicle is running backward (i.e., while the wheels 151 and 152 are clockwise rotating in the left-side view of FIG. 24B), the drums 154 forward the wires 156 and the drums 155 wind the wires 156, to backward convey the vehicle body 150 in synchronization with the backward movement of the vehicle.

An on-board ECU (not shown) controls the operation of the engine 153 in accordance with, for example, an amount of depressing an acceleration pedal and consequently, also the operation of the drums 154 and 155, and further the position of the vehicle body 150 moved by the conveying device 1R are controlled. Thereby, the on-board ECU serves as the controller of the present invention.

[18-2. Actions and Effects]

The eighteenth embodiment of the present invention integrates the conveying device 1R with the vehicle body. This configuration brings the following effects in addition to the effects of the foregoing embodiments.

For example, when the vehicle runs up and down along the steep slope as illustrated in FIG. 24B, it is generally difficult for the vehicle to stably run on such a slope. According to the present embodiment, the conveying by the conveying device 1R assists the running of the vehicle and the vehicle can be towed and be descended while the wires are hanging the vehicle, so that the vehicle can stably run, avoiding from falling and rolling over.

The vehicle body 150 can stably ascend or descend conveying the vehicle body 150 by drums 154 and 155, not using the wheels 151 and 152 for running, under a state where the wires 156 suspend and hang the vehicle in the air.

[18-3. Miscellaneous]

Figure 25:
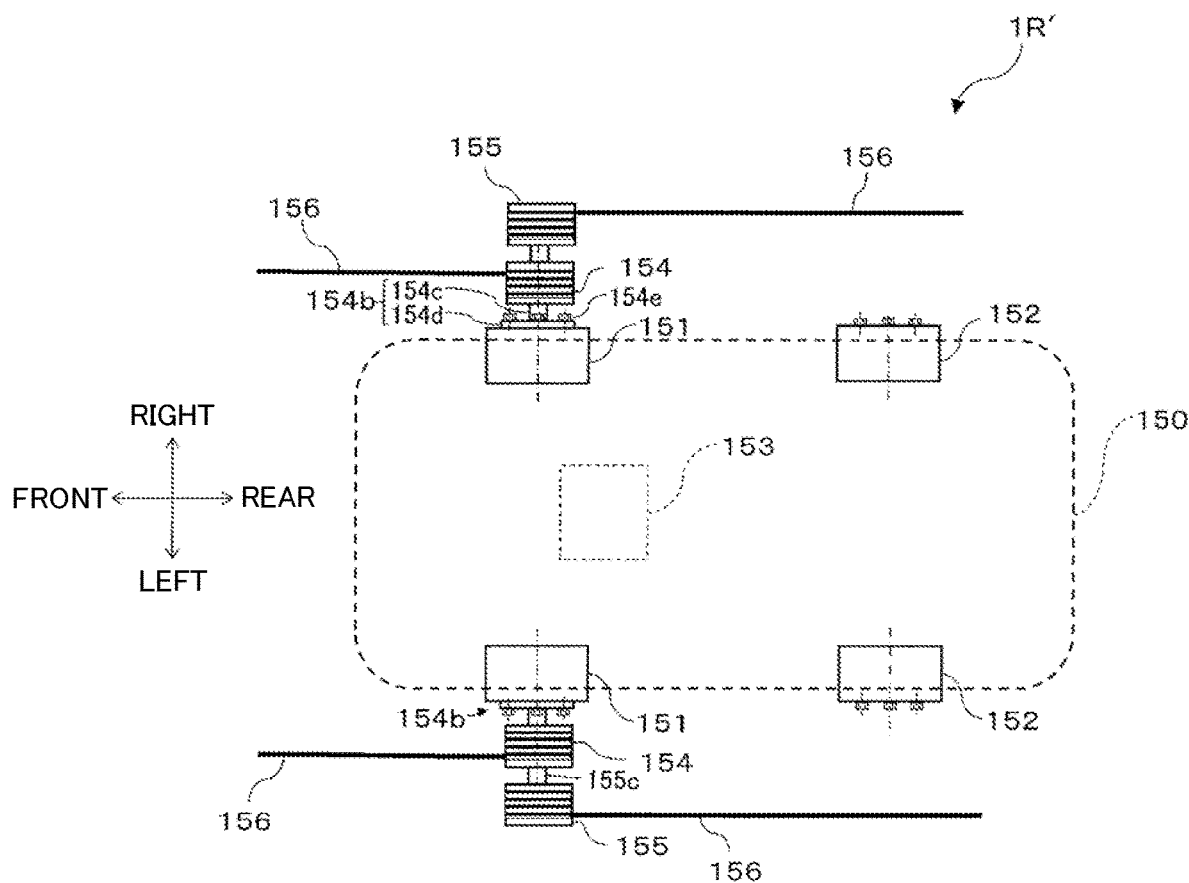
FIG. 25 is a schematic plan view showing a structure of a conveying device according to a modification to the eighteenth embodiment of the present invention.

(1) In the above embodiment, the drum 154 that winds the wire 156 when the vehicle is moving forward is fixed to the front wheel 151 and the drum 155 that forwards the wire 156 when the vehicle is moving forward is fixed to the rear wheel 152. Alternatively, the conveying device 1R' may be configured by fixing two drums 154 and 155 to an either wheel (in this example, the front wheels 151) as shown in FIG. 25. Specifically, the drum 155 is coaxially fixed, via a shaft member 155c, to the outer side (on the distal side from the vehicle body 150) of the drum 154 fixed to each front wheel 151. The drum 155 may be directly fixed to the drum 154. The remaining structure is the same as the above embodiment, so repetitious description is omitted here.

(2) In the above embodiment, the vehicle including the vehicle body 150 is assumed to be a four-wheel drive vehicle, or may alternatively be a front- or rear-wheel drive vehicle. The following wheels of a front- or rear-wheel drive vehicle are indirectly driven by the engine as far as the following wheels are grounded, and therefore winches can be attached also to the following wheels in addition to the driving wheels. However, in cases where the vehicle body 150 is conveyed under a state of being hung in the air by the winches, the winches need to be fixed to the driving wheels.

(3) In the above embodiment, the drums 154 and 155 are fixed to the wheels 151 and 152. Alternatively, a driving power transmission mechanism that transmits the rotating power of the engine 153 may be attached differently or branched from the driving power transmission mechanism of the wheels 151 and 152. In this alternative, a reverse-rotation prohibiting mechanism may be provided to the driving force transmission mechanism in order to prevent the drums 154 and 155 from rotating in the direction that conveys the vehicle body 150 in the reverse to the direction in which the vehicle travels.

Figure 26A:
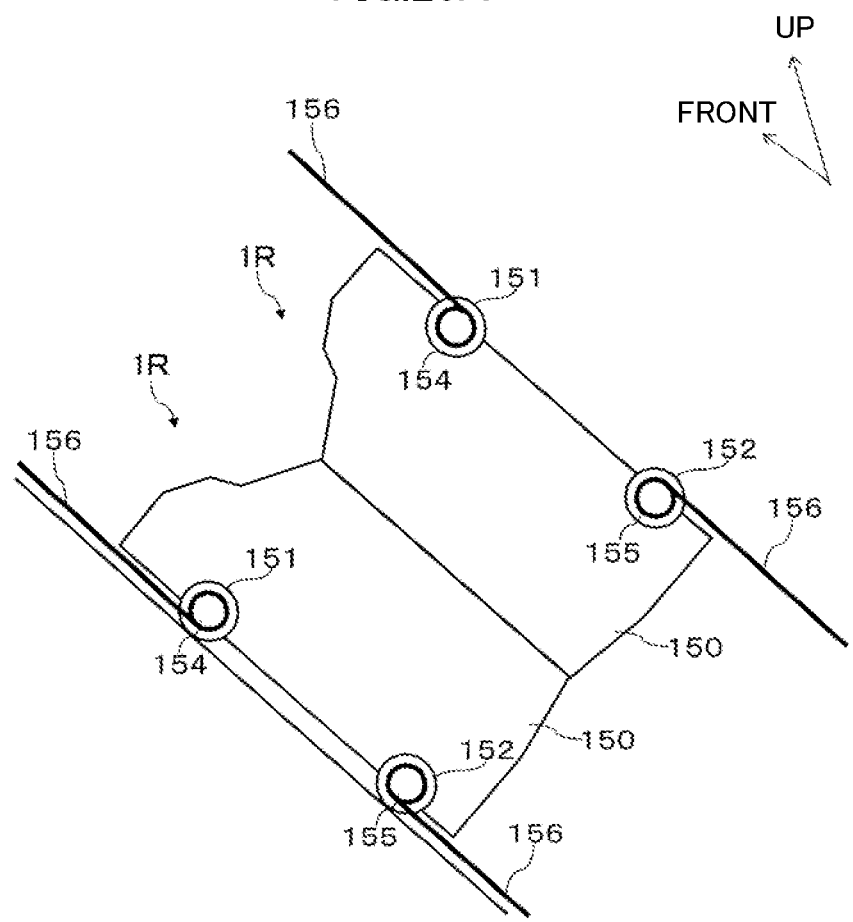
FIGS. 26A and 26B are schematic side views showing a structure of a conveying device according to a modification to the eighteenth embodiment of the present invention.
Figure 26B:
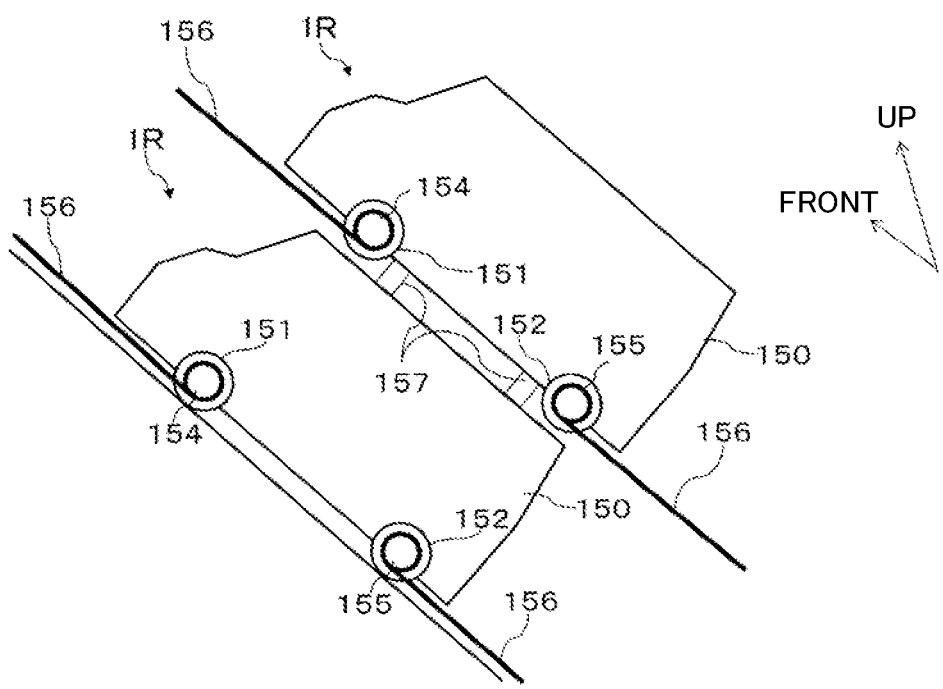

(4) As shown in FIGS. 26A and 26B, the vehicle (conveying device 1R) of the above embodiment may be of two stages vertically arranged. In FIG. 26A, on a vehicle (conveying device 1R), another upside-down vehicle (conveying device 1R) is fixed. These vehicles are fixed to each other by means of a known manner of joints or fixing fittings.

In FIG. 26B, on a vehicle (conveying device 1R), another vehicle (conveying device 1R) in the same posture (with the roof facing upward) is fixed. The upper vehicle (conveying device 1R) is fixed to the lower vehicle with a pair of fixing fittings 157 disposed at the front and the rear such that the wheels thereof are spaced apart from the roof of the lower vehicle. With this configuration, the upper vehicle (conveying device 1R) substantially does not operate because the wheels 151 and 152 slip, and can operate only the winches.

In the configurations of FIGS. 26A and 26B, the fixation of the two vehicles vertically arranged is configured to be released, so that the two vehicles can be used independently of each other.

(5) In the above embodiment, the described example applies the present invention to a four-wheel vehicle. The number of wheels of the vehicle is by no means limited, and the present invention can be applied to vehicles having less than four wheels such as a unicycle, a bicycle, a tricycle, or vehicles having more than four wheels. Besides, the present invention can be applied to a railway vehicle traveling on rail(s). Furthermore, the present invention can be applied to a continuous track device having a structure of winding an endless rail around multiple wheels.

(6) The moving directions of the conveying devices 1R and 1R' of FIGS. 24A and 24B and 25 by the winches are by no means limited, and alternatively may be a vertical direction.

(7) The conveying devices 1R and 1R' can be used indoor or outdoor.

(8) The wheels 151 and 152 of the conveying devices 1R and 1R' are assumed to be driven by an engine, but alternatively may be driven by a wheel motor.

[19. Miscellaneous]

(1) Likewise the description of the chapter [1-4. Modification] of the first embodiment, the operation arms 6 and the chainsaws 7 in the second and third embodiments may be lifted up and down by using the conveying winches 41A and 41B.

(2) In the second and third embodiments, the turntable 34 is installed and the operation arms 6 and the rods 8 are attached to the movement body 2 via the turntable 34. Alternatively, the turntable 34 may be omitted and the operation arms 6 and the rods 8 may be directly attached to the movement body 2.

(3) In the fourth and fifth embodiment, the mower 2A are conveyed by the conveying mechanism 4 and the auxiliary conveying mechanism 14 but is not self-propelled, but may alternatively be configured to be self-propelled equipped with a driving device such as a motor and an engine.

For example, in cases where the mower 2A is configured to be self-propelled in the conveying device 1A of the fourth embodiment shown in FIGS. 5A and 5B, the mower 2A is self-propelled at a flat surface in a state of accommodating the auxiliary conveying mechanism 14 in the container 20. In contrast, in a place such as a steep slope and an undulant area at which the conveying device 1A has a difficulty in being self-propelled because of lacking of driving power and a possibility of falling, the columns 10A-1, 10A-2, 10B-1, and 10B-2 and the wires 142A and 142B are provided and the trolleys 141A and 141B taken out of the container 20b are attached to the wires 142A and 142B, so that the conveying mechanism 4 and the auxiliary conveying mechanism 14 are set to be usable. With the aid of the conveying mechanism 4 and the auxiliary conveying mechanism 14, the mower 2A is conveyed in the same manner as the second embodiment. If the conveying device 1A is made to be self-propelled, a drum that rotates together with each wheel 20a may be attached to wheel 20a in addition to or in place of the conveying winches 41A and 41B likewise the conveying device 1R and 1R' shown in FIGS. 24A, 24B, and 25. Otherwise, a pulley that rotates together with each wheel 20a may be provided to the wheel 20a and the pulley may be caused to travel on a wire horizontally provided differently from the wires 42A and 42B as a trolley.

In the conveying device 1A shown in FIGS. 5A and 5B, the conveying device 1R shown in FIGS. 24A and 24B, and the conveying device 1R' shown in FIG. 25, the reinforcement wire 46 may be additionally suspended likewise the conveying device 1" shown in FIG. 4 and the hook member 20g hung from the reinforcement wire 46 may be provided. Alternatively, a self-propelled or following trolley may be caused to travel on the reinforcement wire 46, a supporting member (e.g., a cable or a rod) is hung from the trolley, and the lower end of the supporting member may be fixed to the conveying devices 1A, 1R, and 1R'. Further alternatively, a self-propelled or following trolley may be directly fixed to the roof of the traveling member 20 or the vehicle body 150 and the trolley may be caused to travel on the reinforcement wire 46.

Figure 27A:
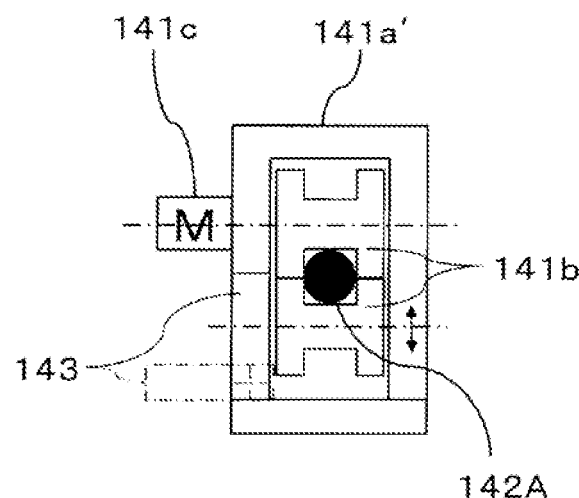
FIGS. 27A and 27B are schematic side views showing a structure of alternatives of a trolley.
Figure 27B:
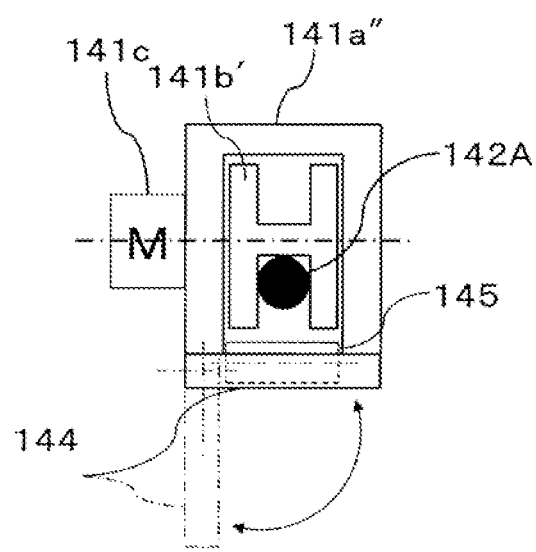

The trolley 141A shown in FIG. 5A may be use as the trolley, or a trolley shown in FIGS. 27A and 27B may be use as the trolley.

As compared with the trolley 141A, a trolley shown in FIG. 27A has a trolley main body 141a' in the form of a box shape. A pair of pulleys 141b vertically arranged are incorporated in the trolley main body 141a'. The lower pulley 141b is attached so as to be vertically movable on the side wall of the trolley main body 141a and is upward urged. The pair of pulleys 141b and 141b can sandwich the wire 142A therebetween.

At the lower portion of the left side wall of the trolley main body 141a' in the drawing, a lid portion 143 is provided so as to be openable as indicated by the two-dotted line. The lower pulley 141b is attached to be movable as described above to the lid portion 143. With this configuration, when a wire 142A is set between the pulleys 141b and 141b, the lid portion 143 is first open and then the lower pulley 141b is temporarily separated from the upper pulley 141b together with the lid portion 143. When the wire 142A is removed from between the pulleys 141b and 141b, the lid portion 143 is satisfactorily opened from a position indicated by the two-dotted line out of the lower range of the wire 142A. At this time, the pulley 141b that moves together with the lid portion 143 collides with the wire 142A but moves downward so as to avoid the wire 142A against the urging force by receiving force to open the lid portion 143. Accordingly, the lid portion 143 is successfully opened. The remaining structure is the same as the trolley 141A shown in FIG. 5A, so description is omitted here.

The trolley shown in FIG. 27B has a pulley 141b' configured to have a recess that the wire 142A enters and that is formed deeper than the pulley 141b of the trolley 141A shown in FIG. 5A. This prevents the engaging state of pulley 141b' and the wire 142A from being unintentionally released.

This trolley has the trolley main body 141" formed to be openable at the bottom 144, and a following roller 145 rotatable along the extending direction of the wire 142A is provided to the bottom 144. If the wire 142A bends to come into contact with the following roller 145 while the trolley is traveling, the following roller 145 rotates to follow the traveling of the trolley, so that an amount of abrasion of the wire 142A can be abated as compared with the case where the wire 142A is brought into direct contact with the bottom 144.

The remaining structure is the same as the trolley 141A shown in FIG. 5A, so repetitious description is omitted here.

In the conveying device LA shown in FIG. 5A, the trolley 141A may be replaced with either trolleys shown in FIGS. 27A and 27B.

(4) In the fourth and fifth embodiments, the mower 2A is regarded as the main movement body of the present invention and the conveying winches 41A and 41B are directly attached to the mower 2A. Alternatively, the mower 2A may be configured as shown in FIG. 28.

Figure 28:
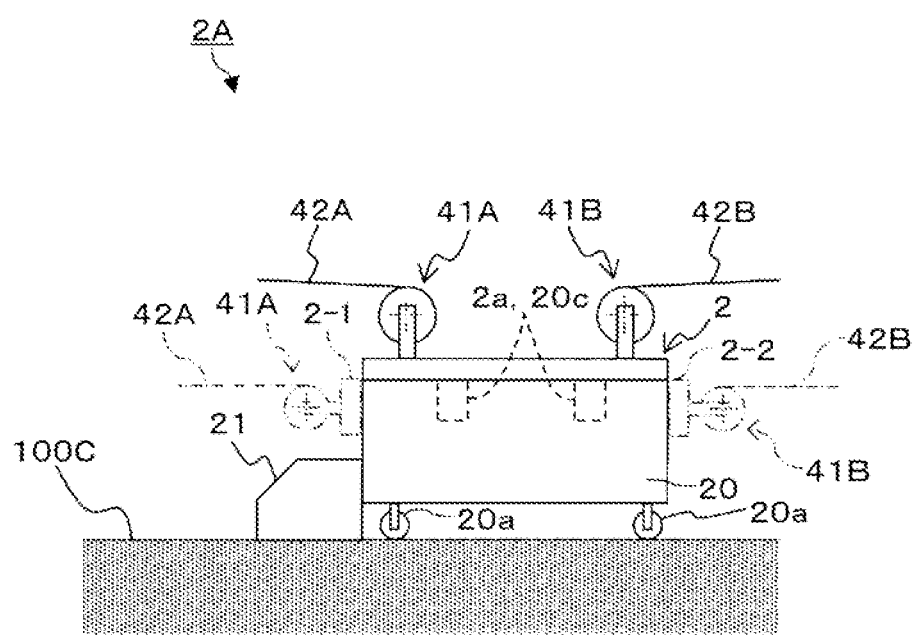
FIG. 28 is a schematic side view showing a main structure of a conveying device according to a modification to the fourth and fifth embodiments of the present invention.

FIG. 28 is a schematic side view showing the main structure of a conveying device according to a modification to the fourth and the fifth embodiments of the present invention. Like reference numbers designate the same or substantially same elements as the foregoing embodiments, so repetitious description is omitted here. FIG. 28 omits illustration of the controller, the motors that drive the conveying winches, and the battery, and the wires 42A and 42B are fixed to columns outside the drawing.

In the configuration shown in FIG. 28, the mower 2A and the movement body 2, which is attached thereto the conveying winches 41A and 41B, are separated forms. Specifically, the mower 2A is detachably attached to the movement body 2 by fitting multiple projection parts 2a formed on the bottom face of the movement body 2 into multiple recess parts 20c formed on the top face of the traveling member 20 of the mower 2A. This means that the holder mechanism of the present invention is formed of a connector mechanism including the projection parts 2a and the recess parts 20c integrated with the movement body 2 and the mower 2A.

As an alternative to the structure shown in FIG. 28, the turntable 34 (see FIGS. 1A and 1B) may be provided to the bottom face of the movement body 2 and the mower 2A may be held by the turntable 34 with, for example, the connector mechanism. In this case, the projection parts 2a are formed on the bottom face of the turntable 34 in place of the bottom face of the movement body 2. According to this structure, the turntable 34 can change the direction of the mower 2A, so that the mowing unit 21 can be directed to an appropriate direction.

There is no requirement for the movement body 2 to be a single body. Alternatively, the movement body may be formed of a divided body 2-1 attached thereto the conveying winch 41A and a divided body 2-2 attached thereto the conveying winch 41B, and the divided bodies 2-1 and 2-2 may be fixed to the front and rear faces of the traveling member 20 of the mower 2A, respectively, as indicated by the two-dotted line in FIG. 28. Further alternatively, the positions where the movement body 2 and the divided bodies 2-1 and 2-2 are attached are not limited to the top face of the traveling member 20, but may be appropriate positions. For example, the divided bodies 2-1 and 2-2 may be attached to a side face or the bottom face of the traveling member 20.

(5) In the fourth embodiment shown in FIGS. 5A and 5B, the guiding member that guides the trolley 141 are formed of the wire 142, but may be formed of a rail.

(6) In the sixth embodiment shown in FIG. 7, the auxiliary conveying mechanisms 14 may be provided likewise the fourth embodiment, so that the gondola 9 can move also in a second direction (e.g., the horizontal direction) crossing the vertical direction (first direction).

(7) In the foregoing embodiments, the controller 5 is assumed to be installed to the movement body 2, but this structure is not necessary. Alternatively, the controller 5 may be integrated with the operation device and remotely disposed from the movement body 2, and so that the various motors provided to the movement body 2 may be remotely controlled.

(8) In the above embodiments, the movement body 2 serving as the main movement body and the mower 2A are conveyed along the horizontal or vertical direction, but the direction of conveying the main movement body may be set arbitrarily. Alternatively, the main movement body may be conveyed along the conveying path vertically inclined.

(9) In the foregoing embodiments, the power sources of the electric motors 33c, 34a, and 41c provided to the movement body 2 each may be one or more publicly known power sources such as a battery, a photoelectric converting device exemplified by a solar panel, and a fuel cell.

The winches 41A-41D are not limited to ones driven by an electric motor. Alternatively, the winches 41A-41D may be driven by an engine and a hydraulic device.

(10) In the foregoing embodiments, examples of the conveying device and examples of a mower and a carriage conveyed by the conveying device are provided with wheels. Such wheels may be replaced with a continuous track device having a structure of winding an endless rail around multiple trank rollers. The carriage attached thereto conveying winches directly or via the movement body is not limited, and may be exemplified by a sledge, an airplane (including one for a ride in a theme park or an amusement park), a balloon, a blimp, and a submarine such as an underwater explorer. In recent years, premises hung in the air by wires are produced for the purpose of sightseeing and art. As the developed form thereof, a conveying winch is attached to the premises directly or via a movement body 2, and the premises is conveyed in a state of being hung in the air.

(11) The number of conveying winches provided to the conveying device is satisfactorily two or more, and may be appropriately set, not being limited to the number in the foregoing embodiments. For example, a single conveying device may be provided with three or more conveying winches or four or more conveying winches.

(12) The conveying winches, the auxiliary winches, and an intermediate winches of the foregoing embodiments may be provided with grooves formed on circumference faces of their drums to regulate winding of wires. This prevents wires from entangling on the drum.

Figure 29A:
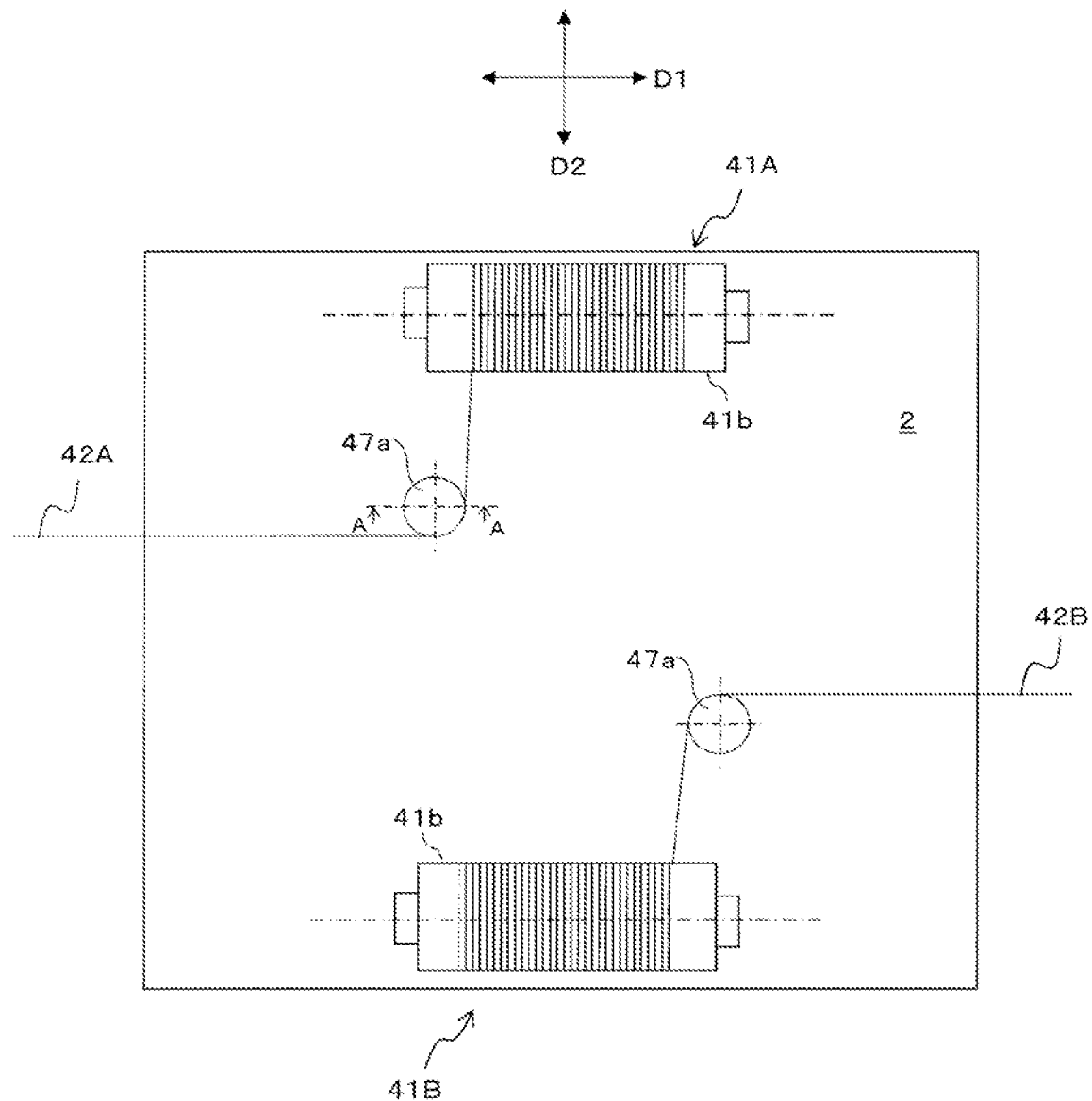
FIGS. 29A and 29B are schematic diagrams showing a main structure of a conveying device according to a modification to the present embodiment, FIG. 29A being a plan view and FIG. 29B being an A-A sectional view of FIG. 29A.
Figure 29B:
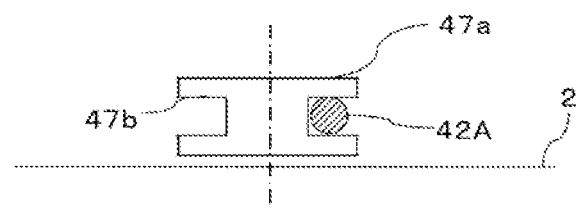

(13) The foregoing embodiments attach the conveying winches to the main movement body such that the cylindrical surface of the drum faces the forwarding direction of the movement body, but alternatively, the winches are attached as shown in FIGS. 29A and 29B.

FIGS. 29A and 29B area schematic diagrams showing the main structure of the conveying device according to a modification to the present invention. FIG. 29A is a plan view and FIG. 29B is an A-A sectional view of FIG. 29A. Like reference numbers designate the same or substantially same elements as the foregoing embodiments, so repetitious description is omitted here. FIG. 29 omits illustration of the controller, the motors that drive the conveying winches, and the battery, and the wires 42A and 42B are fixed to columns outside the drawing.

In the structure shown in FIGS. 29A and 29B, the conveying winches 41A and 41B are attached to the movement body 2 such that the cylindrical surfaces of the drums 41b of the conveying winches 41A and 41B are directed the second direction D2 perpendicular to the moving direction (first direction D1) of the movement body 2. On the movement body 2, guide rolls 47a are provided one to each of the wires 42A and 42B. Each guide roll 47a is in the shape of a substantially disc and is attached to the movement body 2 so as to be horizontally rotatable in such a posture that the circular face thereof is opposed to the movement body 2. On the circumference faces of the guide rolls 47a, groove portions 47b into which the wires 42A and 42B are fitted are formed around the entire circumference.

With this structure, the wires 42A and 42B forwarded from the conveying winches 41A and 41B to the second direction D2 are turned to the first direction D1 by the guidance by the guide rolls 47a. In addition, the wires 42A and 42B being directed along the first direction D1 toward the conveying winches 41A and 41B are turned to the second direction D2, which is the winding direction of the conveying winches 41A and 41B by the guidance of the guide rolls 47a.

Figure 30:
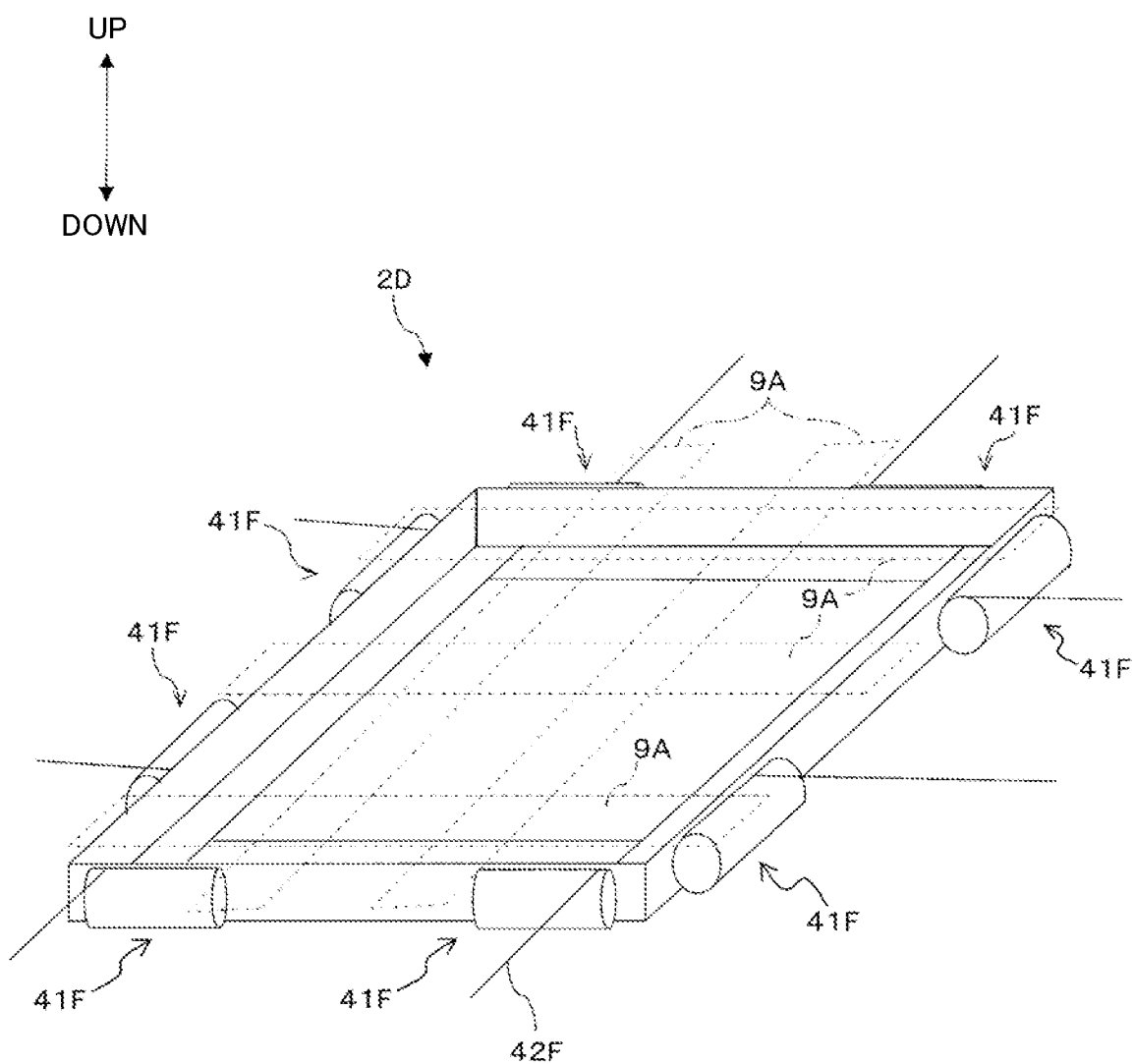
FIG. 30 is a schematic perspective view showing a main structure of a conveying device according to a modification to the present invention.

(14) The structure shown in FIG. 30 may be suggested. FIG. 30 is a schematic perspective view showing the main structure of a conveying device according to a modification to the present invention. Like reference numbers designate the same or substantially same elements as the foregoing embodiments, so repetitious description is omitted here. FIG. 30 omits illustration of the controller, the motors that drive the conveying winches, and the battery, and the wires 42F are fixed to columns outside the drawing.

In the structure shown in FIG. 30, the main movement body (hereinafter also referred to as "frame body") 2D is formed by a frame body consisting of the front, rear, left, and right frames. The frame body 2D is made by assembling four angle members. To each outer side face of the frame body 2D, two conveying winches 41F which wind wires 42F are provided. Being simplified in FIG. 30, the conveying winches 41F are the same in structure with the above conveying winch 41A.

The main movement body 2D formed into such a frame body can form a scaffolding by mounting, on the frame body 2D, multiple board members 9A at the front, rear, left, and right as indicated by the two-dotted lines. Alternatively, the board members 9A are provided to the frame body 2D in multiple vertical stages, so that a three-dimensional scaffolding can be formed.

Further alternatively, a greenhouse may be installed on the frame body. Since the place irradiated with the sun is changed according with the weather and the time of the day, this structure can appropriately move the greenhouse to a place irradiated with the sun.

(15) A self-propelled traveling member such as a self-propelled operation machine is detachably attached to the main movement body. After the self-propelled traveling member is conveyed to a predetermined position by the main movement body in a state of being hung in the air and then detached from the main movement body, the self-propelled traveling member may travel by itself. In this case, it is preferable that the self-propelled traveling member can be easily detached from the main movement body by a single action.

(16) Two conveying devices may be arranged in parallel in two lines on the water surface of, for example, the sea, a river, or a lake. With this configuration, the two main movement bodies capture fish or dredge refuse in the water with a net held by the main movement bodies and dropped underwater while the two main movement bodies are traveling side by side. In this case, the support bodies that support the cables may be provided on land or on a ship.

(17) Here, description will now be made in relation to the structure of a modification to the seventeenth embodiment shown in FIGS. 21 and 22 with reference to FIGS. 31 and 32. The structure shown in FIGS. 31 and 32 is obtained by modifying the structure shown in FIGS. 21 and 22 to have multiple stages in the height direction suitable for operation at a high elevation.

Figure 31:
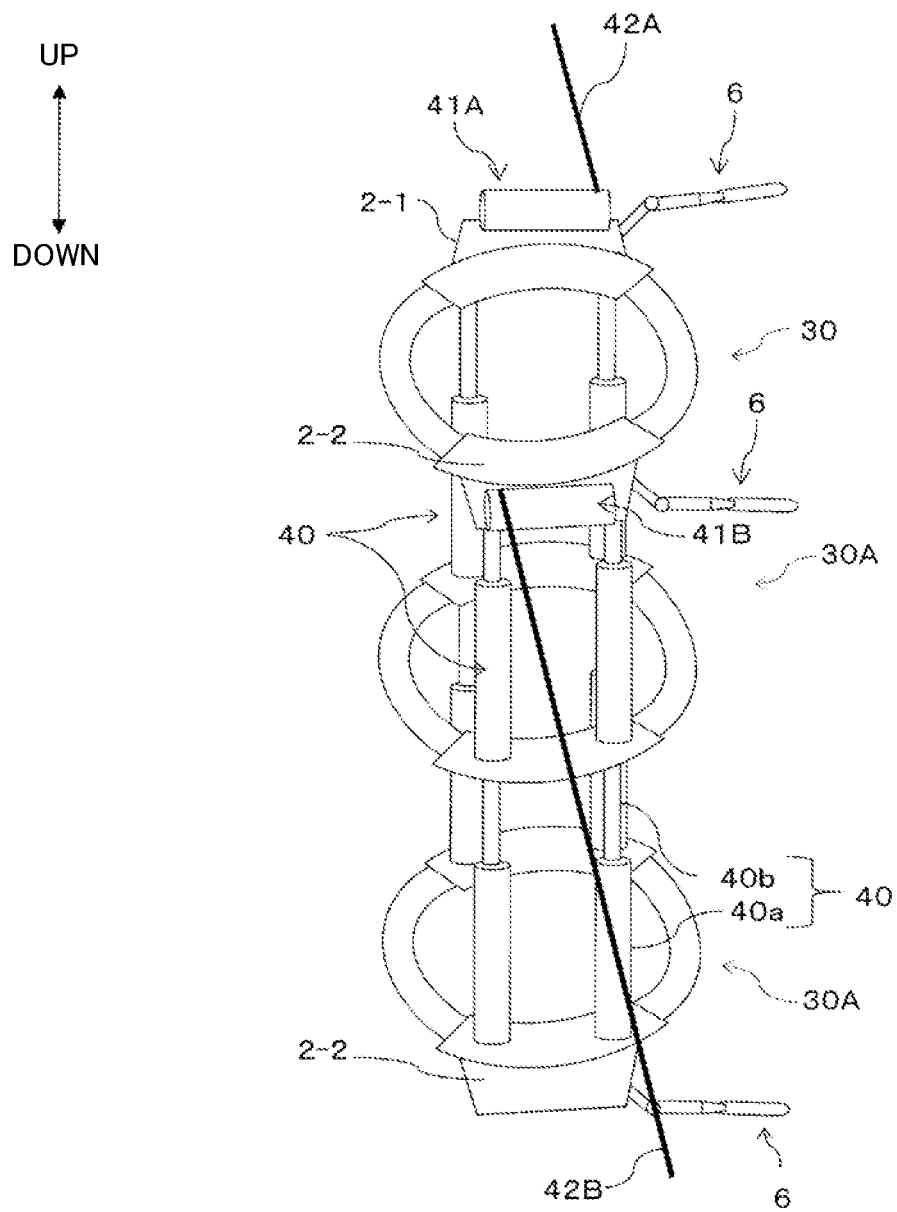
FIG. 31 is a schematic perspective view showing a main structure of a conveying device according to another modification to the present invention.

FIG. 31 is a schematic perspective view showing the main structure of the conveying device according to a modification to the present invention.

Figure 32:
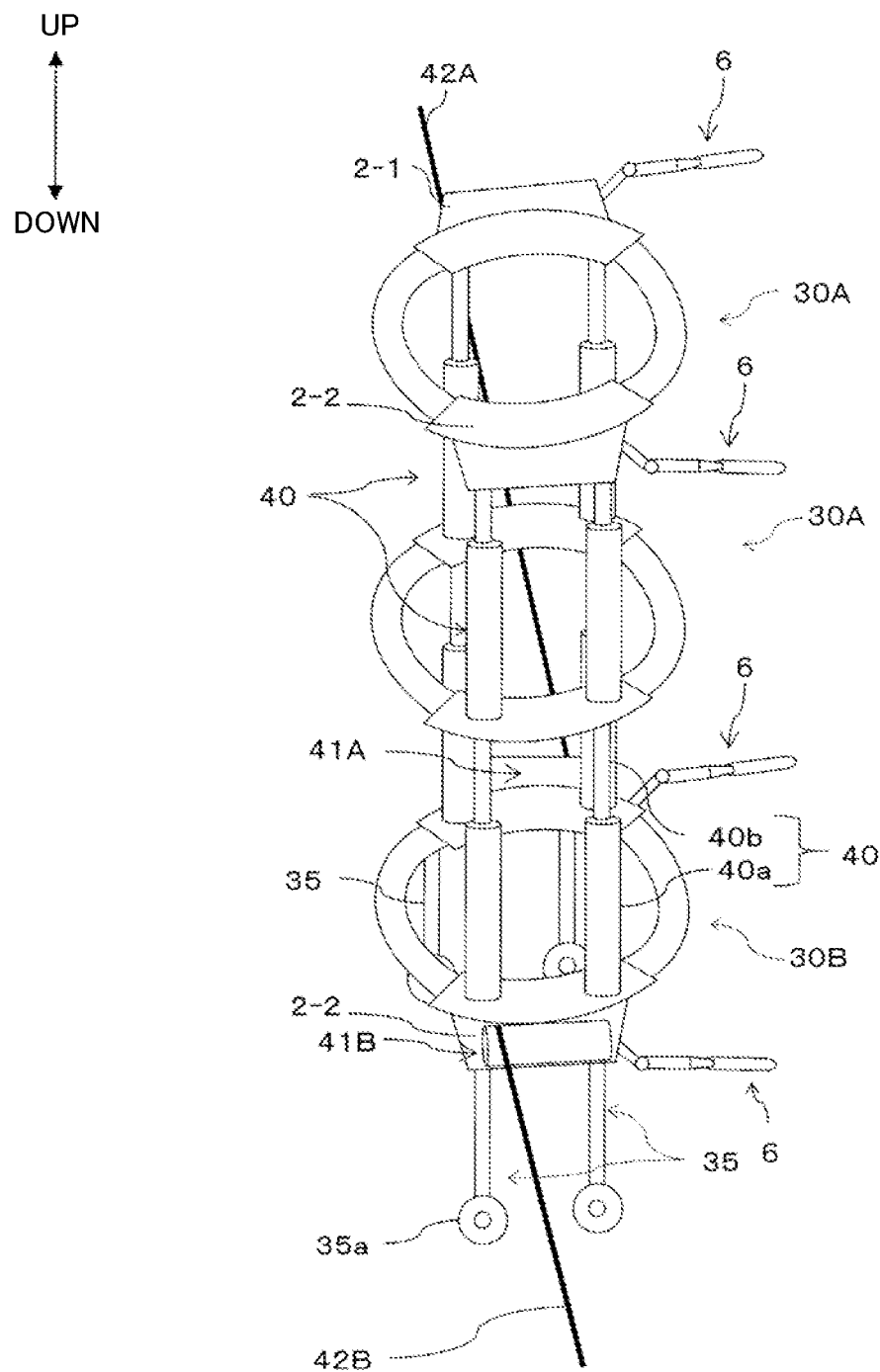
FIG. 32 is a schematic perspective view showing a main structure of a conveying device according to an additional modification to the present invention.

FIG. 32 is a schematic perspective view showing the main structure of a conveying device according to another modification to the present invention.

Like reference numbers designate the same or substantially same elements as the foregoing embodiments, so repetitious description is omitted here. FIGS. 31 and 32 omit illustration of the controller, the motors that drive the conveying winches, and the battery, and illustrates part of the divided bodies 2-1 and 2-2 and the operation arm 6 included by two operational bodies 30A. The wires 42A and 42B are fixed to columns outside the drawing.

In the structure shown in FIG. 31, two operational bodies 30A are hung under the operational body 30. Each operational body 30A is the same structure as the operational body 30 except for not including the conveying winches 41A and 41B.

The operational bodies 30, 30A, 30A are connected to each other by multiple hydraulic cylinders 40. Specifically, the main bodies 40a of the multiple hydraulic cylinders 40 are fixed to operational body 30A at the first stage from the bottom, and the tips of the drive rods 40b that hydraulically move forward and backward against the bodies 40a are fixed to the bottom face of the operational body 30A at the second stage from the bottom. Besides the main bodies 40a of the multiple hydraulic cylinders 40 are fixed to the top face of the operational body 30A at the second stage from the bottom, and the tips of the drive rods 40b that hydraulically move forward and backward against the bodies 40a are fixed to the bottom face of the operational body 30 of the top stage from the top.

With this configuration, by controlling the amount of advancement and retraction of the drive rod 40b of each hydraulic cylinder 40, respective heights of the operational bodies 30A and 30A can be adjusted, keeping the height of the operational body 30 at the top stage as a fixed point. For example, in cases where the robot arms 6 limb trees, each height of the operational bodies 30A, 30A can be adjusted according to the height of the tree.

In the configuration shown in FIG. 32, two operational bodies 30A are arranged in two stages over the operational body 30B. That is, the operational bodies are arranged in the vertical three stages. The operational body 30B is provided with four leg portions 35 having casters 35a at the lower end in the front, rear, right and left, with respect to the operational body 30 and is conveyed in a state where the casters 35a are in contact with ground by the conveying winches 41A and 41B.

The operational bodies 30B, 30A, and 30A are connected to each other by, for example, hydraulic cylinders 40 likewise the configuration shown in FIG. 31.

With this configuration, by controlling the amount of advancement and retraction of the drive rod 40b of each hydraulic cylinder 40, each height of the operational bodies 30A and 30A can be adjusted, keeping the height of the operational body 30B at the lowest stage as a fixed point.

In the configurations shown in FIGS. 31 and 32, the heights of the operational bodies 30, 30A and 30B are adjusted by the hydraulic cylinders 40. Alternatively, in place of the hydraulic cylinders 40, various actuators can be used, and an electric actuator can also be used.

Further, in the configuration shown in FIG. 32, an outrigger may be provided to, for example, the operational body 30B, and the casters 35a may be replaced with wheels with one or more driving units, a continuous track device with one or more driving units, or a continuous track device not including one or more driving units.

Furthermore, in the configuration shown in FIG. 32, the height of the operational body 30B may be adjusted by allowing the legs 35 to be stretchable or retractable automatically or manually.

Furthermore, in each of the configurations shown in FIGS. 31 and 32, at least one of operational bodies 30, 30A, 30B, and 30C (preferably, all the operational bodies) is preferably provided with a movable holding pad 27c which can move forward or backward as shown by two-dotted lines in FIGS. 21 and 22B.

Figure 33:
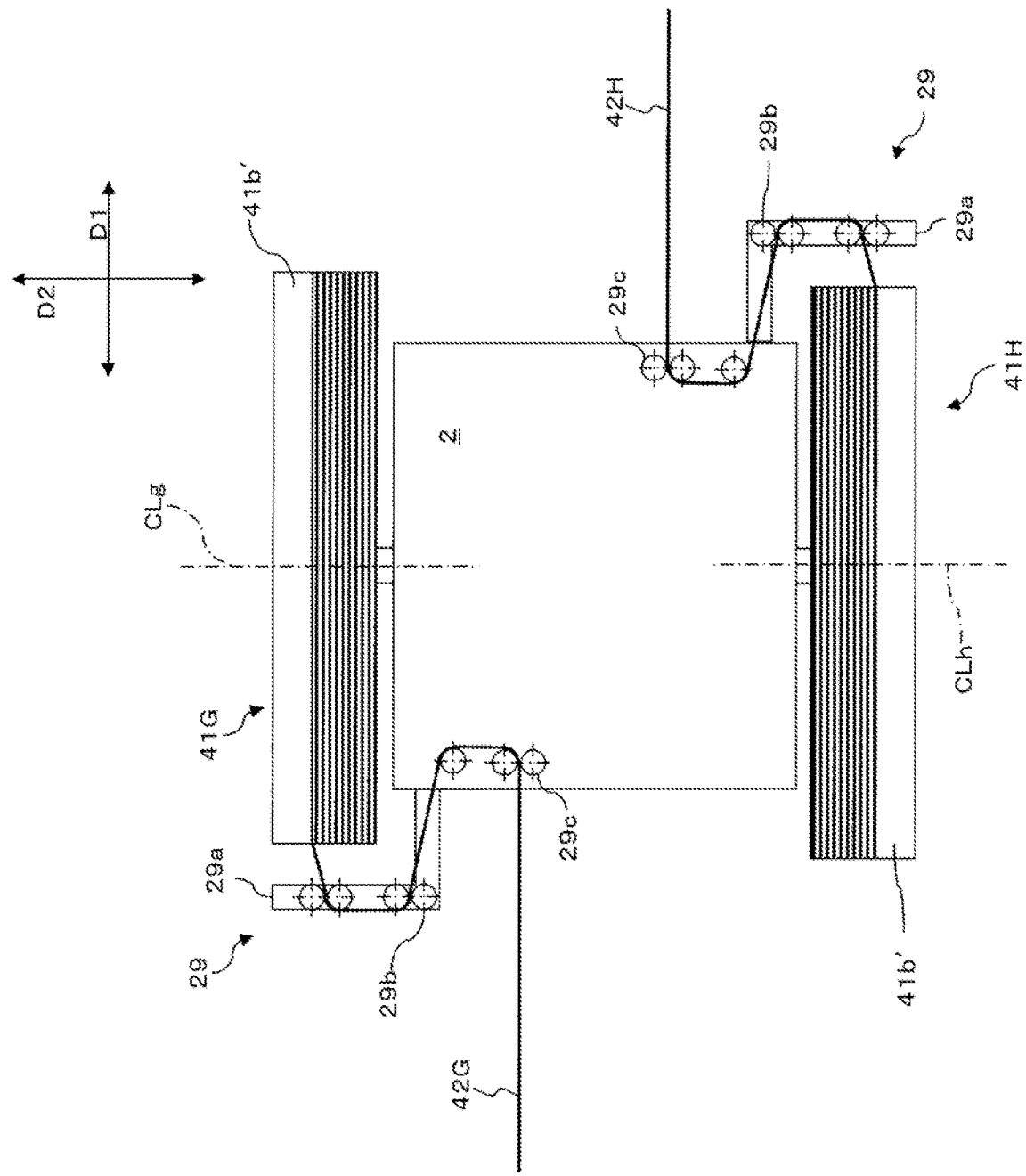
FIG. 33 is a schematic plan view showing a structure of a conveying device according to a still further modification to the present invention.
Figure 34:
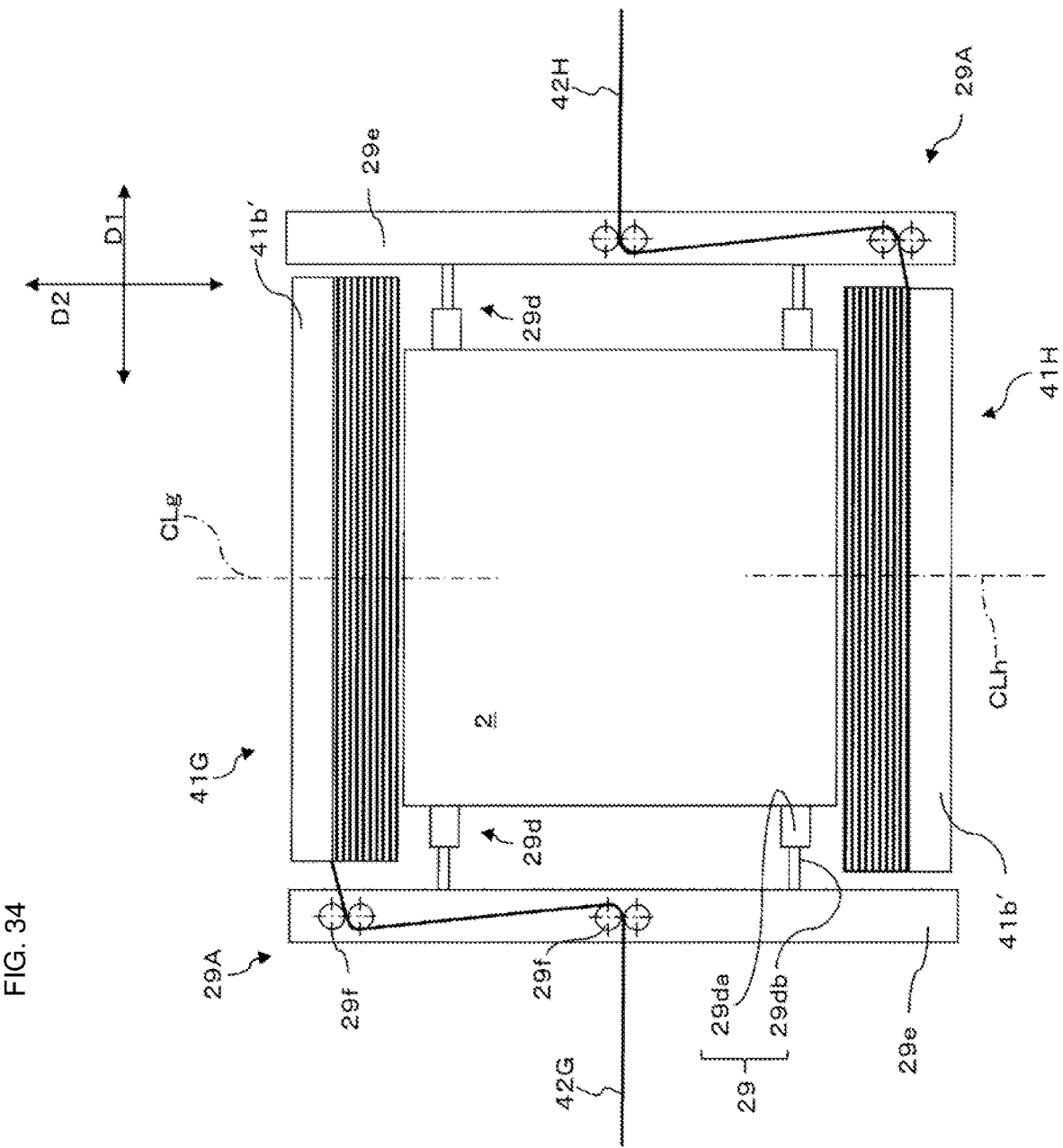
FIG. 34 is a schematic plan view showing a structure of a conveying device according to a still further modification to the present invention.
Figure 35:
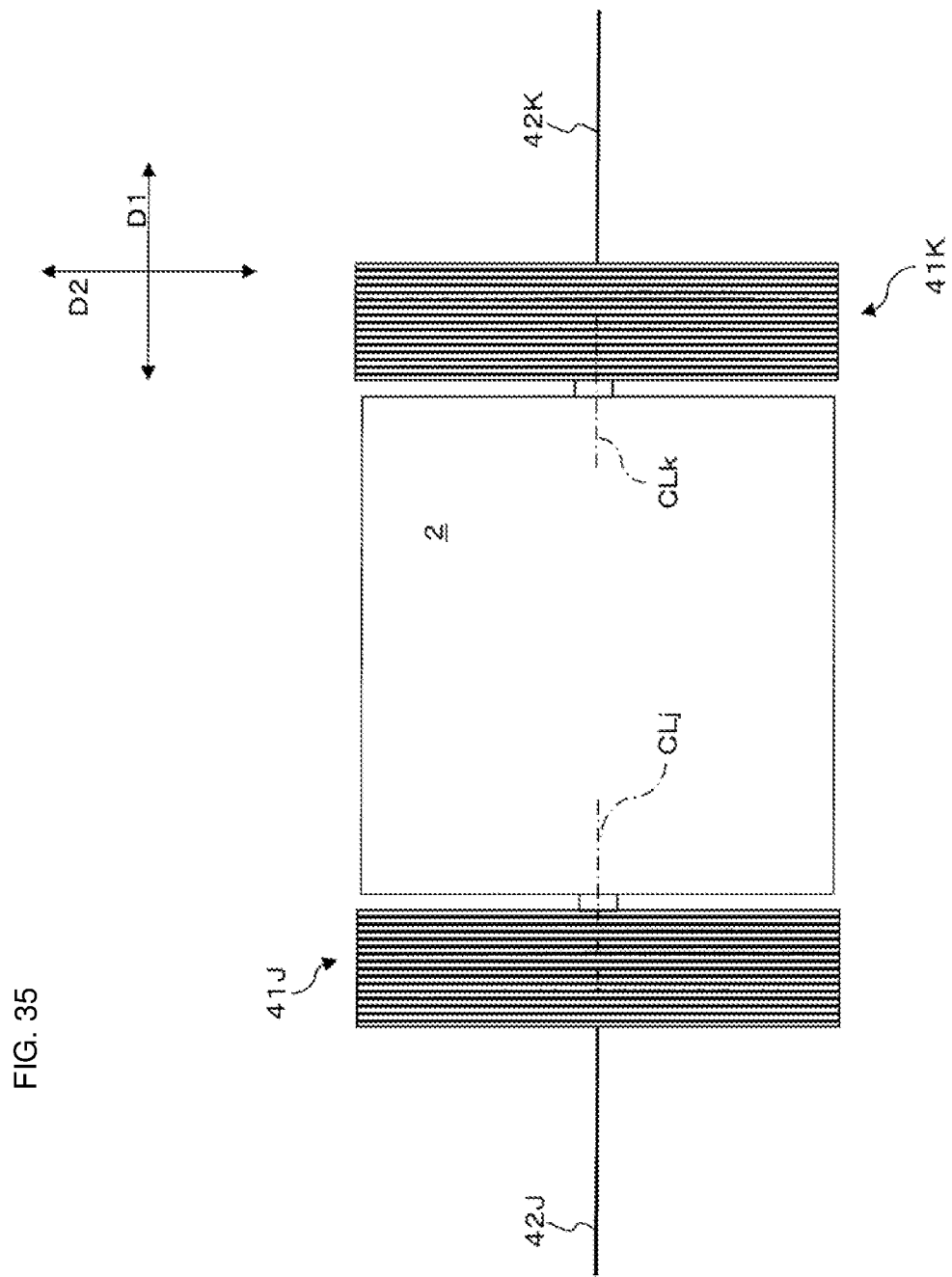
FIG. 35 is a schematic plan view showing a structure of a conveying device according to a still further modification to the present invention.

(18) The conveying winches can be installed as shown in FIGS. 33-35.

FIG. 33 is a schematic plan view showing the structure of a conveying device according to a modification to the present invention.

FIG. 34 is a schematic plan view showing the structure of a conveying device according to another modification to the present invention.

FIG. 35 is a schematic plan view showing the structure of a conveying device according to an additional modification to the present invention.

Like reference numbers designate the same or substantially same elements as the foregoing embodiments, so repetitious description is omitted here. FIGS. 33-35 omit illustration of the controller, the motors that drive the conveying winches, and the battery, and the wires 42G, 42H, 42J, and 42K are fixed to columns outside the drawings.

In the structure shown in FIG. 33, the movement body 2 is provided with a conveying winch 41G (first winch) around which a wire 42G (cable, first cable unit) is wound, and a conveying winch 41H (second winch) around which a wire 42H (cable, second cable unit) is wound.

The conveying winches 41G and 41H each include a drum 41b', a non-illustrated drive device that drives the drum 41b', and a power source of the drive device. Each of the drums 41b' is mounted on the outer side of the movement body 2 (on the side toward the second direction D2 perpendicular to the first direction D1, which is the moving direction of the movement body 2) such that the shaft of the drum 41b' is rotatable, and rotates around axis lines CLg and CLh extending in a direction (in this example, the second direction D2) crossing the first direction D1.

Further, a guide mechanism 29 is provided in the radius direction of each of the drums 41b ' of the conveying winches 41G and 41H. The guide mechanism 29 includes an L-shaped base member 29a attached to the movement body 2 at the outer side of the conveying winches 41G or 41H along the first direction D1, multiple guide rolls 29b rotatably attached to the base member 29a, and multiple guide rolls 29c rotatably attached to the edge in the first direction D1 of the movement body 2.

The wires 42G and 42H forwarded from the respective drums 41b' are temporarily guided to the center of the second direction D2 of the movement body 2 and then guided along the first direction D1 by the guidance of the guide rolls 29b and 29c. In addition, the wires 42G and 42H to be wound by the respective drums 41b' are temporarily directed to the center of the second direction D2 of the movement body 2 and then guided to the circumferential face of the respective drums 41b' by the guidance of the guide rolls 29b and 29c.

The structure shown in FIG. 34 replaces each guide mechanism 29 with a guide mechanism 29A in the structure shown in FIG. 33. Like reference numbers designate the same or substantially same elements as the configuration of FIG. 33. So, description will now be made in relation only to the guiding mechanism 29A, omitting repetitious description.

The guide mechanisms 29A are arranged on the outer sides of the first direction D1 of the movement body 2 and each include a pair of drive cylinders 29d attached to the movement body 2 so as to be spaced apart from each other in the second direction D2, base members 29*e* extending along the second direction D2, and multiple guide rolls 29*f* rotatably attached to the base members 29*e*.

Each drive cylinder 29*d* includes a cylinder body 29*da* and a drive rod 29*db* that moves forward and backward with respect to the cylinder body 29*da*. The drive device of the drive rod 29*db* is by no means limited, and can be exemplified by a hydraulic device or an electric motor.

The base member 29*e* is fixed to the tip of the drive rod 29*db*, and the multiple guide rolls 29*f* are rotatably mounted on the top face thereof.

The wires 42G and 42H forwarded from the respective drums 41*b'* are temporarily guided to the center of the second direction D2 of the movement body 2 and then guided along the first direction D1 by the guidance of the guide rolls 29*f*. In addition, the wires 42G and 42H to be wound by the respective drums 41*b'* are temporarily directed to the center of the movement body 2 in the second direction D2 and then guided to the circumferential face of the respective drums 41*b'* by the guidance of the guide rolls 29*f*.

Further, by adjusting the amount of advancement and retraction of rod 29*db* of each drive cylinder 29*d*, the distance between the movement body 2 and each base member 29*e* can be appropriately changed and/or the slack of the wires 42G and 42H can be removed.

In the structures shown in FIGS. 33 and 34, the guide mechanisms 29 and 29A can be omitted.

In the structure shown in FIG. 35, a conveying winch (first winch) 41J and a conveying winch 41K (second winch) are arranged on the outer sides of the first direction D1 of the movement body 2. The conveying winches 41J and 42K are rotatably attached to the movement body 2 and are rotated around axis lines CLj and CLk extending along the first direction, respectively, by non-illustrated drive devices. Around the conveying winch 41J and the conveying winch 41K, a wire (cable, first cable unit) 42J and a wire (cable, second cable unit) 42K are wound, respectively, and by rotating the winches 41J and 41K by the drive devices, the wires 42J and 42K can be wound and forwarded along the first direction D1. That is, the conveying winches 41J and 41K are winches of spinning reel type for forwarding and winding the wires 42J and 42K along the axis lines CLj and CLk like spinning reels.

In the structures shown in FIGS. 33 to 35, since the conveying winches 41G, 41H, 41J, and 41K are provided outside the movement body 2, the size of the conveying winches 41G, 41H, 41J, and 41K is not restricted by the size of the movement body 2, so that the moving distance of the movement body 2 can be lengthened due to elongating the wires 42G, 42H, 42J, and 42K. In addition, since the conveying winches 41G, 41H, 41J, and 41K are provided outside the movement body 2, the usable area on the movement body 2 can be widened.

Alternatively, each of the configurations shown in FIGS. 33 to 35 may share a single wire by two conveying winches as performed in the seventh embodiment shown in FIGS. 9A, 9B, 10A, 10B, 11A, to 11B.

(19) A modification to the third embodiment shown in FIG. 4 will be described with reference to FIGS. 36A and 36B.

Figure 36A:
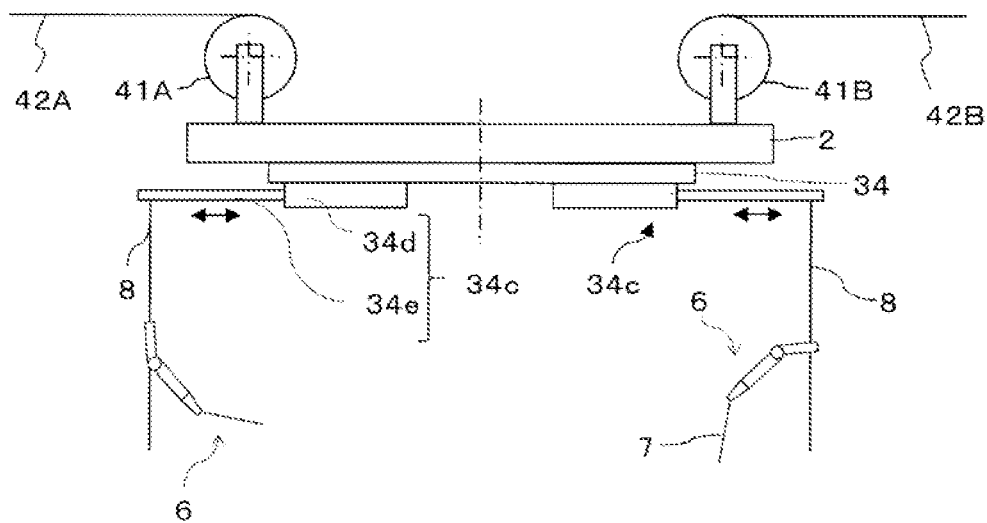
FIGS. 36A and 36B are schematic diagrams showing a structure of a conveying device according to a still further modification to the present invention, FIG. 36A being a side view and FIG. 36B being a bottom view.
Figure 36B:
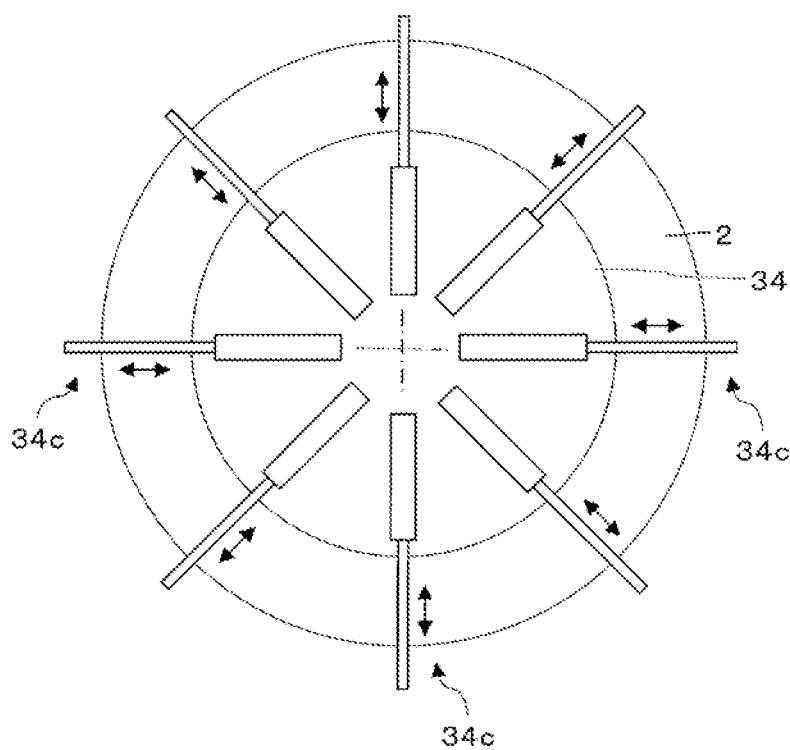

FIGS. 36A and 36B are schematic diagrams showing the structure of a conveying device according to a modification to the present invention, and specifically, FIG. 36A is a side view and FIG. 36B is a bottom view.

FIG. 36A omits illustration of the controller, the motors that drive the conveying winches, the battery, the hook member 20*g*, and the reinforcement wire 46, and FIG. 36B omits illustration of the rods 8 and the operation arms 6. Like reference numbers designate the same or substantially same elements as the third embodiment, so repetitious description is omitted here.

Multiple (eight in this example) drive cylinders 34*c* are radially attached to the bottom face of the turntable 34. Each drive cylinder 34*c* is configured to include a cylinder main body 34*d* and a drive rod 34*e* that moves forward and backward with respect to the cylinder main body 34*d*. The rod 8 is hung from the tip of each drive rod 34*e*, to which operation arm 6 is attached so as to be able to ascend and descend.

The driving source of the drive cylinder 34*c* is by no means limited, and can be exemplified by a hydraulic device and an electric motor.

The position of each rod 8 can be changed by adjusting the amount of advancement and retraction of the drive rod 34*e*. In other words, the diameter of the turntable 34 can be substantially changed. Thereby, the position of each operation arm 6 can be changed via the rod 8, so that the operating position by the operation arm 6 can be adjusted.

The other aspects are the same as those of the third embodiment and thus the description thereof is omitted here.

(20) The structures of a conveying device exemplarily described in the foregoing embodiments and the modifications thereof (hereinafter collectively referred to as embodiments and the modifications) are merely examples, and the present invention is not limited to the structures of the embodiments.

(20-1) For example, a main movement body and a conveying target attached to the main movement body that are described above to be conveyed in the state of being hung in the air may alternatively travel on the ground by attaching thereto a traveling device with a drive device or a traveling device without a drive device.

In contrast, a main movement body and a conveying target attached to the main movement body that are described above to travel on the ground may alternatively be conveyed in a state of being hung in the air.

(20-2) Furthermore, the conveying direction of the main movement body by the main conveying mechanism or the auxiliary conveying mechanism is not limited to those described in the embodiments, and may alternatively be any direction such as the horizontal direction, the vertical direction, and an oblique direction. For example, an embodiment described with reference to a plan view may accomplish the conveying in the conveying direction in which the plan view is regarded as a side view, and conversely, an embodiment described with reference to a side view may accomplish the conveying in the conveying direction in which the side view is regarded as a plan view.

(20-3) The numbers of winches, operational devices, operation arms, wheels, and other parts attached to the main conveying mechanism is not limited to those of the embodiments. Further, the attaching position of each conveying winch is by no means limited, and may be any of, for example, the top face, the bottom face, and a side face of the main movement body. Besides, as far as the conveying target is attached to the main movement body, the attaching position of the conveying target is by no means limited, and may be any of, for example, the top face, the bottom face, and a side face of the main movement body.

(20-4) The conveying target attached to the main conveying mechanism or the conveying target serving as the main conveying mechanism is by no means limited to those of the embodiments, and can be anything. Examples of the conveying target may include household electrical appliances, commercial machines, agricultural machines, snow blowers, vacuum cleaners, blowers, high pressure washers, imaging devices (e.g., surveillance cameras), lighting fixtures, cutting machines, projectors, paint machines, birds and animals exclusion equipment, audio equipment, stage equipment, operation arms and manipulators for civil engineering work. Using a wire, the conveying can be performed without being affected by strong wind or the like.

(20-5) The drive devices that drive various parts, such as the conveying winches, the lifting winch, the turntable, and the trolleys described in the embodiments are not limited to those described in the embodiments, and may be anything. Examples of the drive device include an electric motor, a hydraulic motor, an engine (internal combustion engine), a hydrogen engine, an ion engine, an engine using nuclear power, a rocket engine. Naturally, the main movement body mounts thereon an electric power supply system when an electric motor is used, a hydraulic supply system when a hydraulic motor is used, a fuel supply system (e.g., a fuel tank, a gas cylinder) when an engine is used, or a fuel supply system that supplies fuel to drive an ion engine, an engine using nuclear power, a rocket engine, and the like. Examples of the power supply system can be exemplified by a battery, a solar power generator, or a combination thereof.

(20-6) The shape of the main movement body is by no means limited. A main movement body in the divided forms in the embodiments may alternatively be a single body, and in contrast, a main movement body in a single form in the embodiments may alternatively be divided bodies. The main movement body may be a traveling member having wheels.

(20-7) The trolley and the wire on which the trolley travels in the above-described embodiments may be replaced with a conveying device including a conveying winch.

(20-8) In addition, the conveying device of the present invention may be installed not only outdoors but also indoors to convey various articles (for example, household electric appliances, commercial machines, agricultural machines, laundry, vacuum cleaners, and furniture). The conveying device of the present invention can also be used to open and close shutters, curtains, and shades.

(20-9) The conveying device of the present invention may be attached thereto a net between a pair of the main movement bodies and thereby can function as a sand protection net when used in a beach area, desert or the like. In the same manner, by attaching a net between a pair of the main movement bodies, the conveying device of the present invention can serve, when being used on the coast or on the sea, in the sea, or the seabed (hereinafter, "on the sea, in the sea, or the seabed" includes on the water, in the water, and on the bottom of, for example, a river and a lake in addition to the sea), as a net for catching fish, a net for wave protection, a net for preventing driftwood, a net for collecting microchips on the sea, in the sea, or the seabed, substances and contaminants on the seabed. In addition, the conveying device can also be used for drilling and recovery of mineral resources that exist in the seabed and in the sea.

Likewise by attaching a net between a pair of the main movement bodies, the conveying device of the present invention can serve, when being used in the atmosphere, stratosphere or space, as a space debris recovery nets and a sky defense net for catchers of, for example, missiles. Alternatively, space mines, mines, or electromagnetic wave generators may be mounted on the defense net.

In addition, when the conveying device of the present invention is used in the sea or on the seabed, a submarine can be caused to function as a supporting body, for example.

Furthermore, when the conveying device of the present invention is used in the atmosphere, stratosphere or outer space, a flying object such as an aircraft, a rocket, a space station, a space satellite or the like can be caused to function as a supporting body.

Further, the effects of the above functions are further enhanced by arranging multiple pairs of main movement bodies, attaching a net between each pair of main movement bodies, and thereby repeatedly arranging multiple nets. For example, a wave proof net can be used as a wavebreak net or a tsunami block.

(20-10) The present conveying device may be modified to serve as a ropeway. In this case, a conveying device with auxiliary winches is installed between the peak and the foot of a mountain.

Furthermore, the concept of the present invention can be applied to the purposes of mountain climbing and sightseeing.

(20-11) In assembly of the present conveying device, conveying the components constituting the device can be accomplished by various means. For this purpose, drones are effectively used as well as manpower, vehicles, ships, and aircraft.

(21) The place of use and the application of the conveying device exemplarily described in the above embodiments are merely an example, and the present invention does not limit the place of use and the application to those described in the embodiments. For example, the present invention can be used in the following applications.

(21-1) The conveying device of the embodiments can be used on the sea, in the sea, on the seabed or in the outer space. Since using the wires, the conveying can be accomplished without being affected by the tidal current when being used in the sea. Namely, as described above, the conveying device can be used not only on the sea, in the sea, on the seabed, in the outer space (including the stratosphere), on the moon, i.e., not only in the gravity region, but also in the gravity free region as well as on ground. In the event of being used in the sea or the seabed, since using the wires, the conveying can be accomplished without being affected by the tidal current. In addition to an application being used together with a net on the sea, in the sea, on the seabed, or in the outer space (including the stratosphere), the application to space elevators and space traffic is also possible in outer space. The principle of the space elevator is, for example, vertically arranging a large number of the conveying devices having the auxiliary winches shown in FIGS. 17A and 17B to extend from the ground to the outer space. When the conveying device is used on the moon, the main movement body moves in the air, which can convey articles and people without requiring formation of infrastructure such as a road.

(21-2) The conveying device of the present invention can be applied to conveying and building of sand-proof covers to be attached to large solar panels installed in, for example, deserts, conveying of submarine mineral resources, conveying construction material and building of structures (e.g., a submarine base, a submarine mine base, observation equipment for earthquakes and tsunamis in the sea or on the seabed, seabed and undersea hotels, shelters for natural disasters such as tsunamis, earthquakes, volcanoes and typhoons, shelters for nuclei and fires) installed on the seabed or in the sea, conveying materials to structures (e.g., a submarine base, a submarine mine base, observation equipment for earthquakes and tsunamis in the sea or on the seabed, seabed and undersea hotels, shelters for natural disasters such as tsunamis, earthquakes, volcanoes and typhoons, shelters for nuclei and fires) installed on the seabed or in the sea, and conveying and building of rafts for cultivation.

Needless to say, if the above structures (e.g., a submarine base, a submarine mine base, observation equipment for earthquakes and tsunamis in the sea or on the seabed, seabed and undersea hotels, shelters for natural disasters such as tsunamis, earthquakes, volcanoes and typhoons, shelters for nuclei and fires) is installed on the main movement body, the structures is movable.

The above structures can be, of course, installed on the ground or in the air. In this case, examples of the above structures include ground and air bases, ground and air observation facilities, ground and air hotels, shelters for natural disasters and shelters for nuclei and fires that are installed on the ground and in the air.

(21-3) The conveying device can also be used as a moving mechanism of a 3D printer head. If the 3D printer is mounted on the main movement body, various structures (including buildings) can be produced by using this 3D printer.

(21-4) Alternatively, the conveying device can also be used as a moving mechanism for appropriately moving a solar panel to a sunny place. For example, since being disposed in the air even if a solar panel is placed in a desert, the solar panel can generate electric power without being affected by desert sand very much. Of course, other power generation equipment (wind power generation equipment, thermal power generation equipment, etc.) can be mounted on the main movement body.

(21-5) A pesticide-containing tank and a sprayer are mounted on the main movement body and the conveying device can spray pesticides while moving over the fields, paddy fields, and orchards. Further alternatively, the fire protection tank and the spraying device are mounted on the main movement body, and water can be sprayed from the fire protection tank to prevent the fire from spreading while moving over the fire site. Furthermore, conveying mulching material and tunnel material by the main movement body through the use of the conveying device of the present invention can contribute to automatization of operation of arranging the mulching material and operation of arranging the tunnel material.

Furthermore, for the agricultural application, if appropriate equipment is installed in the conveying device, the conveying device can be used for weeding work, hydroponic cultivation, and airborne greenhouse, for example.

(21-6) If the conveying device that can move in multiple directions shown in FIG. 6 is made to be compact in size and a personal computer is connected to the controlling device of the conveying device to allow programming for movement pattern of the conveying device, the conveying device can be used for a device for educating children.

(21-7) The size of the conveying target is by no means limited. For example, the conveying device can be applied to conveying of a target having a size of several meters or a target having a size of several centimeters. As an example of a large conveying target, a building such as a house can be moved by using the artificial ground on which the building stands as the main movement body.

(21-8) The conveying device of the present invention can also be used for various checks, inspections, and repairs. For example, operation for checks, inspections, and repairs with respect to cracks of, for example, a tunnel or a bridge can be accomplished with a conveying device being mounted thereon a device for checks, inspections, and repairs and being installed at the tunnel or the bridge.

In addition, operation for checks, inspections, and repairs can be accomplished on railroad equipment, railway car, airport equipment, an airplane, harbor equipment, ships through the use of the conveying device of the present invention.

(21-9) The conveying device of the present invention can also be used for various observations. For example, mounting various observation devices on the conveying device makes it possible to use the conveying device in meteorological observation, observation of volcanic activity, observation of earthquakes, observation of tsunami, resource survey, or crime prevention. In addition, mounting rescuing facilities on the conveying device of the present invention makes it possible to use the conveying device in rescuing in the event of a disaster. Furthermore, mounting fire extinguishing facilities the conveying device of the present invention makes it possible to use the conveying device in fire fighting activities in the event of a fire.

(21-10) The conveying device of the present invention can convey a lighting device (including a lighting system used as an artificial sun) to a place in need. This makes it easy to install such alighting device (including a lighting system used as an artificial sun).

(21-11) Mounting a robot that performs various tasks on the main movement body makes it possible to accomplish the tasks. Of course, the robot can also be a humanoid robot.

(21-12) Alternative applications of the conveying device of the present invention are for opening and closing drive of, for example, a door, a window, a curtain, conveying various articles (e.g., daily necessaries such as food and clothes), caregivers, and sick people.

(21-13) If being equipped with a recovery pump and then is used on the sea, in the sea, on the seabed, the conveying device of the present invention can recover microchips present on the sea, in the sea, and on the seabed, and submarine resources (e.g., methane hydrate, mineral resources from hydrothermal deposits, rare metals, uranium), marine resources, pollutants, seawater, and liquids with different specific gravity from seawater.

In the above recovery of submarine resources and subsea resources, the recovered material can be served for exploration of neoplasms (deep sea organisms, bacteria, viruses, etc.). It is expected that a novel drug may be developed from the neoplasm thus obtained.

In addition, deep sea water can be pumped up by the above-mentioned pump, and then can be used as a beverage, used for cultivating cultured fish, or used for new drug development.

(21-14) Causing the winch and the cable of the main conveying mechanism to cooperate with each other makes the main movement body possible to be hung from a predetermined position between the supporting bodies. With this configuration, the conveying device of the present invention can be used in operation for checks, inspections, and repairs on a nuclear reactor, a discommissioning operation of a nuclear reactor, and entering operation into spaces between buildings or a crevice on the ground. This usage is particularly effective in the event of a disaster.

(22) The present invention includes all appropriate combinations of the respective structures disclosed in the above embodiments and modifications.

(23) Appendix

In relation to the foregoing embodiments, the following Appendix is disclosed.

(Appendix 1)
A conveying device comprising:
a main movement body;
a main conveying mechanism that conveys the main movement body; and
a controlling device that controls operation of the main conveying mechanism, wherein:
the main conveying mechanism comprises a plurality of winches attached to the main movement body and a plurality of cables one wound around each of the plurality of winches;
each of the plurality of winches includes a cylindrical drum rotatable about an axis line thereof and driving device that rotates the drum;
each of the plurality of cables is wound around corresponding one of the drums of the respective corresponding winches helically in an axis direction of the drums multiple times, and have distal ends supported by supporting bodies corresponding to the respective winches; and
the controlling device conveys the main movement body to an arbitrary position on a conveying path between the supporting bodies corresponding to the respective winches by controlling operation of a driving device of each of the plurality of winches disposed on the main movement body.

(Appendix 2)
The conveying device according to Appendix 1, wherein the controlling device adjusts an amount of winding and an amount of forwarding of the plurality of the cables of the plurality of winches to be the same.

(Appendix 3)
The conveying device according to Appendix 1 or 2, wherein:
the main conveying mechanism comprises a first winch and a second winch serving as the plurality of winches, and the plurality of cables comprising a first cable wound around a drum of the first winch and a second cable wound around a drum of the second winch;
the drum of the first winch is rotatable around a first axis line;
the drum of the second winch is rotatable around a second axis line parallel to the first axis line;
the first cable has a proximal end side wound around the drum of the first winch and a distal end supported by a first supporting body included in the supported bodies;
the second cable has a proximal end side wound around the drum of the second winch and a distal end supported by a second supporting body included in the supported bodies.

(Appendix 4)
The conveying device according to one of Appendixes 1-3, wherein:
the main movement body comprises a plurality of divided bodies; and
the plurality of winches are provided one for each of the plurality of divided bodies.

(Appendix 5)
The conveying device according to Appendix 4, further comprising a distance adjusting mechanism that adjusts distances between the plurality of divided bodies.

(Appendix 6)
The conveying device according to Appendix 4, wherein:
the plurality of divided bodies are arranged in a predetermined direction, being spaced apart from each other;
the conveying device further comprises a connector mechanism that connects the plurality of divided bodies to one another; and
the connector mechanism comprises two connector units that are able to be set to a connected state and a disconnected state and that are arranged to be spaced apart from each other along a direction crossing the predetermined direction.

(Appendix 7)
The conveying device according to one of Appendixes 3-6, wherein
the main conveying mechanism moves the main movement body along a first direction in a planer or side view;
the conveying device further comprises an auxiliary conveying mechanism that moves the main movement body in a second direction crossing the first direction;
the auxiliary conveying mechanism comprises a first auxiliary mover body and a second auxiliary mover body that are arranged to be spaced apart from each other along the first direction and that move along the second direction;
the first auxiliary mover body is configured to be the first supporting body by supporting the distal end of the first cable; and the second auxiliary mover body is configured to be the second supporting body by supporting the distal end of the second cable.

(Appendix 8)
The conveying device according to Appendix 7, wherein the main movement body comprises a container that contains the first auxiliary mover body and the second auxiliary mover body.

(Appendix 9)
The conveying device according to Appendix 7 or 8, wherein:
the auxiliary conveying mechanism further comprises a first guiding member and a second guiding member that extend along the second direction;
the first auxiliary mover body moves along the second direction, being guided by the first guiding member; and
the second auxiliary mover body moves along the second direction, being guided by the second guiding member.

(Appendix 10)
The conveying device according to Appendix 3, wherein the main conveying mechanism comprising:
a third winch and a fourth winch that are included in the plurality of winches, and
a third cable and a fourth cable that are included in the plurality of cables;
a drum of the third winch is rotatable around a third axis line extending along a direction crossing the first axis line;
a drum of the fourth winch is rotatable around a fourth axis line parallel to the third axis line;
the third cable has a proximal end side wound around the drum of the third winch and a distal end supported by a third supporting body included in the supported bodies; and
the fourth cable has a proximal end side wound around the drum of the fourth winch and a distal end supported by a fourth supporting body included in the supported bodies.

(Appendix 11)
The conveying device according to one of Appendixes 1-10, wherein
the main movement body is a vehicle.

(Appendix 12)
The conveying device according to one of Appendixes 1-10, further comprising a holder mechanism being provided to the main movement body and being capable of holding a conveying target.

(Appendix 13)
The conveying device according to Appendix 12, wherein the holder mechanism comprises:
a hanging member having an upper end connected to the main movement body and being hung from the main movement body; and a holding member being attached to a lower end of the hanging member and holding the conveying target.

(Appendix 14)

The conveying device according to Appendix 13, wherein the holding mechanism further comprises a lifting device that lifts up and down the holding member.

(Appendix 15)

The conveying device according to one of Appendixes 12-14, further comprising a rotating member being provided to the main movement body and horizontally rotating the conveying target.

(Appendix 16)

The conveying device according to one of Appendixes 12-15, wherein the conveying target is a vehicle.

(Appendix 17)

The conveying device according to Appendix 16, wherein the vehicle is detachably held by the main movement body through the holder mechanism.

(Appendix 18)

The conveying device according to one of Appendixes 12-15, wherein the conveying target is an operation machine.

(Appendix 19)

The conveying device according to Appendix 12, further comprising a swinging body swingably attached to the main movement body, wherein the holder mechanism is provided to the swinging body.

(Appendix 20)

The conveying device according to one of Appendixes 1-10, wherein the conveying target is an operation machine;

the conveying device further comprises a plurality of hanging members each having an upper end connected to the main movement body and being hung from the main movement body; and the plurality of hanging member hold a plurality of the operation machines.

(Appendix 21)

The conveying device according to one of Appendixes 1-20, wherein the main conveying mechanism moves the main movement body along a first direction; and at least one of the plurality of winches is configured such that the corresponding drum rotates about an axis line extending along a direction crossing the first direction and is arranged on an outer side of the main movement body.

(Appendix 22)

The conveying device according to one of Appendixes 1-20, wherein the main conveying mechanism moves the main movement body along a first direction; and at least one of the plurality of winches is configured to such that the corresponding drum rotates about an axis line extending along the first direction and is arranged on an outer side of the main movement body; and the at least one winch is a spinning-reel type that forwards and winds the cable wound around the corresponding drum of the at least one winch along the first direction.

(Appendix 23)

The conveying device according to one of Appendixes 1-22, wherein:

the main movement body is a ring form; and the plurality of winches are attached to the main movement body such that positions of the plurality of winches are changeable.

(Appendix 24)

A conveying device comprising:

a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a cable wound around a plurality of the drums of the plurality of winches and having ends supported by supporting bodies one cor responding to each of the plurality of winches;

the controlling device conveys the main movement body to an arbitrary position on a conveying path between the supporting bodies by controlling operation of the driving device of each of the plurality of winches;

the main movement body is configured to be a traveling body having a front wheel and a rear wheel driven by the driving device and be supported in the air; and the drum of each of the plurality of winch comprises a drum that winds the cable when the traveling body is moving forward is fixed to the front wheel so as to rotate integrally with the front wheel and a drum that forwards the cable when the traveling body is moving forward is fixed to the rear wheel so as to rotate integrally with the rear wheel.

(Appendix 25)

A conveying device comprising:

a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a cable one wound around a plurality of the drums of the plurality of winches and having ends supported by supporting bodies one corresponding to each of the plurality of winches;

the controlling device conveys the main movement body to an arbitrary position on a conveying path between the supporting bodies by controlling operation of the driving device of each of the plurality of winches;

the main movement body is configured to be a traveling body comprising a wheel driven by the driving device; and the drum of each of the plurality of winch comprises a first drum that winds the cable when the traveling body is moving forward and a second drum that forwards the cable when the traveling body is moved forward, the first drum and the second drum being fixed on the same shaft and being fixed to the wheel such that the first drum and the second drum rotate integrally with the wheel that drives the first drum and the second drum.

(Appendix 26)

The conveying device according to Appendix 1, wherein an auxiliary winch is attached to the distal end of each of the plurality of the cable being wound around the corresponding winch.

(Appendix 27)

A conveying device comprising:

a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a cable wound around a plurality of the drums of the plurality of winches and having ends supported by supporting bodies one corresponding to each of the plurality of winches;

the controlling device conveys the main movement body to an arbitrary position on a conveying path between the supporting bodies corresponding to the respective winches by controlling operation of the driving device of each of the plurality of winches;

the main conveying mechanism further comprises: a first winch and a second winch as the plurality of winches; and the cable including a first cable unit at a first end side and a second cable unit at a second end side as cable;

the drum of the first winch is rotatable around a first axis line;

the drum of the second winch is rotatable around a second axis line parallel to the first axis line;

the first cable unit has a proximal end side wound around the drum of the first winch and a distal end supported by a first supporting body included in the supported bodies;

the second cable unit has a proximal end side wound around the drum of the second winch and a distal end supported by a second supporting body included in the supported bodies;

the first cable unit and the second cable unit are formed into an integrated form;

the first winch and the second winch are disposed at a top face of the main conveying mechanism; and a slack pool accommodating slack generated between the first cable unit and the second cable unit is provided to the main conveying mechanism.

(Appendix 28)

A conveying device comprising a main movement body;

a main conveying mechanism that conveys the main movement body; and a controlling device that controls operation of the main conveying mechanism, wherein the main conveying mechanism comprises a plurality of winches being attached to the main movement body and each comprising a rotatable drum and a driving device that rotates the drum, and a cable wound around a plurality of the drums of the plurality of winches and having ends supported by supporting bodies one corresponding to each of the plurality of winches;

the controlling device conveys the main movement body to an arbitrary position on a conveying path between the supporting bodies associated with the respective winches by controlling operation of the driving device of each of the plurality of winches;

the main conveying mechanism further comprises: a first winch and a second winch that are included in the plurality of winches, and the cable including a first cable unit at a first end and a second cable unit at a second end;

the drum of the first winch is rotatable around a first axis line;

the drum of the second winch is rotatable around a second axis line parallel to the first axis line;

the first cable unit has a proximal end side wound around the drum of the first winch and a distal end supported by a first supporting body included in the supported bodies;

the second cable unit has a proximal end side wound around the drum of the second winch and a distal end supported by a second supporting body included in the supported bodies;

the first cable unit and the second cable unit are formed into an integrated form;

the conveying device further comprises a slack removing mechanism that removes slack generated on the cable between the first cable unit and the second cable unit.

(Appendix 29)

A conveying device comprising a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a cable wound around a plurality of the drums of the plurality of winches and having ends supported by supporting bodies one corresponding to each of the plurality of winches;

the controlling device conveys the main movement body to an arbitrary position on a conveying path between the supporting bodies by controlling operation of the driving device of each of the plurality of winches;

the main conveying mechanism comprises a first winch and a second winch that are included in the plurality of winches, and the cable including a first cable unit at a first end and a second cable unit at a second end;

the drum of the first winch is rotatable around a first axis line;

the drum of the second winch is rotatable around a second axis line parallel to the first axis line;

the first cable unit has a proximal end side wound around the drum of the first winch and a distal end supported by a first supporting body included in the supported bodies;

the second cable unit has a proximal end side wound around the drum of the second winch and a distal end supported by a second supporting body included in the supported bodies;

the main conveying mechanism moves the main movement body along a first direction in a planer or side view;

the conveying device further comprises an auxiliary conveying mechanism that moves the main movement body in a second direction crossing the first direction;

the auxiliary conveying mechanism comprises a first auxiliary mover body and a second auxiliary mover body that are arranged to be spaced apart from each other along the first direction and that move along the second direction;

the first auxiliary mover body serves as the first supporting body by supporting the distal end of the first cable unit; and the second auxiliary mover body serves as the second supporting body by supporting the distal end of the second cable unit; and the main movement body comprises a container that contains the first auxiliary mover body and the second auxiliary mover body.

(Appendix 30)

The conveying device according to one of Appendixes 27-29, wherein the controlling device adjusts amounts of winding or amounts of forwarding of each of the cable units of the plurality of winches independently of each other.

(Appendix 31)

The conveying device according to Appendix 27, further comprising a slack removing mechanism that removes slack generated of the cable between the first cable unit and the second cable unit.

DESCRIPTION OF REFERENCE SIGNS 1, 1',1", 1A~1Q, 1D', 1E', 1E", 1Q', 1R conveying device
2, 2C movement body (main movement body)
2-1, 2-2 divided body
2A mower (main movement body, vehicle)
2B agricultural machine
3 holder mechanism
4, 4A conveying mechanism (main conveying mechanism)
5 controller (controlling device)
6 operation arm (conveying target, operation machine)
7 chainsaw (conveying target, operation machine)
8 rod (hanging member)
10A, 10A-1, 10A-2, 10B, 10B-1, 10B-2, 10C, 10D, 10E column (supporting body)
14 auxiliary conveying mechanism
20 traveling member
20a caster wheel
20b container
20c recess
20d slack pool
20f tension roll
21 mower unit
22 swinging body
23 carrier
25 box
26 connector mechanism
29, 29A guide mechanism
31 wire (hanging member)
32 holder member
33 lifting winch (lifting device)
33c, 34a motor
33d, 34b power transmission mechanism
34 turn table
41 conveying winch
41A, 41G, 41J conveying winch (first winch)
41B, 41H, 41K conveying winch (second winch)
41C conveying winch (third winch)
41D conveying mover winch (fourth winch)
41A' auxiliary winch
41B' auxiliary winch
41a supporting frame
41b, 41b' drum
41c motor (driving device)
41d power transmission mechanism
42 wire
42A, 42G, 42J wire (cable, first cable unit)
42B, 42H, 42K wire (cable, second cable unit)
42C wire (cable, third cable unit)
42D wire (cable, fourth cable unit)
42E wire (cable)
42E-1 first part of wire 42E (first cable unit)
42E-2 second part of wire 42E (second cable unit)
43 intermediate winch
44 wire
45 connector member
46 reinforcement wire
48 hose (conveying target)
50 construction material (conveying target)
50A conveying target
141A trolley (first supporting body, first auxiliary movement body)
141B trolley (second supporting body, second auxiliary movement body)
142A wire (first guiding member)
142B wire (second guiding member)
150 vehicle body
154 winch (first winch)
154a drum
155 winch (second winch)
155b drum
156 wire (cable)
421 slack of wire 42E
CL1 axis line of drum 41b of mover winch 41A
CL2 axis line of drum 41b of mover winch 41B
CL3 axis line of drum 41b of mover winch 41C
CL4 axis line of drum 41b of mover winch 41D
D1 first direction
D2 second direction
P conveying path
PA, PB supporting point

What is claimed is:

1. A conveying device comprising:
a main movement body;
a main conveying mechanism that conveys the main movement body; and
a controlling device that controls operation of the main conveying mechanism, wherein:
the main conveying mechanism comprises a plurality of winches attached to the main movement body and a plurality of cables one wound around each of the plurality of winches;
each of the plurality of winches includes a cylindrical drum rotatable about an axis line thereof and driving device that rotates the drum;
each of the plurality of cables is wound around corresponding one of the drums of the respective corresponding winches helically in an axis direction of the drums multiple times, and have distal ends supported by supporting bodies corresponding to the respective winches; and
the controlling device conveys the main movement body to an arbitrary position on a conveying path between the supporting bodies corresponding to the respective winches by controlling operation of a driving device of each of the plurality of winches disposed on the main movement body, wherein
the main conveying mechanism comprises a first winch and a second winch serving as the plurality of winches, and the plurality of cables comprising a first cable wound around a drum of the first winch and a second cable wound around a drum of the second winch, and
the controlling device adjusts an amount of winding one of the first able and the second cable and an amount of forwarding the other one of the first able and the second cable to be the same.

2. The conveying device according to claim 1, wherein:
the drum of the first winch is rotatable around a first axis line;
the drum of the second winch is rotatable around a second axis line parallel to the first axis line;
the first cable has a proximal end side wound around the drum of the first winch and a distal end supported by a first supporting body included in the supported bodies;

the second cable has a proximal end side wound around the drum of the second winch and a distal end supported by a second supporting body included in the supported bodies.

3. The conveying device according to claim 2, wherein
the main conveying mechanism moves the main movement body along a first direction in a planer or side view;
the conveying device further comprises an auxiliary conveying mechanism that moves the main movement body in a second direction crossing the first direction;
the auxiliary conveying mechanism comprises a first auxiliary mover body and a second auxiliary mover body that are arranged to be spaced apart from each other along the first direction and that move along the second direction;
the first auxiliary mover body is configured to be the first supporting body by supporting the distal end of the first cable; and
the second auxiliary mover body is configured to be the second supporting body by supporting the distal end of the second cable.

4. The conveying device according to claim 3, wherein the main movement body comprises a container that contains the first auxiliary mover body and the second auxiliary mover body.

5. The conveying device according to claim 3, wherein:
the auxiliary conveying mechanism further comprises a first guiding member and a second guiding member that extend along the second direction;
the first auxiliary mover body moves along the second direction, being guided by the first guiding member; and
the second auxiliary mover body moves along the second direction, being guided by the second guiding member.

6. The conveying device according to claim 2, wherein the main conveying mechanism comprising:
a third winch and a fourth winch that are included in the plurality of winches, and
a third cable and a fourth cable that are included in the plurality of cables;
a drum of the third winch is rotatable around a third axis line extending along a direction crossing the first axis line;
a drum of the fourth winch is rotatable around a fourth axis line parallel to the third axis line;
the third cable has a proximal end side wound around the drum of the third winch and a distal end supported by a third supporting body included in the supported bodies; and
the fourth cable has a proximal end side wound around the drum of the fourth winch and a distal end supported by a fourth supporting body included in the supported bodies.

7. The conveying device according to claim 1, wherein the main movement body is a vehicle.

8. The conveying device according to claim 1, further comprising a holder mechanism being provided to the main movement body and being capable of holding a conveying target.

9. The conveying device according to claim 8, wherein the holder mechanism comprises:
a hanging member having an upper end connected to the main movement body and being hung from the main movement body; and
a holding member being attached to a lower end of the hanging member and holding the conveying target.

10. The conveying device according to claim 9, wherein the holding mechanism further comprises a lifting device that lifts up and down the holding member.

11. The conveying device according to claim 8, further comprising a rotating member being provided to the main movement body and horizontally rotating the conveying target.

12. The conveying device according to claim 8, wherein the conveying target is a vehicle.

13. The conveying device according to claim 12, wherein the vehicle is detachably held by the main movement body through the holder mechanism.

14. The conveying device according to claim 8, wherein the conveying target is an operation machine.

15. The conveying device according to claim 8, further comprising a swinging body swingably attached to the main movement body, wherein
the holder mechanism is provided to the swinging body.

16. The conveying device according to claim 1, wherein
a conveying target is an operation machine;
the conveying device further comprises a plurality of hanging members each having an upper end connected to the main movement body and being hung from the main movement body; and
the plurality of hanging member hold a plurality of the operation machines.

17. The conveying device according to claim 1, wherein
the main conveying mechanism moves the main movement body along a first direction; and
at least one of the plurality of winches is configured such that the corresponding drum rotates about an axis line extending along a direction crossing the first direction and is arranged on an outer side of the main movement body.

18. The conveying device according to claim 1, wherein
the main conveying mechanism moves the main movement body along a first direction; and
at least one of the plurality of winches is configured to such that the corresponding drum rotates about an axis line extending along the first direction and is arranged on an outer side of the main movement body; and
the at least one winch is a spinning-reel type that forwards and winds the cable wound around the corresponding drum of the at least one winch along the first direction.

19. The conveying device according to claim 1, wherein:
the main movement body is a ring form; and
the plurality of winches are attached to the main movement body such that positions of the plurality of winches are changeable.

20. The conveying device according to claim 1, wherein an auxiliary winch is attached to the distal end of each of the plurality of the cable being wound around the corresponding winch.

21. A conveying device comprising:
a main movement body;
a main conveying mechanism that conveys the main movement body; and
a controlling device that controls operation of the main conveying mechanism, wherein:
the main conveying mechanism comprises a plurality of winches attached to the main movement body and a plurality of cables one wound around each of the plurality of winches;
each of the plurality of winches includes a cylindrical drum rotatable about an axis line thereof and driving device that rotates the drum;

each of the plurality of cables is wound around corresponding one of the drums of the respective corresponding winches helically in an axis direction of the drums multiple times, and have distal ends supported by supporting bodies corresponding to the respective winches; and the controlling device conveys the main movement body to an arbitrary position on a conveying path between the supporting bodies corresponding to the respective winches by controlling operation of a driving device of each of the plurality of winches disposed on the main movement body, wherein:

the main movement body comprises a plurality of divided bodies; and the plurality of winches are provided one for each of the plurality of divided bodies.

22. The conveying device according to claim 21, further comprising a distance adjusting mechanism that adjusts distances between the plurality of divided bodies.

23. The conveying device according to claim 21, wherein:

the plurality of divided bodies are arranged in a predetermined direction, being spaced apart from each other;

the conveying device further comprises a connector mechanism that connects the plurality of divided bodies to one another; and the connector mechanism comprises two connector units that are able to be set to a connected state and a disconnected state and that are arranged to be spaced apart from each other along a direction crossing the predetermined direction.

24. A conveying device comprising:

a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a plurality of cables wound around a plurality of the drums of the plurality of winches and having ends supported by supporting bodies one corresponding to each of the plurality of winches;

the controlling device conveys the main movement body to an arbitrary position on a conveying path between the supporting bodies by controlling operation of the driving device of each of the plurality of winches;

the main movement body is configured to be a traveling body having a front wheel and a rear wheel driven by the driving device and be supported in the air; and the drum of each of the plurality of winch comprises a drum that winds one of the plurality of cables when the traveling body is moving forward is fixed to the front wheel so as to rotate integrally with the front wheel and a drum that forwards the cable when the traveling body is moving forward is fixed to the rear wheel so as to rotate integrally with the rear wheel, wherein the main conveying mechanism comprises a first winch and a second winch serving as the plurality of winches, and the plurality of cables comprising a first cable wound around a drum of the first winch and a second cable wound around a drum of the second winch, and the controlling device adjusts an amount of winding one of the first able and the second cable and an amount of forwarding the other one of the first able and the second cable to be the same.

25. A conveying device comprising:

a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a plurality of cables one wound around each of a plurality of the drums of the plurality of winches and having ends supported by supporting bodies one corresponding to each of the plurality of winches;

the controlling device conveys the main movement body to an arbitrary position on a conveying path between the supporting bodies by controlling operation of the driving device of each of the plurality of winches;

the main movement body is configured to be a traveling body comprising a wheel driven by the driving device; and the drum of each of the plurality of winch comprises a first drum that winds one of the plurality of cables when the traveling body is moving forward and a second drum that forwards one of the plurality of cables when the traveling body is moved forward, the first drum and the second drum being fixed on the same shaft and being fixed to the wheel such that the first drum and the second drum rotate integrally with the wheel that drives the first drum and the second drum, wherein the main conveying mechanism comprises a first winch and a second winch serving as the plurality of winches, and the plurality of cables comprising a first cable wound around a drum of the first winch and a second cable wound around a drum of the second winch, and the controlling device adjusts an amount of winding one of the first able and the second cable and an amount of forwarding the other one of the first able and the second cable to be the same.

26. A conveying device comprising:

a main movement body;

a main conveying mechanism that conveys the main movement body; and a controlling device that controls operation of the main conveying mechanism, wherein the main conveying mechanism comprises: a plurality of winches being attached to the main movement body and each comprising a rotatable drum and a driving device that rotates the drum; and a cable wound around a plurality of the drums of the plurality of winches and having ends supported by supporting bodies one corresponding to each of the plurality of winches;

the controlling device conveys the main movement body to an arbitrary position on a conveying path between the supporting bodies corresponding to the respective winches by controlling operation of the driving device of each of the plurality of winches;

the main conveying mechanism further comprises: a first winch and a second winch as the plurality of winches; and the cable including a first cable unit at a first end side and a second cable unit at a second end side as cable;

the drum of the first winch is rotatable around a first axis line;

the drum of the second winch is rotatable around a second axis line parallel to the first axis line;

the first cable unit has a proximal end side wound around the drum of the first winch and a distal end supported by a first supporting body included in the supported bodies;

the second cable unit has a proximal end side wound around the drum of the second winch and a distal end supported by a second supporting body included in the supported bodies;

the first cable unit and the second cable unit are formed into an integrated form;

the first winch and the second winch are disposed at a top face of the main conveying mechanism; and a slack pool accommodating slack generated between the first cable unit and the second cable unit is provided to the main conveying mechanism.

27. The conveying device according to claim 26, wherein the controlling device adjusts amounts of winding or amounts of forwarding of each of the cable units of the plurality of winches independently of each other.

28. The conveying device according to claim 26, further comprising a slack removing mechanism that removes slack generated of the cable between the first cable unit and the second cable unit.

29. A conveying device comprising
a main movement body;
a main conveying mechanism that conveys the main movement body; and
a controlling device that controls operation of the main conveying mechanism, wherein
the main conveying mechanism comprises a plurality of winches being attached to the main movement body and each comprising a rotatable drum and a driving device that rotates the drum, and a cable wound around a plurality of the drums of the plurality of winches and having ends supported by supporting bodies one corresponding to each of the plurality of winches;
the controlling device conveys the main movement body to an arbitrary position on a conveying path between the supporting bodies associated with the respective winches by controlling operation of the driving device of each of the plurality of winches;
the main conveying mechanism further comprises: a first winch and a second winch that are included in the plurality of winches, and the cable including a first cable unit at a first end and a second cable unit at a second end;
the drum of the first winch is rotatable around a first axis line;
the drum of the second winch is rotatable around a second axis line parallel to the first axis line;
the first cable unit has a proximal end side wound around the drum of the first winch and a distal end supported by a first supporting body included in the supported bodies;
the second cable unit has a proximal end side wound around the drum of the second winch and a distal end supported by a second supporting body included in the supported bodies;
the first cable unit and the second cable unit are formed into an integrated form;
the conveying device further comprises a slack removing mechanism that removes slack generated on the cable between the first cable unit and the second cable unit.

30. A conveying device comprising
a main movement body;
a main conveying mechanism that conveys the main movement body; and
a controlling device that controls operation of the main conveying mechanism, wherein
the main conveying mechanism comprises: a plurality of winches being attached to the main movement body and each comprising a rotatable drum and a driving device that rotates the drum; and a cable wound around a plurality of the drums of the plurality of winches and having ends supported by supporting bodies one corresponding to each of the plurality of winches;
the controlling device conveys the main movement body to an arbitrary position on a conveying path between the supporting bodies by controlling operation of the driving device of each of the plurality of winches;
the main conveying mechanism comprises a first winch and a second winch that are included in the plurality of winches, and the cable including a first cable unit at a first end and a second cable unit at a second end;
the drum of the first winch is rotatable around a first axis line;
the drum of the second winch is rotatable around a second axis line parallel to the first axis line;
the first cable unit has a proximal end side wound around the drum of the first winch and a distal end supported by a first supporting body included in the supported bodies;
the second cable unit has a proximal end side wound around the drum of the second winch and a distal end supported by a second supporting body included in the supported bodies;
the main conveying mechanism moves the main movement body along a first direction in a planer or side view;
the conveying device further comprises an auxiliary conveying mechanism that moves the main movement body in a second direction crossing the first direction;
the auxiliary conveying mechanism comprises a first auxiliary mover body and a second auxiliary mover body that are arranged to be spaced apart from each other along the first direction and that move along the second direction;
the first auxiliary mover body serves as the first supporting body by supporting the distal end of the first cable unit; and
the second auxiliary mover body serves as the second supporting body by supporting the distal end of the second cable unit; and
the main movement body comprises a container that contains the first auxiliary mover body and the second auxiliary mover body.

* * * * *